United States Patent [19]
Ito et al.

[11] Patent Number: 5,481,913
[45] Date of Patent: Jan. 9, 1996

[54] ANGULAR VELOCITY SENSOR AND METHOD OF ADJUSTING THE SAME

[75] Inventors: Takeshi Ito, Okazaki; Tomoyuki Kanda, Inabe; Muneo Yorinaga, Anjo, all of Japan

[73] Assignees: Nippondenso Co. Ltd., Kariya; Nippon Soken Inc., Nishio, both of Japan

[21] Appl. No.: 134,813

[22] Filed: Oct. 12, 1993

[30] Foreign Application Priority Data

| Oct. 12, 1992 | [JP] | Japan | 4-272848 |
|---|---|---|---|
| Oct. 12, 1992 | [JP] | Japan | 4-273201 |
| Oct. 13, 1992 | [JP] | Japan | 4-274528 |
| Sep. 24, 1993 | [JP] | Japan | 5-237637 |
| Sep. 24, 1993 | [JP] | Japan | 5-237638 |
| Oct. 1, 1993 | [JP] | Japan | 5-246991 |
| Oct. 8, 1993 | [JP] | Japan | 5-253039 |

[51] Int. Cl.$^6$ .................................................. G01P 9/04
[52] U.S. Cl. ........................................................ 73/504.16
[58] Field of Search ............................. 73/503, 505, 504

[56] References Cited

U.S. PATENT DOCUMENTS

| 4,628,734 | 12/1986 | Watson . | |
|---|---|---|---|
| 4,930,351 | 6/1990 | Macy et al. | 73/505 |
| 5,131,273 | 7/1992 | Tabata et al. | 73/505 |
| 5,166,571 | 11/1992 | Konno et al. | 73/505 |

FOREIGN PATENT DOCUMENTS

| 59-037414 | 2/1984 | Japan . |
|---|---|---|
| 60-185111 | 9/1985 | Japan . |
| 61-191917 | 8/1986 | Japan . |
| 63-286707 | 11/1988 | Japan . |

Primary Examiner—Richard Chilcot
Assistant Examiner—Max H. Noori
Attorney, Agent, or Firm—Cushman, Darby & Cushman

[57] ABSTRACT

An angular velocity sensor which suppresses the generation of noise in a detector piezo-electric element due to vibration of a vibrator caused by expansion and contraction of a driver piezo-electric element. A driver piezo-electric element 6 is adhered to an upper part on the left-side surface of a first square pole 3 of a vibrator 1 and a driver piezo-electric element 7 is adhered to an upper part on the right-side surface of a second square pole 4. Further, a detector piezo-electric element 8 is adhered to a lower part on the front surface of the first square pole 3 of the vibrator 1 and a detector piezo-electric element 9 is adhered to a lower part on the front surface of the second square pole 4. Here, the driver piezo-electric elements 6, 7 and the detector piezo-electric elements 8, 9 are disposed so as to be deviated so that they will not overlap in the axial direction of the square poles.

17 Claims, 50 Drawing Sheets

DETECT VIBRATION

DRIVE VIBRATION

ANGULAR VELOCITY SENSOR AND METHOD OF ADJUSTING THE SAME

BACKGROUND OF THE INVENTION

1. Field of the Invention

The present invention relates to an angular velocity sensor which measures angular velocity by using a piezo-electric oscillation type gyro, and which can be used for measuring the movement of a moving body such as a vehicle, a ship, an airplane, a robot or the like. More specifically, the invention relates to an angular velocity sensor which is used for measuring rotational angular velocity for controlling the attitude of a vehicle, or for controlling the wheels and related portions of a vehicle, or which is used for a navigation system mounted on a vehicle. The invention further relates to a method of adjusting an angular velocity sensor by adjusting the output voltage of the angular velocity sensor.

2. Description of the Related Art

A conventional tuning fork-controlled gyro has, as shown in FIG. 21, two square poles formed on a vibrator 310, as well as driver piezo-electric elements 320 and detector piezo-electric elements 330 disposed at neighboring positions on the surfaces meeting at right angles and maintaining the same height. Furthermore, feedback piezo-electric elements 340 are disposed on the surfaces opposed to the driver piezo-electric elements 320 on the square poles of the vibrator 310. The driver and detector piezo-electric elements 320 and 330 disposed on the surfaces meeting at right angles on the square poles of the vibrator 310 help increase the amplitude of the vibrator 310 and increase sensitivity based upon the Coriolis force.

Even in the conventional tuning fork-type angular velocity sensor as shown in FIG. 20, a driver piezo-electric element 301 is adhered to the central portion on the front surface of the square member 300 and a detector piezo-electric element 302 is adhered to the central portion on the right-side surface of the square member 300.

When an AC signal is applied to the driver piezo-electric element 320 to vibrate the gyro, the piezo-electric element 320 expands and contracts and the square pole of the oscillator 310 bends and vibrates in a direction shown by an arrow in FIG. 21. With the conventional structure as shown in FIG. 22, however, an undesired signal is generates in the detector piezo-electric element 330 due to the expansion and contraction of the square pole of the vibrator 310 caused by the expansion and contraction of the driver piezo-electric element 320. This becomes a cause of offset noise of the gyro.

Moreover, a pair of piezo-electric elements work as capacitors whereby drive signals flow through the electrostatic capacitive coupling, resulting in the generation of offset noise.

FIG. 23 illustrates an angular velocity sensor which uses a square pole tuning fork-controlled piezo-electric vibration gyro. That is, two square poles 300 and 301 are supported by a base portion 310 via a support portion 340, and a driver piezo-electric element 320 and a detector piezo-electric element 330 are fastened to the surfaces meeting at right angles of each of the square poles 300. The support portion 340 may have the structure of a pin to support node of vibration as shown in FIG. 23, or the support portion may not be provided as shown in FIG. 24.

When the node is supported by a thin member such as a pin 340 having a circular shape in cross section as shown in FIG. 23, however, undesired vibration is generated at the support portion 340 particularly when the vibrator is out of balance due to dispersion introduced in the step of production, making it difficult to firmly support the vibrator.

When the vibrator is secured without using the support portion as shown in FIG. 24, furthermore, vibration leaks to a great extent and the vibrator cannot be efficiently vibrated.

Furthermore, the leakage of vibration affects the offset signal output from the sensor, and also the leakage of vibration that changes depending upon the temperature becomes a cause of temperature drift offset.

SUMMARY OF THE INVENTION

The object of the present invention therefore is to provide an angular velocity sensor which suppresses the generation of noise in the detector piezo-electric element due to vibration of the vibrator caused by the expansion and contraction of the driver piezo-electric element.

The present invention provides an angular velocity sensor comprising a square pole-like vibrator, a driver piezo-electric element fastened to one surface of the vibrator, and a detector piezo-electric element fastened to a surface of the vibrator at right angles with the surface to which the driver piezo-electric element is fastened, the detector piezo-electric element being deviated in the axial direction of the square pole so as not to overlap the driver piezo-electric element.

More concretely, the invention provides an angular velocity sensor comprising a square pole-like vibrator supported by a base portion via a support portion, a driver piezo-electric element fastened close to the support portion of the vibrator, and a detector piezo-electric element fastened to a surface of the vibrator at right angles with the surface to which the driver piezo-electric element is fastened, the detector piezo-electric element being deviated in the axial direction of the square pole toward the side opposite to the side of the support portion so as not to overlap the driver piezo-electric element.

According to the present invention, the driver piezo-electric element and the detector piezo-electric element are disposed so as not to be opposed to each other, and it is allowed to decrease the expansion and contraction signals of the vibrator produced by the drive signals to a degree that can be neglected.

According to the present invention, furthermore, the driver piezo-electric element is fastened to the side of the support portion rather than the side of the detector piezo-electric element, whereby it is allowed to decrease the expansion and contraction signals of the vibrator produced by the driver signals to a degree that can be neglected yet sufficiently maintaining the output of the detector piezo-electric element.

As described above in detail, the present invention exhibits an excellent effect of suppressing the generation of noise in the detector piezo-electric element caused by the vibration of the vibrator resulting from the expansion and contraction of the driver piezo-electric element.

BRIEF DESCRIPTION OF THE DRAWINGS

FIG. 28 is a diagram illustrating a relationship between the width of the support portion and the difference in amplitude;

DETAILED DESCRIPTION OF THE PREFERRED EMBODIMENTS

Embodiments related to the angular velocity sensor according to the present invention will now be described in detail in conjunction with the drawings.

(First embodiment)

Figure 1:
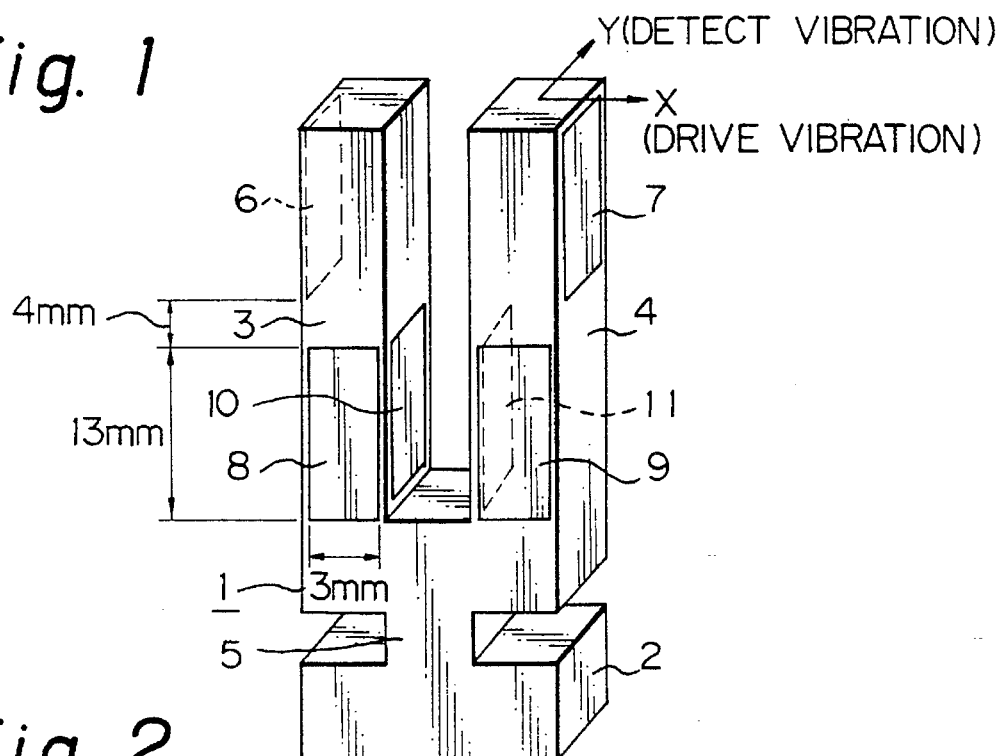
FIG. 1 is a perspective view of an angular velocity sensor according to a first embodiment.

As shown in FIG. 1, a vibrator 1 is made of a constantly elastic material such as an iron-nickel alloy and has the shape of a square pole tuning fork. That is, a first square pole 3 and a second square pole 4 are supported by a base portion 2 via a support portion 5 at which they gather together.

The base portion 2, first square pole 3, second square pole 4 and support portion 5 have a square shape in cross section.

A driver piezo-electric element 6 of a rectangular shape is adhered to an upper part of the left-side surface of the first square pole 3 of the vibrator 1. Similarly, a driver piezo-electric element 7 of a rectangular shape is adhered to an upper part of the right-side surface of the second square pole 4 of the vibrator 1. When an AC voltage is applied to the driver piezo-electric elements 6 and 7, the first and second square poles 3 and 4 oscillate in the right-and-left direction (direction indicated by an X-axis) in FIG. 1.

Furthermore, a detector piezo-electric element 8 of a rectangular shape is adhered to a lower part on the front surface of the first square pole 3 of the vibrator 1. Similarly, a detector piezo-electric element 9 of a rectangular shape is adhered to a lower part on the front surface of the second square pole 4 of the vibrator 1. As a rotational angular velocity is exerted on the center axes of the square poles 3, 4 (vibrator), the detector piezo-electric elements 8 and 9 detect, as a voltage, the Coriolis force that acts in the back-and-forth direction (direction indicated by a Y-axis) in FIG. 1 accompanying the vibration of the first and second square poles 3 and 4 produced by the driver piezo-electric elements 6 and 7 upon application of an AC voltage.

Furthermore, a feedback piezo-electric element 10 of a rectangular shape is adhered to a lower part on the right-side surface of the first square pole 3 of the vibrator 1. Similarly, a feedback piezo-electric element 11 of a rectangular shape is adhered to a lower part on the left-side surface of the second square pole of the vibrator 1. The feedback piezo-electric elements 10 and 11 detect, as a voltage, the vibration of the first and second square poles 3 and 4 produced by the driver piezo-electric elements 6 and 7 upon application of the AC voltage.

In this embodiment, the driver piezo-electric elements 6 and 7, the detector piezo-electric elements 8 and 9, and the feedback piezo-electric elements 10 and 11 have the same size measuring 13 mm×3 mm in the vertical direction and in the lateral direction as shown in FIG. 1. Furthermore, the driver piezo-electric element 6 and the detector piezo-electric element 8 are arranged so as to be spaced apart by 4 mm in the axial direction of the first square pole 3. Similarly, the driver piezo-electric element 7 and the detector piezo-electric element 9 are arranged so as to be spaced apart by 4 mm in the axial direction of the second square pole 4.

Described below is the operation of the thus constituted angular velocity sensor.

When an AC voltage is fed to the driver piezo-electric elements 6 and 7, the first and second square poles 3 and 4 bend and vibrate in a direction of drive vibration. The feedback piezo-electric element 10 and 11 generate signals in proportion to the amplitude, and whereby a self-excited vibration circuit is constituted together with the driver piezo-electric elements 6 and 7.

When a rotational angular velocity is exerted on the center axes of the square poles 3 and 4 (vibrator), vibration is generated by the Coriolis force and signals due to the vibration are generated in the detector piezo-electric elements 8 and 9. The angular velocity is detected based on the signals of the detector piezo-electric elements 8 and 9.

Figure 2:
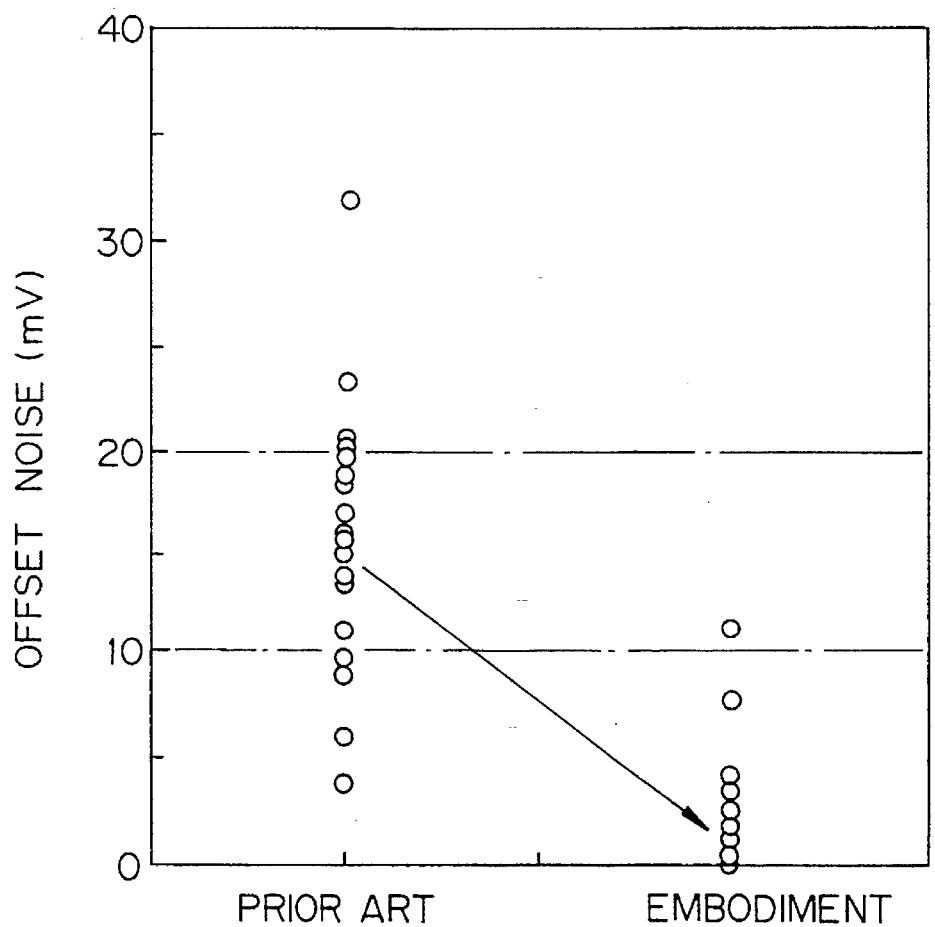
FIG. 2 is a diagram illustrating the measured results of offset noise for the purpose of comparison.

FIG. 2 shows the effect of decreasing the offset noise. When driver signals of 2 volts having a frequency of 1 kHz are applied, a conventional sensor generates offset signals of 10 to 20 mV whereas the sensor of the constitution of FIG. 1 generates offset noise which is decreased to about one-tenth.

Figure 3:
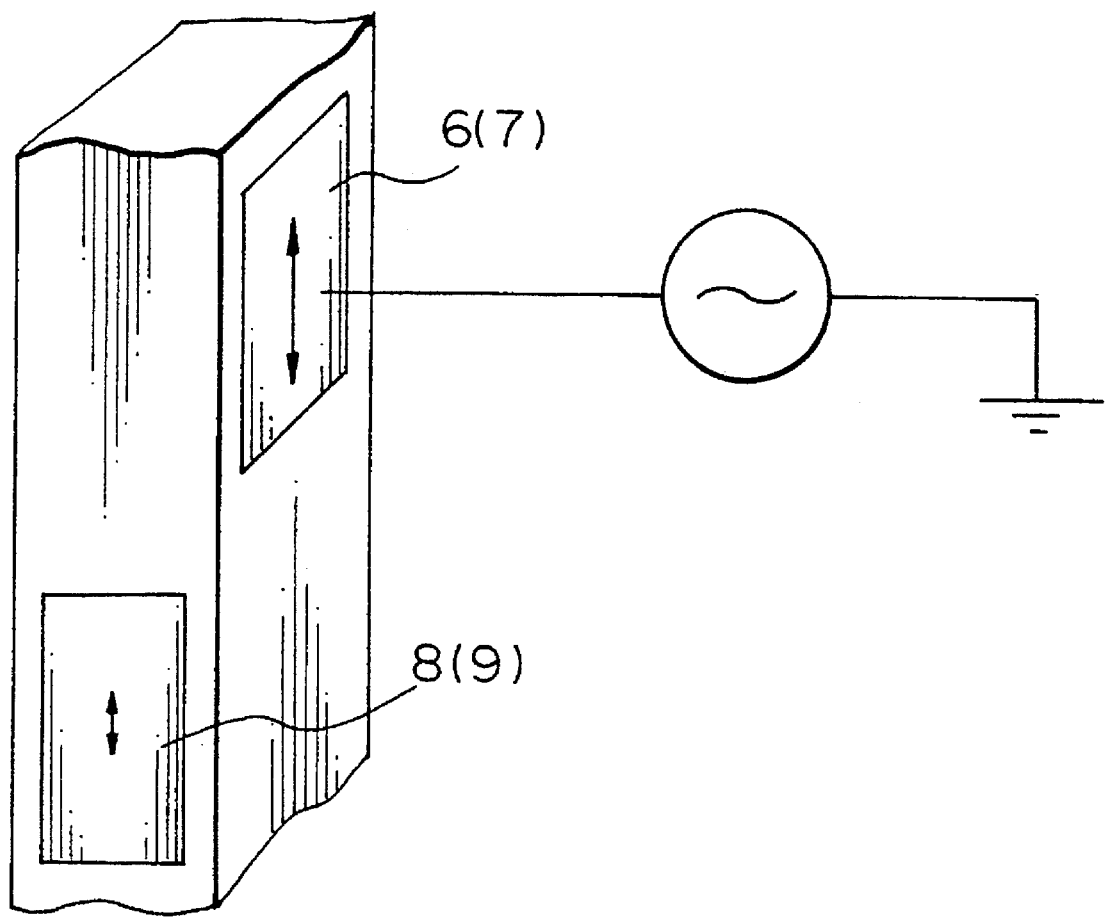
FIG. 3 is a model diagram illustrating the effect of the arrangement of piezo-electric elements according to the embodiment.

According to this embodiment as described above, the driver piezo-electric elements 6 and 7 are adhered to the upper parts of side surfaces of the square poles 3 and 4, and detector piezo-electric elements 8 and 9 are adhered to the lower parts of front surfaces of the square poles 3 and 4 at right angles with the surfaces to which the driver piezo-electric elements 6 and 7 are adhered. That is, as shown in FIG. 3, the driver piezo-electric elements 5, 7 and the detector piezo-electric elements 8, 9 are arranged so as to be deviated in the axial direction of the square poles so as not to overlap.

With the driver piezo-electric elements 6, 7 and the detector piezo-electric elements 8, 9 being spaced apart from each other so as not to oppose each other, it is made possible to decrease the expansion and contraction signals of the vibrator due to drive signals to a degree that can be neglected. Furthermore, with the noise due to expansion and contraction being decreased, it becomes possible to provide an angular velocity sensor having an improved accuracy.

(Second embodiment)

A second embodiment will now be described with reference to FIG. 4.

A vibrator 20 according to the second embodiment is fixed to a seat 23b by using a U-shaped fixing portion 23a that is provided in a holding portion 21 of the vibrator 20. Reference numeral 37 denotes a housing.

A signal of the vibrator 20 is connected via a lead wire 24 to a circuit 25 which processes the signals. The signal that is processed is sent via a connector 26 to an external ECU or the like that is not shown.

Figure 4:
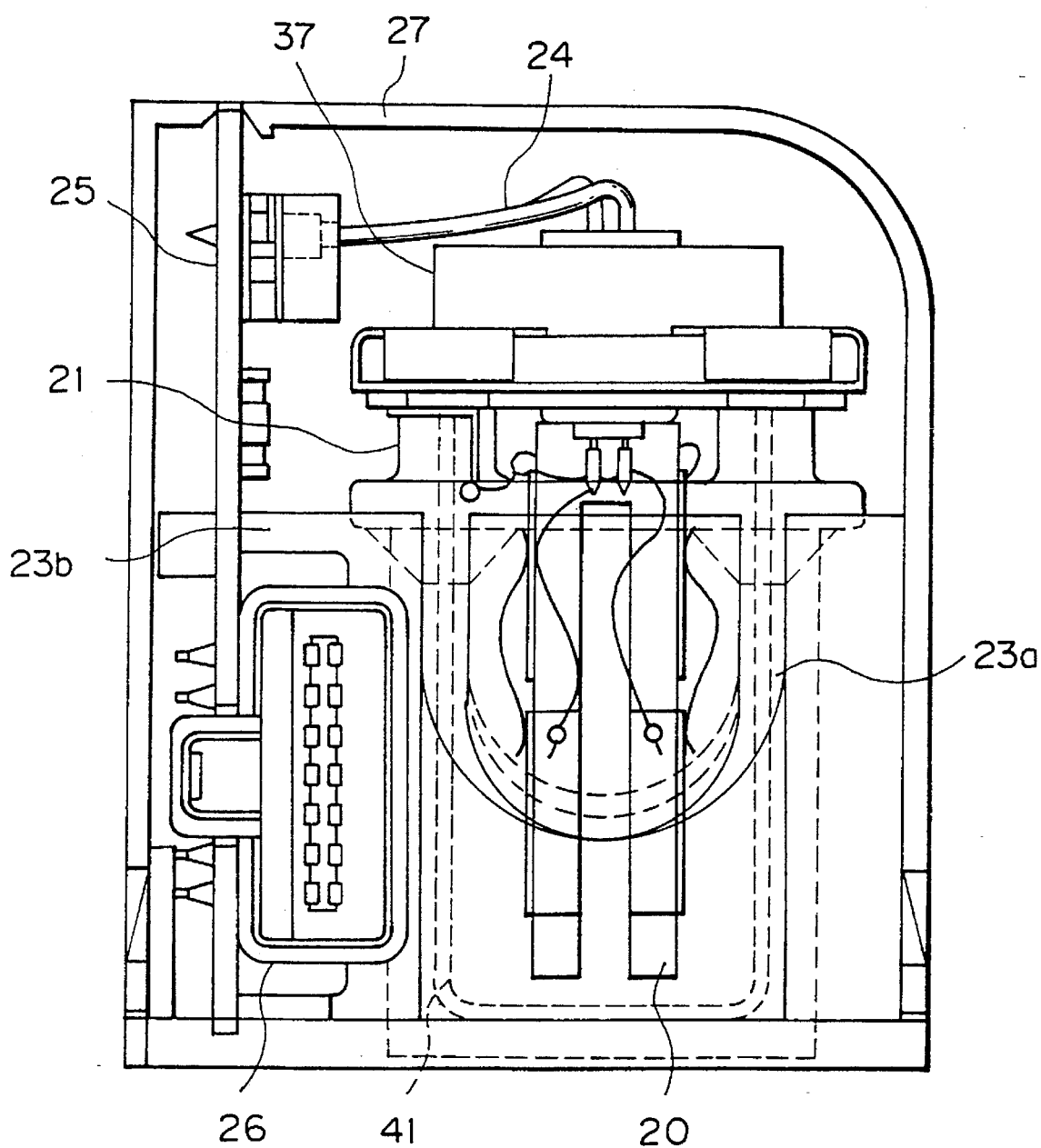
FIG. 4 is a schematic diagram illustrating an angular velocity sensor according to a second embodiment.

The vibrator 20 and the circuit 25 are provided in a casing 27 as shown in FIG. 4.

Figure 5:
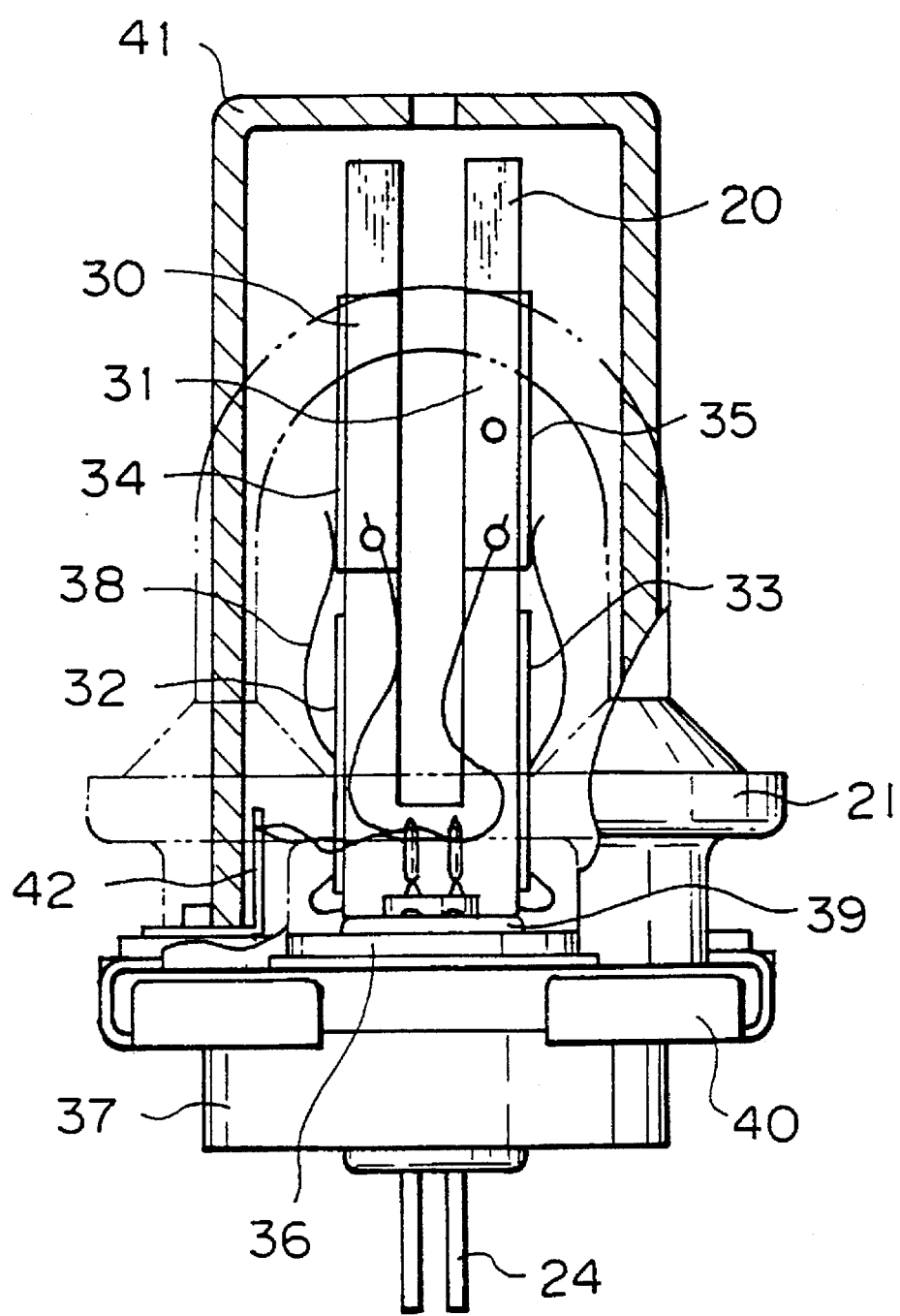
FIG. 5 is a schematic diagram illustrating the angular velocity sensor according to the second embodiment.

The method of fixing the vibrator 20 of the second embodiment will now be described in further detail with reference to FIG. 5.

As will be described later in detail, the vibrator 20 is provided with detector piezo-electric elements 30 and 31, driver piezo-electric elements 32 and 33, and feedback piezo-electric elements 34 and 35.

A base portion 36 of the vibrator 20 is forcibly inserted into the housing 37, so that the vibrator 20 is fixed to the housing 37 as a unitary structure.

Ends on one side of signal-driving wires 38 are fixed by soldering to the detector piezo-electric elements 30 and 31, to the driver piezo-electric elements 32 and 33, and to the feedback piezo-electric elements 34 and 35 that are adhered to the vibrator 20, and the other ends of the signal-driving wires 38 are fixed by soldering to terminals formed on the base portion 36.

With this constitution, the signals from the piezo-electric elements are taken out from the housing 37 through lead wires 24 connected to the terminals 39, and are fed to the circuit 25 shown in FIG. 4.

A flange 40 is fixed by caulking to the outer periphery of the housing 37 to which the vibrator 20 is fixed. Then, a holding portion 21 made of a rubber that is not shown is fixed by caulking to the outer periphery of the flange 40.

That is, the vibrator 20 is held in the casing 27 by being fixed to the seat 23b via the housing 37, flange 40 and holding portion 21.

Moreover, a protection casing 41 that protects the vibrator 20 is fixed to the housing 37 by caulking.

A ground terminal 42 is connected to the housing 37 by spot-welding and enables ground connection of the vibrator 20 to be obtained via the housing 37.

Grounds of the piezo-electric elements 30 to 35 are commonly connected to the ground terminal 42.

Figure 6:
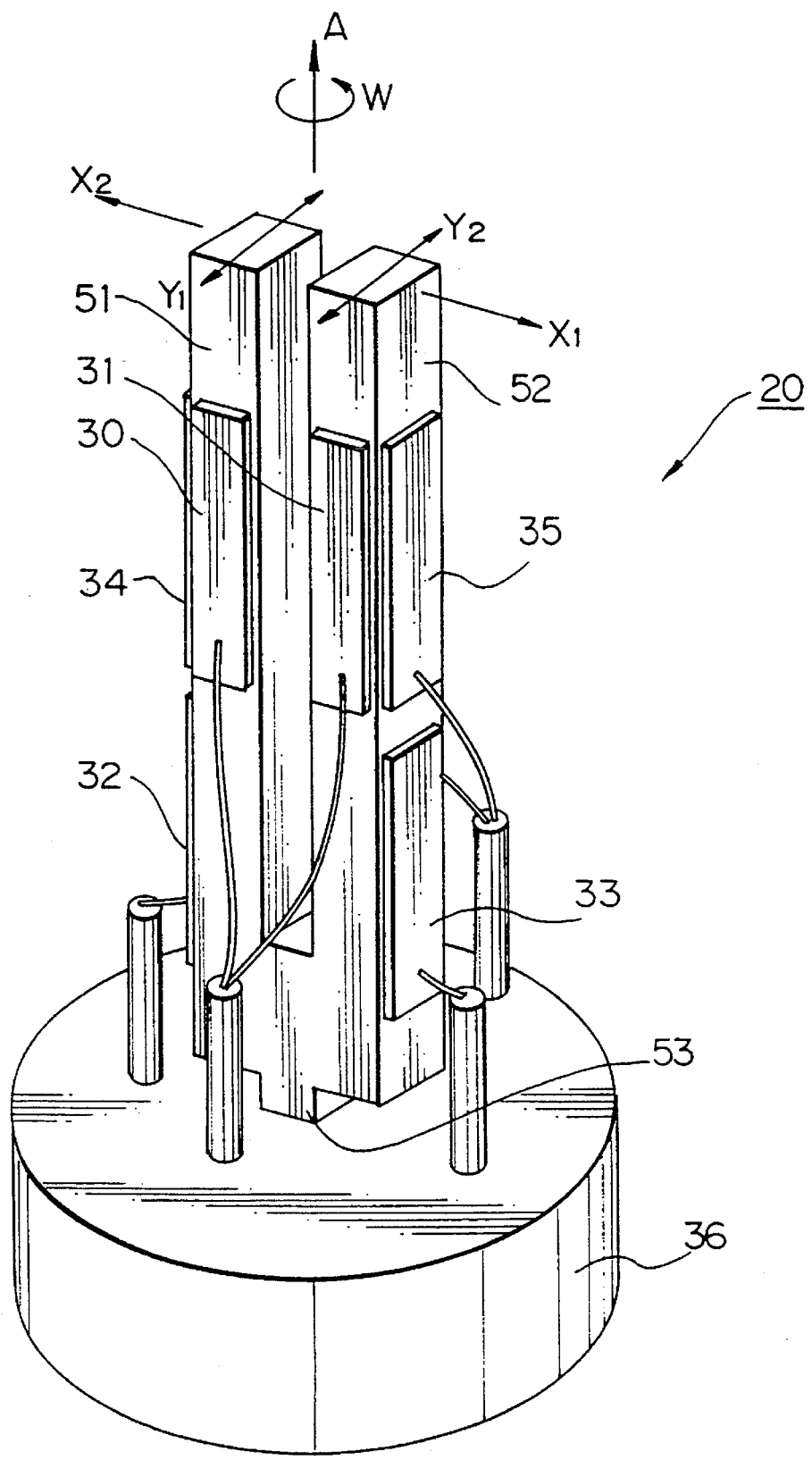
FIG. 6 is a schematic diagram illustrating the angular velocity sensor according to the second embodiment.

FIG. 6 illustrates the constitution of the vibrator 20 of the second embodiment.

According to the second embodiment as shown in FIG. 6, a first square pole 51 and a second square pole 52 are supported by the base portion 36 of the vibrator 20 via a support portion 53 at which they gather together.

The base portion 36, first square pole 51, second square pole and support portion 53 have a square shape in cross section.

The constitution up to this point is nearly the same as that of the first embodiment. The second embodiment, however, is different from the first embodiment with respect to the positions of the piezo-electric elements 30 to 35.

That is, in the second embodiment, the detector piezo-electric element 30 of a rectangular shape is adhered to an upper part on the front surface of the first square pole 51 of the vibrator 20. Similarly, the detector piezo-electric element 31 of a rectangular shape is adhered to an upper part on the front surface of the second square pole 52 of the vibrator 20.

Furthermore, the detector piezo-electric elements 30 and 31 are stuck to the surfaces of the first and second square poles 51 and 52 in the same direction, such that the directions of polarization of the piezo-electric elements 30 and 31 are different relative to each other.

The driver piezo-electric element 32 of a rectangular shape is adhered to a lower part on the left side of the first square pole 51 of the vibrator 20. Similarly, the driver piezo-electric element 33 of a rectangular shape is adhered to a lower part on the right side of the second square pole 52 of the vibrator 20.

When an AC voltage is applied to the driver piezo-electric elements 32 and 33 of the above-mentioned constitution, the first and second square poles 51 and 52 vibrate in the right-and-left direction (direction represented by an X-axis) in FIG. 6. When a rotational angular velocity ω is exerted on the center axis A of the square poles 51 and 52 (vibrator 20) while the first and second square poles 51 and 52 are vibrating with the AC voltage being applied to the driver piezo-electric elements 32 and 33, the detector piezo-electric elements 30 and 31 detect, as a voltage, the Coriolis force that is acting in the back-and-forth direction (direction indicated by arrows Y1 and Y2) in FIG. 6. In this case, the the Coriolis force may act not in the same direction but in directions different from each other between the square poles 51 and 52.

Furthermore, the feedback piezo-electric element 34 of a rectangular shape is adhered to an upper part on the left side of the first square pole 51 of the vibrator 20. Similarly, the feedback piezo-electric element 35 of a rectangular shape is adhered to an upper part on the right side of the second square pole 52 of the vibrator 20.

The feedback piezo-electric elements 34 and 35 detect, as a voltage, the vibration of the first and second square poles 51 and 52 produced by the application of the AC voltage to the driver piezo-electric elements 32 and 33.

The detector piezo-electric elements 30 and 31 of the vibrator 20 of the second embodiment are adhered to the surfaces of the square poles in the same direction, such that their directions of polarization are different relative to each other.

When the Coriolis force is exerted on the square poles 51 and 52 of the above constitution, the square poles 51 and 52 vibrate in directions which are different from each other. Therefore, the detector piezo-electric elements 30 and 31 detect the vibration of the square poles 51 and 52 due to Coriolis force.

When the vibrator 20 itself is oscillated due to external vibration or the like, the square poles 51 and 52 vibrate in the same direction.

Here, however, since the detector piezo-electric elements 30 and 31 have been provided so that their directions of polarization are opposite to each other, the detect signals are output in such a manner as to cancel each other.

This makes it possible to cancel external noise factors that are applied to the vibrator 20 from outside.

In the second embodiment, the driver piezo-electric elements 32 and 33, detector piezo-electric elements 30 and 31, and feedback piezo-electric elements 34 and 35 have the same size measurements 13 mm×2.62 mm in the vertical direction and lateral direction, and 0.4 mm in thickness.

Moreover, the driver piezo-electric element 32 and the detector piezo-electric element 30 are disposed so as to be spaced apart by 2 mm in the axial direction of the first square pole 51. Similarly, the driver piezo-electric element 33 and the detector piezo-electric element 31 are disposed so as to be spaced apart by 2 mm in the axial direction of the second square pole 52.

Next, the circuit 25 shown in FIG. 4 will be described in detail.

Figure 7:
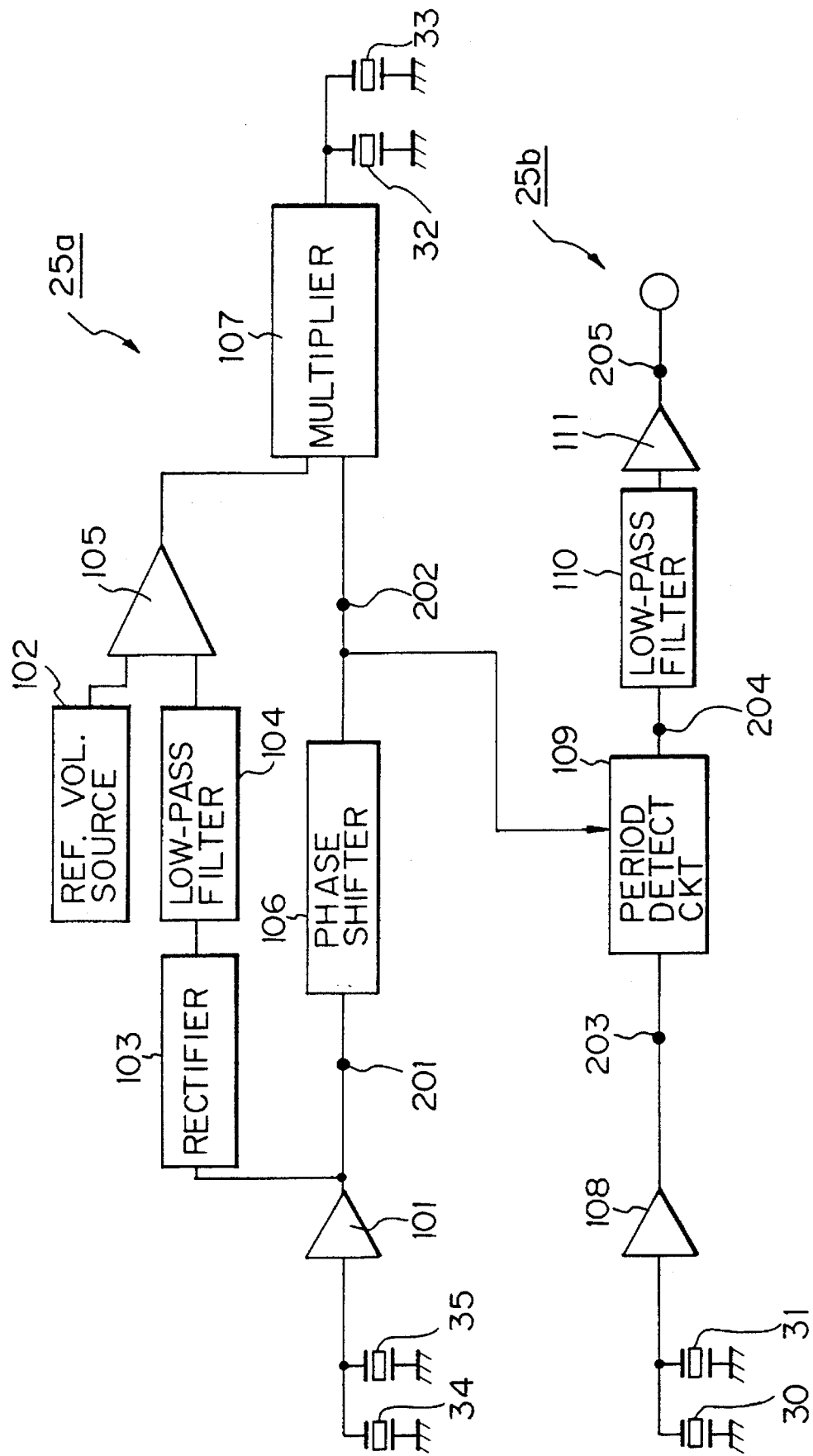
FIG. 7 is a circuit diagram of the angular velocity sensor according to the second embodiment.

FIG. 7 illustrates major portions of the circuit 25.

This circuit 25 includes a feedback circuit 25a for feedback piezo-electric elements 34 and 35, and an angular velocity detecting circuit 25b that obtains an angular velocity output from the detect signals of detector piezo-electric elements 30 and 31.

The feedback circuit 25a comprises an amplifier 101, a rectifier 103, a low-pass filter 104, a reference voltage source 102, a differential amplifier 105, a phase-shifting circuit, and a multiplier 107.

The angular velocity detecting circuit comprises an amplifier 108, a period detecting circuit 109, a low-pass filter 110, and an amplifier 111.

Operation of the circuit 25 will be described next.

Described first is the feedback circuit 25a.

Outputs of the feedback piezo-electric elements 34 and 35 are amplified through the amplifier 101 and are input to the phase-shifting circuit 106 to generate oscillation at a resonance point of the vibrator 20.

The output of the amplifier 101, on the other hand, is converted into a DC voltage that corresponds to the output amplitudes of the feedback piezo-electric elements 34 and 35, and than passes through the rectifier 103 and low-pass filter 104. In order to set the output amplitudes of the feedback piezo-electric elements 34 and 35 to be constant, the output of the low-pass filter 104 and the output of the reference voltage source 102 are amplified in a differential manner through the differential amplifier 105.

The differentially amplified signal is multiplied by the output of the phase-shifting circuit 106 through the multiplier 107.

The thus multiplier signal is applied to the drive piezo-electric elements 32 and 33.

Thus, the vibrator 20 is self-excited so that the amplitude becomes constant.

Described below is the angular speed detecting circuit 25b.

Outputs of the detector piezo-electric elements 30 and 31 are amplified through the amplifier 108 and their periods are detected by the period detecting circuit 109 based on the phase of the phase-shifting circuit 106. The outputs then pass through the low-pass filter 110 and the amplifier 111, enabling the output proportional to the angular velocity to be detected.

Figure 8:
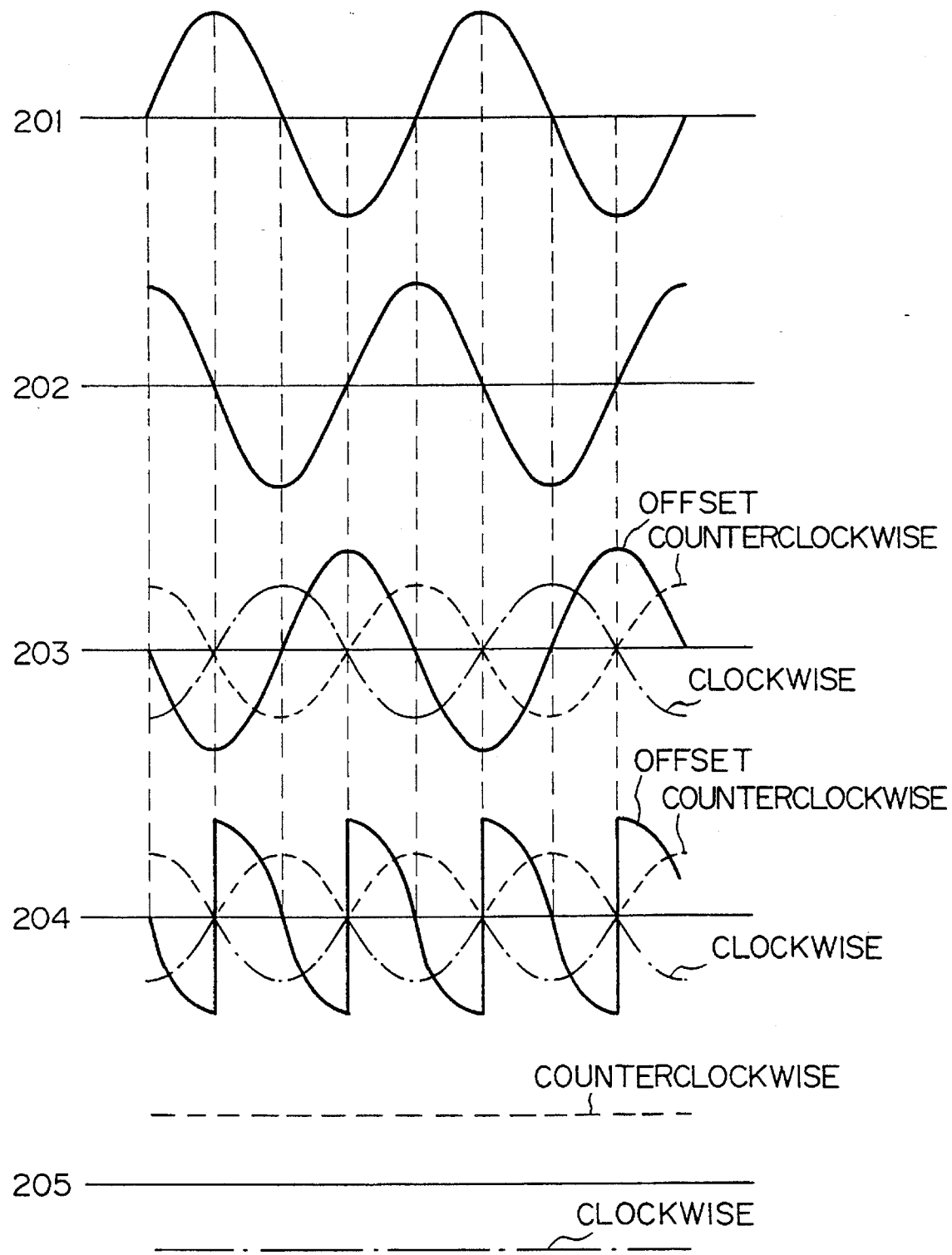
FIG. 8 is a diagram of waveforms of the circuit of FIG. 7.

FIG. 8 illustrates waveforms at points 201 to 205 of FIG. 7, from which it will be learned that the output waveform 201 of the amplifier 101 and the output waveform 202 of the phase-shifting circuit 106 are deviated in phase from each other by 90 degrees.

The output waveform 203 of the amplifier 108 contains voltages that are generated by the offset outputs from the detector piezo-electric elements 30, 31, clockwise angular velocity and counterclockwise angular velocity. In FIG. 8, the clockwise or counterclockwise signal is indicated by a dotted line.

Reference numeral 204 represents a signal obtained by detecting the period of the signal of the output waveform 203 based on the phase of the output waveform 202 of the phase-shifting circuit 106, i.e., represents the output waveform of the period detecting circuit 109.

The output waveform 204 contains no DC component that is generated by the offset but contains a positive output generated by the counterclockwise angular velocity and a negative output generated by the clockwise angular velocity.

Reference numeral 205 denotes the waveform of an angular velocity output that has finally passed through the low-pass filter 110 and the amplifier 111.

Described below is the reason why the detector piezo-electric elements 30 and 31 are provided at portions under the driver piezo-electric elements 32 and 33 in the vibrator 20 of the second embodiment.

Figure 9:
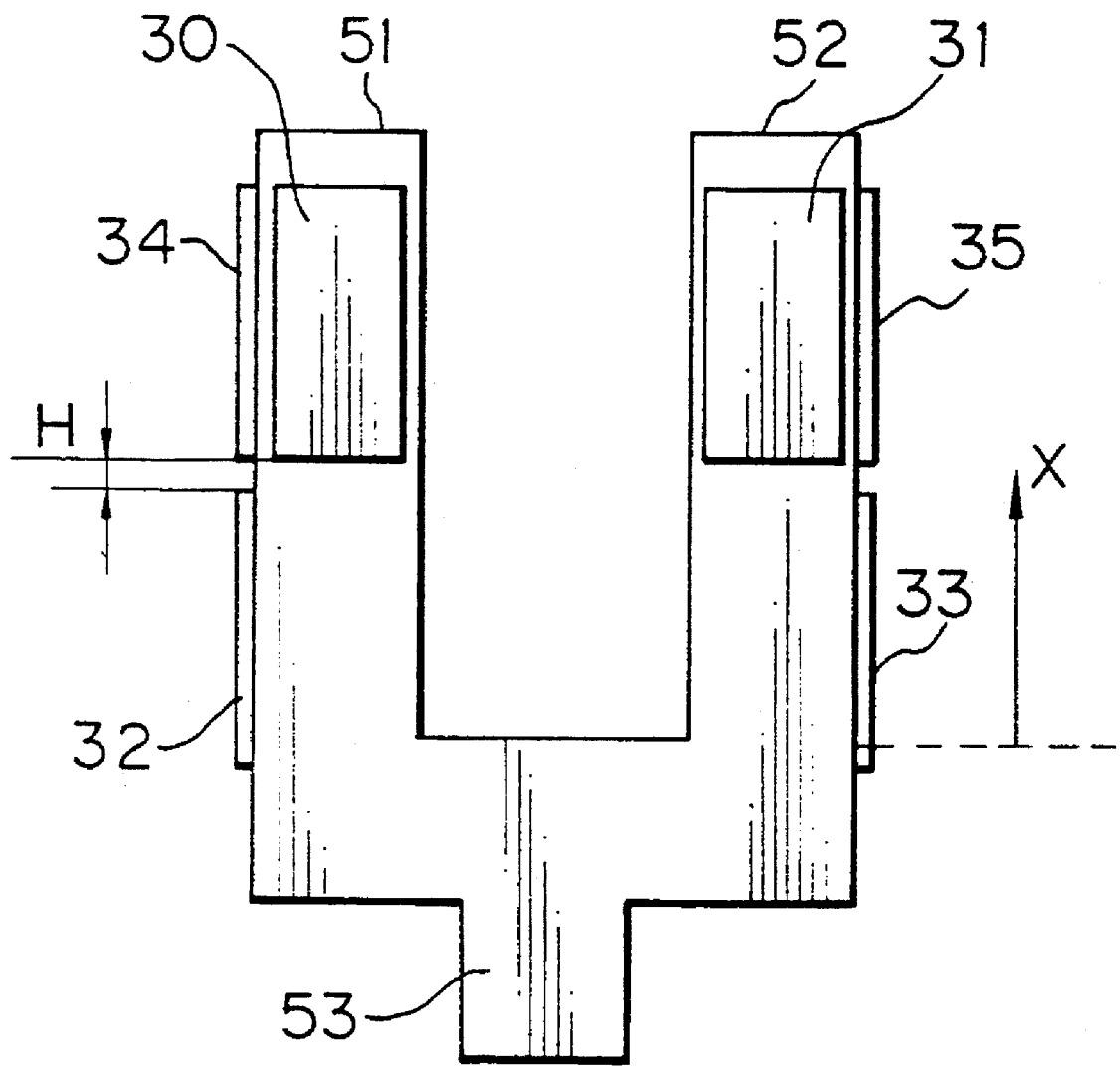
FIG. 9 is a diagram for explaining the features of the second embodiment.

FIG. 9 is a front view of the vibrator 20 according to the second embodiment.

Figure 10A:
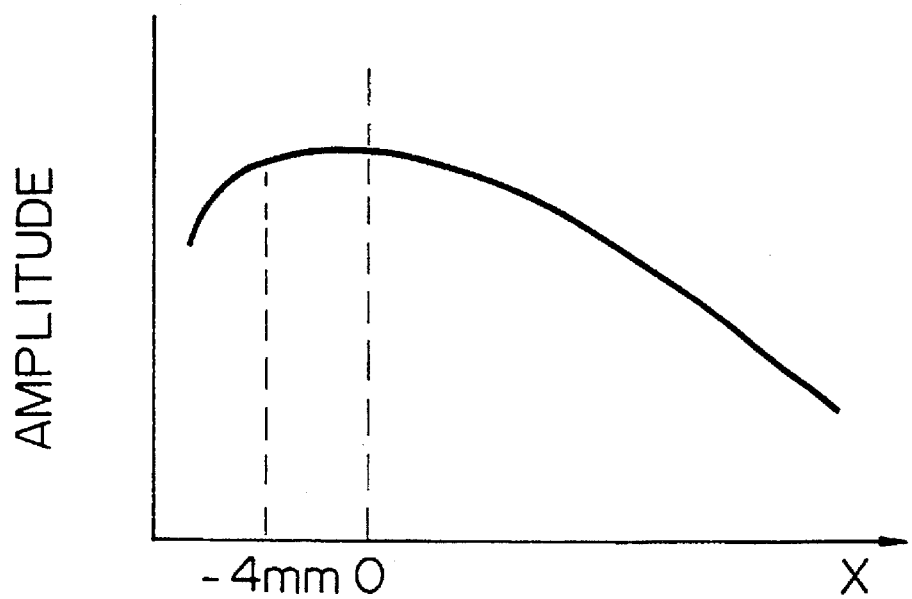
FIGS. 10(A) and 10(B) are diagrams of characteristics for explaining the features of the second embodiment.
Figure 10B:
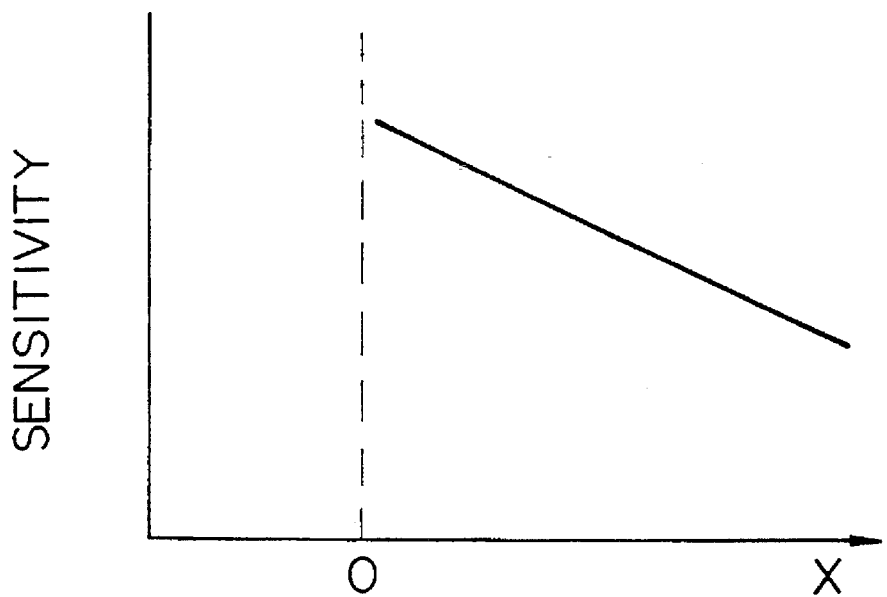

Here, the root portions of the first square pole 51 and the second square pole 52 of the vibrator 20 are presumed to be a point 0. FIGS. 10(A) and 10(B) illustrate variations of their sensitivities and amplitudes with respect to the positions of the detector piezo-electric elements 30, 31 and of the driver piezo-electric elements 32, 33 with the point 0 as a reference position.

As will be obvious from FIGS. 10(A) and 10(B), the sensitivity increases as the positions of the detector piezo-electric elements 30 and 31 approach the point 0 of the vibrator 20.

Furthermore, the amplitude increases as the driver piezo-electric elements 32 and 33 approach the point 0. The amplitude almost does not change even when the driver piezo-electric elements 32 and 33 are provided at positions under the point 0 provided their positions are within 4 m from the point 0, but the amplitude drastically decreases when their positions are separated away from the point 0 by more than 4 mm.

It will be understood from FIGS. 10(A) and 10(B) that favorable characteristics are obtained as long as the detector piezo-electric elements 30, 31 and the driver piezo-electric elements 32, 33 are located closer to the point 0 of the vibrator 20. It can be further understood that the driver piezo-electric elements 32 and 33 can be provided at positions under the point 0 instead of the detector piezo-electric elements 30 and 31.

The present inventors have also taken into consideration the distribution of stress that is generated in the vibrator 20.

Figure 48:
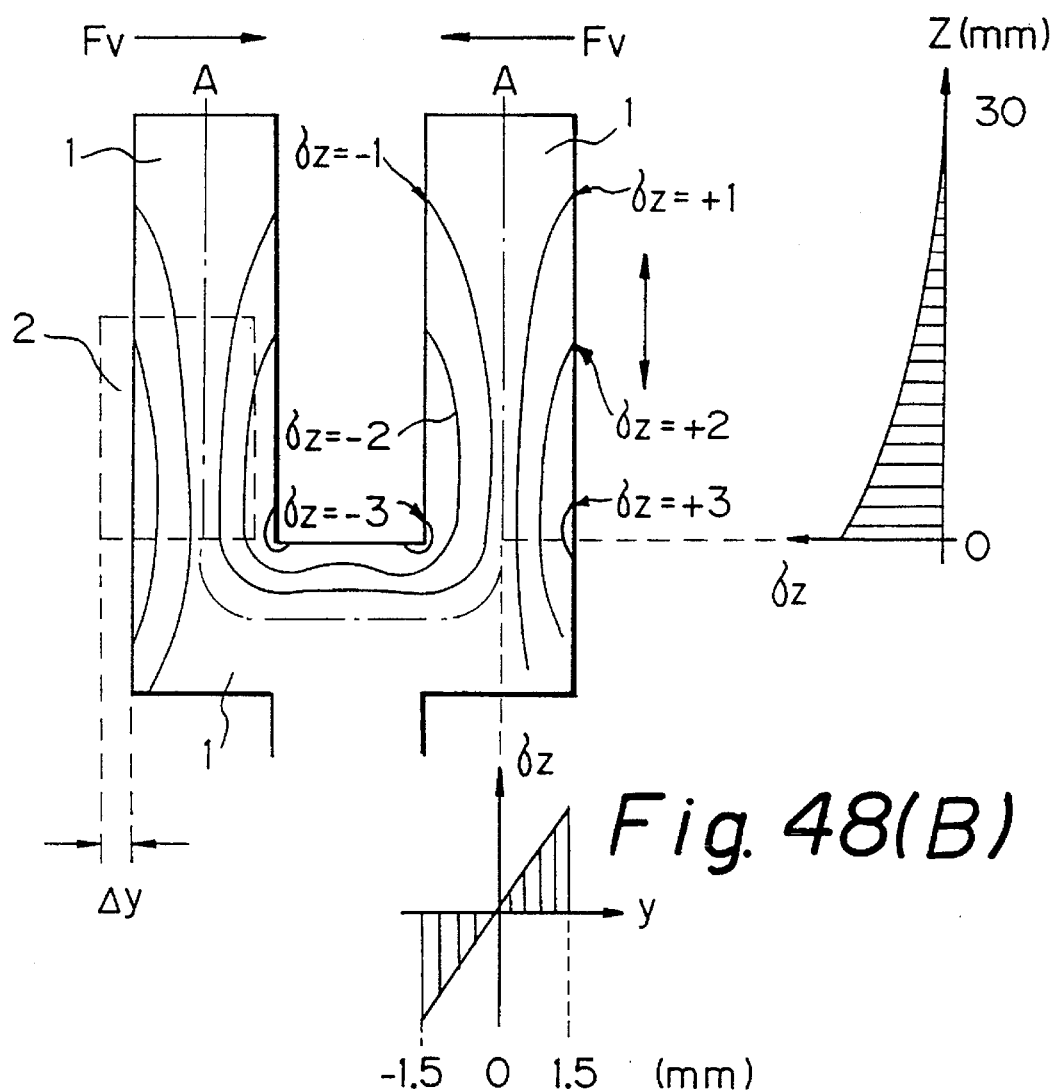
FIGS. 48(A), 48(B) and 48(C) are diagrams illustrating the conditions of stress generated in the angular velocity sensor when the square poles are bent and vibrated by the driver piezo-electric elements.

That is, in the angular velocity sensor of the present invention which is shown in FIG. 48 and as will be described later, the stress is generated much near the root portions (near the point 0) of the vibrator 20.

When provided at places where the stress is concentrated, therefore, the detector piezo-electric elements 30 and 31 also detect the stress, making it difficult to correctly measure the angular velocity.

That is, it is not desirable to provide the detector piezo-electric elements 30 and 31 near the point 0 as they detect noise due to the concentration of stress.

For the above-mentioned reasons according to the second embodiment, the detector piezo-electric elements 30 and 31 are provided at upper portions of the square poles and the driver piezo-electric elements 32 and 33 are provided at lower portions of the square poles.

According to the second embodiment, furthermore, the driver piezo-electric elements 32 and 33 are located at positions lower than the point 0 by 4 mm in order to bring the detector piezo-electric elements 30 and 31 as close to the point 0 as possible.

Furthermore, a distance K of 2 m is maintained between the lower sides of the detector piezo-electric elements 30, 31 and the upper sides of the driver piezo-electric elements 32, 33.

This is because, when the distance is smaller than 1 mm, the detector piezo-electric elements 30 and 31 detect the effect of the driver piezo-electric elements 32 and 33.

(Third embodiment)

The above-mentioned embodiment dealt with an angular velocity sensor of the type of square pole tuning fork. The invention, however, can also be applied to a sensor of the tuning piece type as shown in FIGS. 11 and 12.

Figure 11:
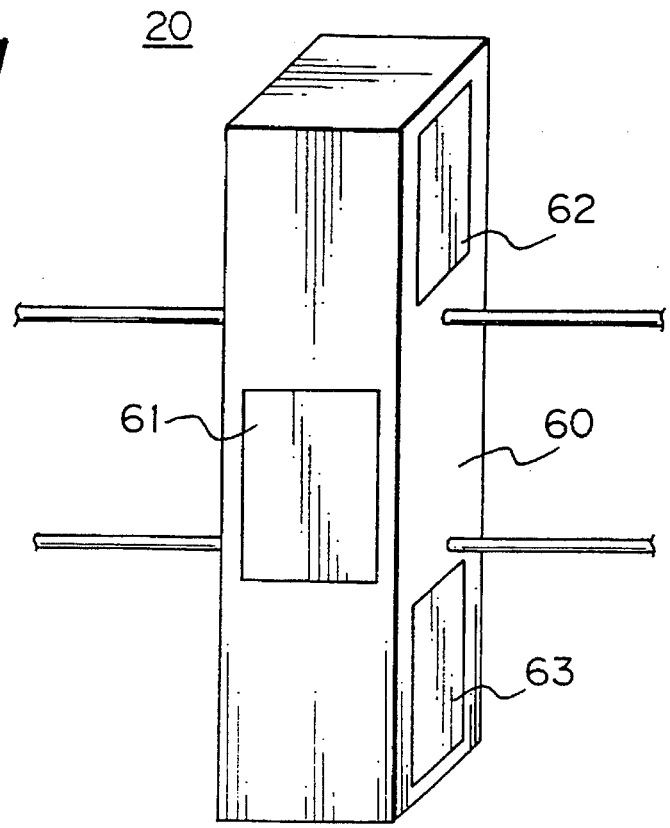
FIG. 11 is a perspective view of an angular velocity sensor for explaining a third embodiment.

That is, as shown in FIG. 11, a driver piezo-electric element 61 is adhered to a central portion on the front surface of a square pole 60. Then, detector piezo-electric elements 62 and 63 are adhered to upper and lower portions on the right-side surface of the square pole 60.

Figure 12:
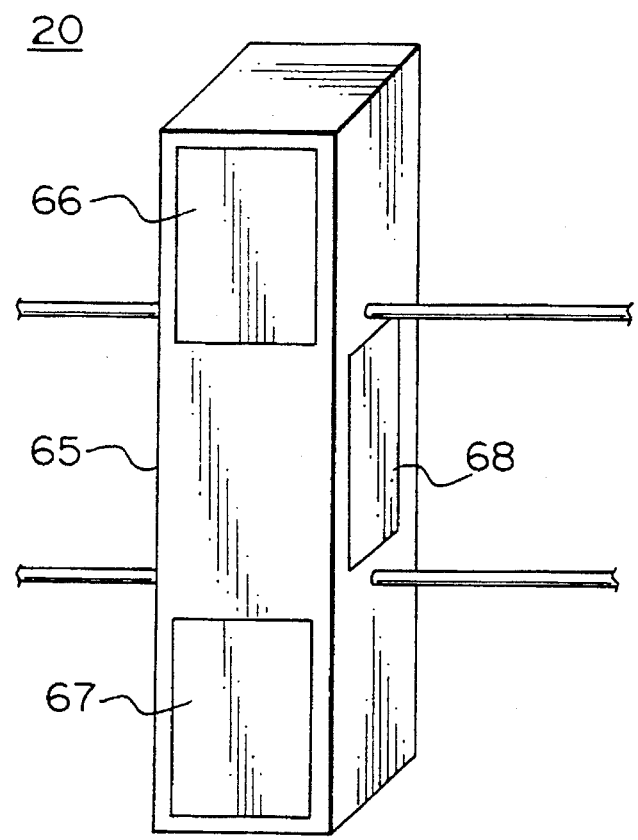
FIG. 12 is a perspective view of an angular velocity sensor for explaining the third embodiment.

As shown in FIG. 12, furthermore, driver piezo-electric elements 66 and 67 are adhered to upper and lower portions on the front surface of the square pole 65, and a detector piezo-electric element 68 is adhered to a central portion on the right-side surface of the square pole 65.

(Fourth embodiment)

Figure 13A:
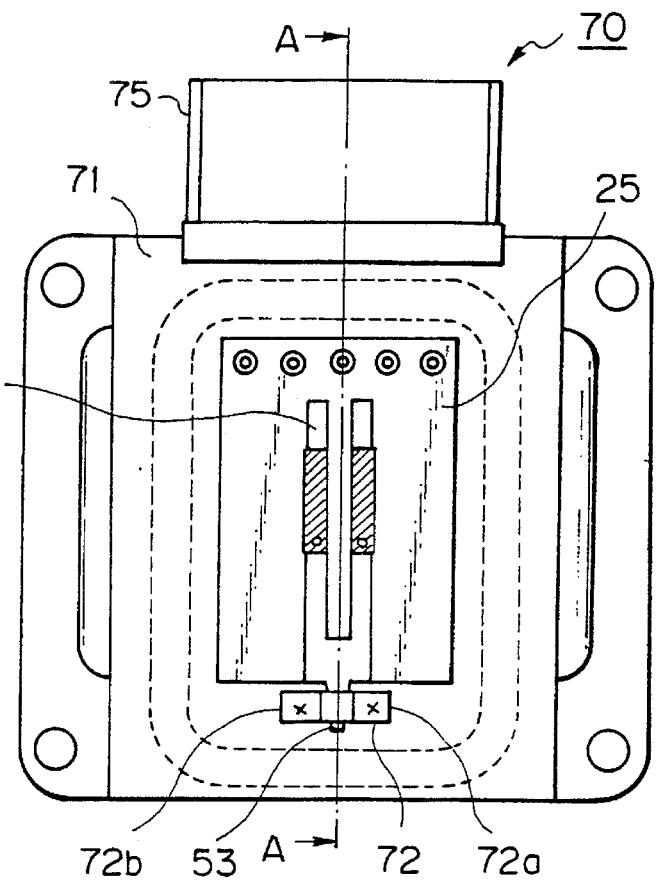
FIGS. 13(A), 13(B) and 13(C) are diagrams of the angular velocity sensor for explaining a fourth embodiment.
Figure 13B:
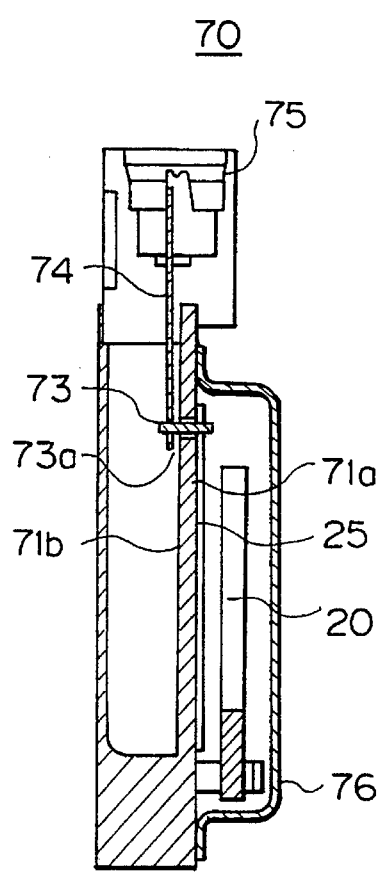
Figure 13C:
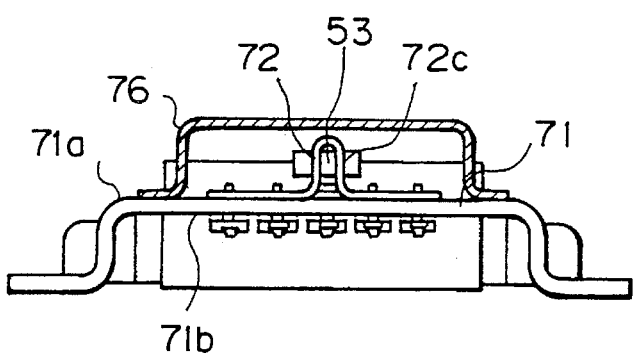

A fourth embodiment deals with another structure for mounting the vibrator 20 of the present invention. FIGS. 13(A) to 13(C) illustrate an angular velocity sensor 70 having the vibrator 20 according to the fourth embodiment. The feature of the fourth embodiment is that the vibrator 20 and the circuit 25 are provided in parallel with each other. The constitution of the angular velocity sensor 70 will now be described in detail.

The angular velocity sensor 70 has the circuit 25 and the vibrator 20 that are provided in parallel on a stay 71.

That is, a clamp 72 is so provided as to hold the support portion 53 of the vibrator 20, and both ends 72a and 72b of the clamp 72 are spot-welded to the stay. Furthermore, a holding portion 72c of the clamp 72 is spot-welled to the support portion 53 of the vibrator 20, so that the clamp 72 and the support portion 53 are firmly secured together.

Owing to this constitution, the vibrator 20 is fixed onto one surface 71a of the stay 71.

Furthermore, the circuit 25 is disposed between the stay 71 and the vibrator 20, i.e., provided on one surface 71a of the stay 72.

The detect signal of the vibrator 20 is fed to the circuit 25 through a signal-drawing wire that is not shown.

The signal processed by the circuit 25 is guided to the other surface 71b of the stay 71 through a pin 73. The signal processed by the circuit 25 is guided to a processing circuit that is not shown via the pin 73, lead wire 74 and connector 75.

A covering 76 is fixed onto one surface 71a of the stay 71 with its whole circumference being welded so as to cover the vibrator 20 and the circuit 25.

Owing to the hermetic sealing provided for the covering 76, stay 71 and pin 73, the vibrator 20 and the circuit 25 are not directly affected by the open atmosphere.

The constitution of the fourth embodiment makes it possible to provide the vibrator 20 and the circuit 25 in parallel and close to each other. Therefore, the detect signal of the vibrator 20 is transmitted to the circuit 25 over the shortest distance, and the constitution is realized in a small size and the effect of noise signals from the outside is minimized.

(Fifth embodiment)

Figure 14A:
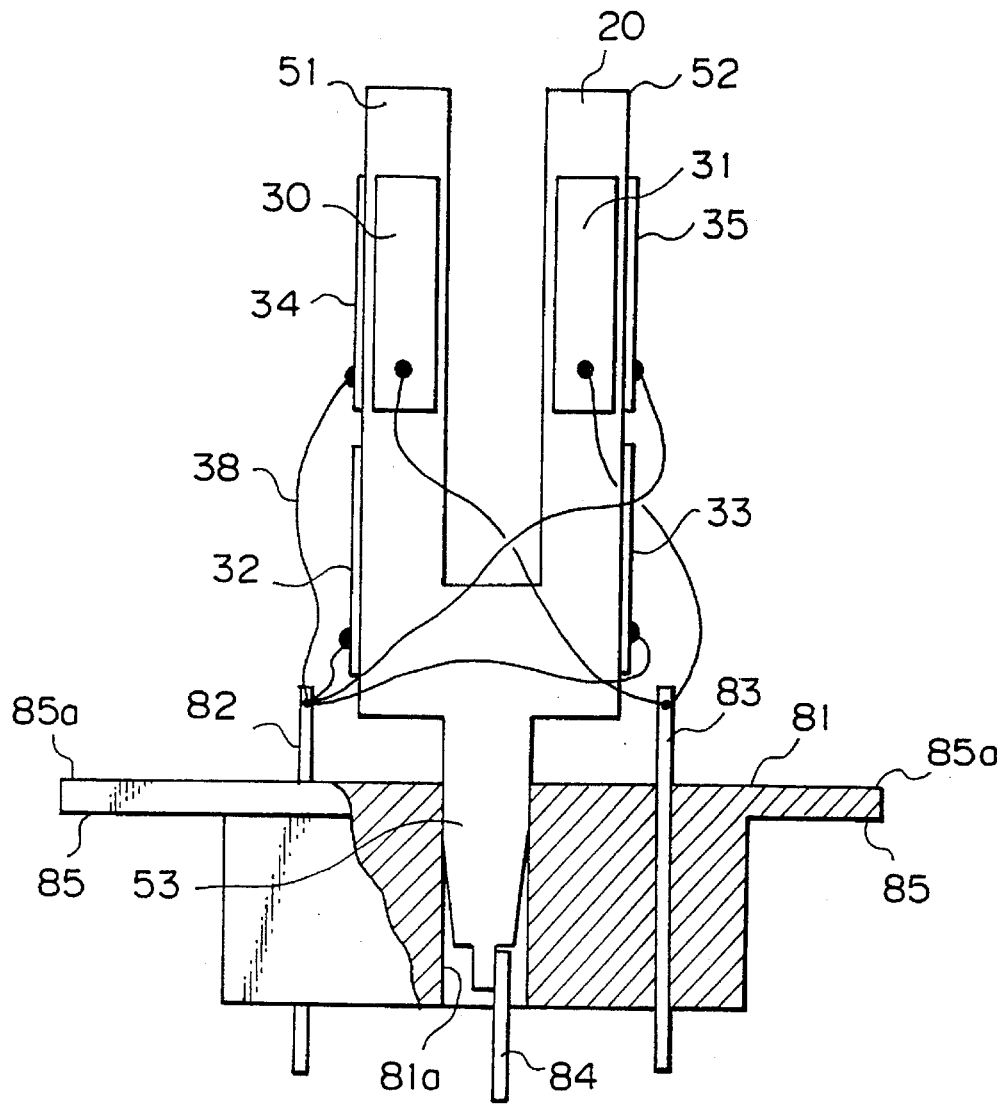
FIGS. 14(A) and 14(B) are schematic diagrams of the angular velocity sensor for explaining a fifth embodiment.
Figure 14B:
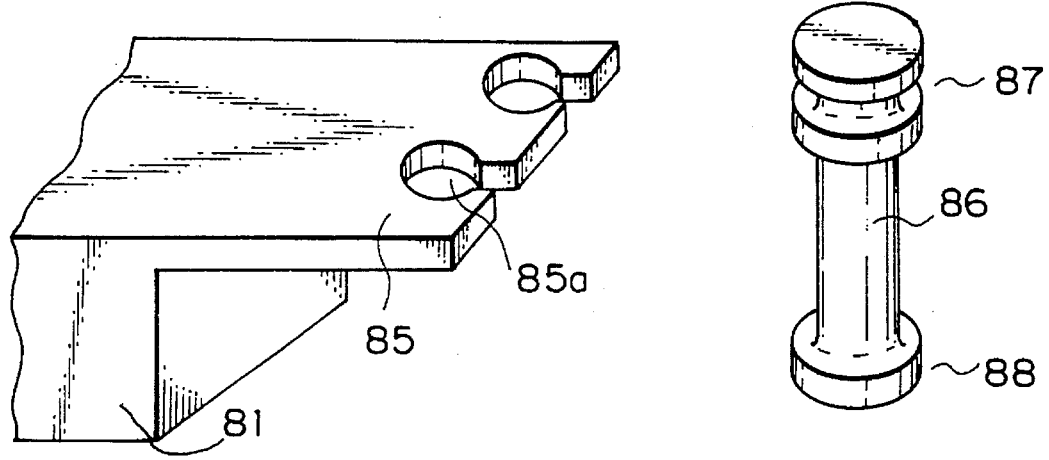

The fifth embodiment describes another structure for supporting the vibrator 20 with reference to FIGS. 14(A) and 14(B).

The vibrator 20 is held with its support portion 53 being forcibly introduced into a fitting hole formed in a housing 81.

The housing 81 has terminals 82 which are formed by the insert-molding. To the terminals 82 the signal-drawing lead wires are connected by soldering so that signals of the drive piezo-electric elements 32, 33 and signals of the feedback piezo-electric elements 34, 35 can be transmitted thereto. Moreover, the signal-driving wires are connected to the terminals 83 by soldering so that signals of the detector piezo-electric elements 30 and 31 can be transmitted thereto.

With the above-mentioned constitution, the signals are taken out to the outside through the terminals 82 and 83.

The ground output of the vibrator 20 is taken out to the outside through a ground terminal 84 that is connected to the vibrator 20 by means such as spot-welding.

A flange portion 85 having a round cut-away hole 85a is formed on both wings of the housing 81. Into the round hole 85a is fitted a fixing portion 87 that is made of a material such as rubber or the like and that is provided at one end of the support member 85. Moreover, a fixing portion 88 provided at the other end of the support member 86 is fitted to a casing that is not shown.

In the constitution as described above, the seat on the side of the casing that is not shown and the housing 81 are fastened together via the support member 86.

(Sixth embodiment)

Figure 15:
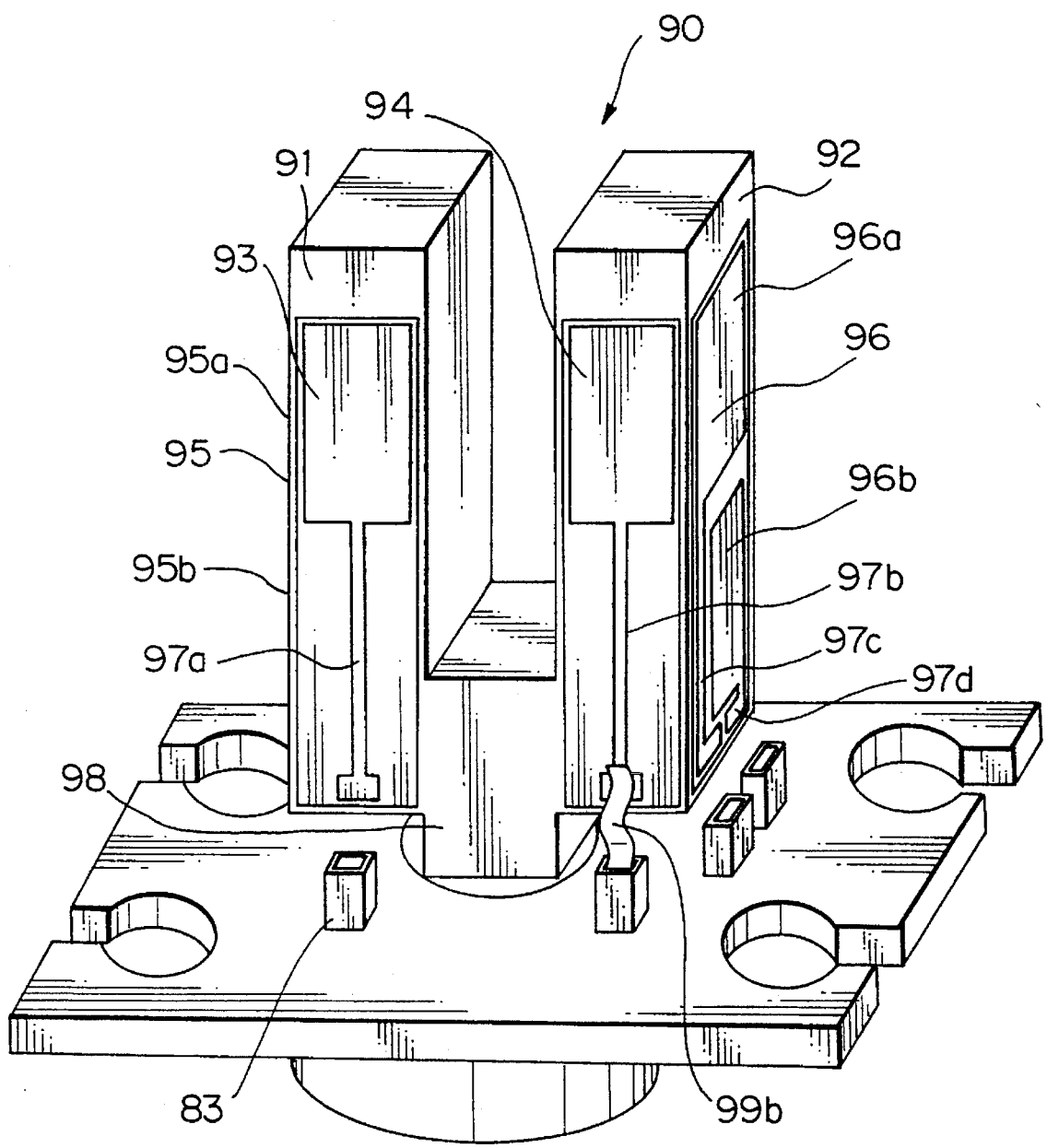
FIG. 15 is a schematic diagram of the angular velocity sensor for explaining a sixth embodiment.

In the sixth embodiment of the present invention shown in FIG. 15, a feature residues in the piezo-electric elements provided on the vibrator and in an electrode pattern formed on the piezo-electric elements.

That is, to a vibrator 90 are adhered detector piezo-electric elements 93, 94 and drive/feedback piezo-electric elements 95, 96 having the same width as the width of surfaces of one side of a first square pole 91 and a second square pole 92 that constitute the vibrator 90.

The electrodes are patterned on the drive/feedback piezo-electric elements 95 and 96 using an Ag paste or the like. Due to this patterning, feedback portions 95a, 96a and drive portions 95a, 96b are formed on the surfaces of the drive/feedback piezo-electric elements 95 and 96. Inputs to and outputs from the piezo-electric elements 93 to 96 are drawn near to the support portion 98 of the vibrator 90 via the Ag paste or the like and the signal-drawing electrodes 97a to 97d which are patterned.

From this point, the signals are taken to the outside of the housing 81 via flexible plate-like resilient electrodes 99a to 99d (99b only is diagrammed).

In this embodiment, the resilient electrodes 99 are connected via terminals 83 that are formed on the housing 81. The resilient electrodes 99, however, may be directly formed on the housing 81.

In the vibrator 90 of the sixth embodiment, the detector piezo-electric elements are adhered at positions over the drive piezo-electric elements. There is, however, no particular limitation and what is important is that the detector piezo-electric elements should not be opposed to the driver piezo-electric elements.

(Seventh embodiment)

The seventh embodiment is concerned with processing the signals from the vibrator.

The Coriolis force is expressed by,

F=Zm$\Omega$×V $\Omega$: input angular velocity,

V: velocity at the tip of the vibrator.

If the displacement 1 of the vibrator is given as,

1=L·sin wt

L: maximum displacement of the vibrator, w: resonance angular frequency of the vibrator, then, the tip speed V is given as, V=dl/dt=L·w·cos wt and the Coriolis force is given as F=Zn$\Omega$×L·w·wswt Therefore, if the amplitude L at the tip is maintained constant, then a voltage is generated which is proportional to the input angular velocity $\Omega$.

In the second embodiment shown in FIG. 7, therefore, the feedback piezo-electric elements 34 and 35 are so controlled that their outputs are maintained constant.

Figure 16:
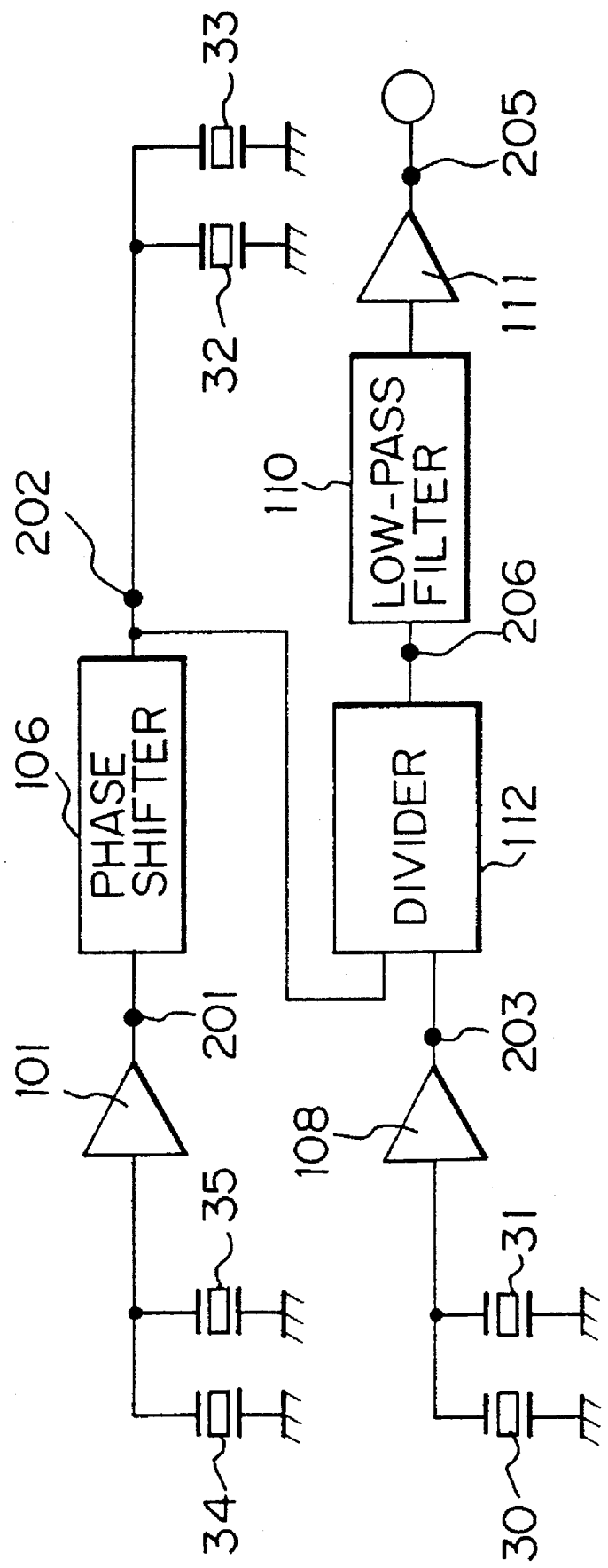
FIG. 16 is a circuit diagram for explaining a seventh embodiment.

The seventh embodiment shown in FIG. 16 does not need the amplitude to be controlled.

The principle is that the outputs of the detector piezo-electric elements 30 and 31 instead of that of the period detecting circuit 109 are divided by the outputs which are obtained by shifting by 90 degrees the phases of the outputs of the feedback piezo-electric elements 34 and 35 through the divider 112, so as not to be affected by the displacement L of the vibrator.

The division is carried out as described below. First, the displacement 1 is shifted in phase by 90 degrees to be 1', i.e., $$1'=L \cdot \sin(wt+\pi/2)=L \cos wt$$

Then, the division becomes, $$\frac{F}{l'} = \frac{Zm\Omega \times Lw \times \cos \times wt}{L \times \cos \times wt} = Zm\Omega \times w$$

which is no larger relevant to L, and the amplitude needs not be controlled.

Figure 17:
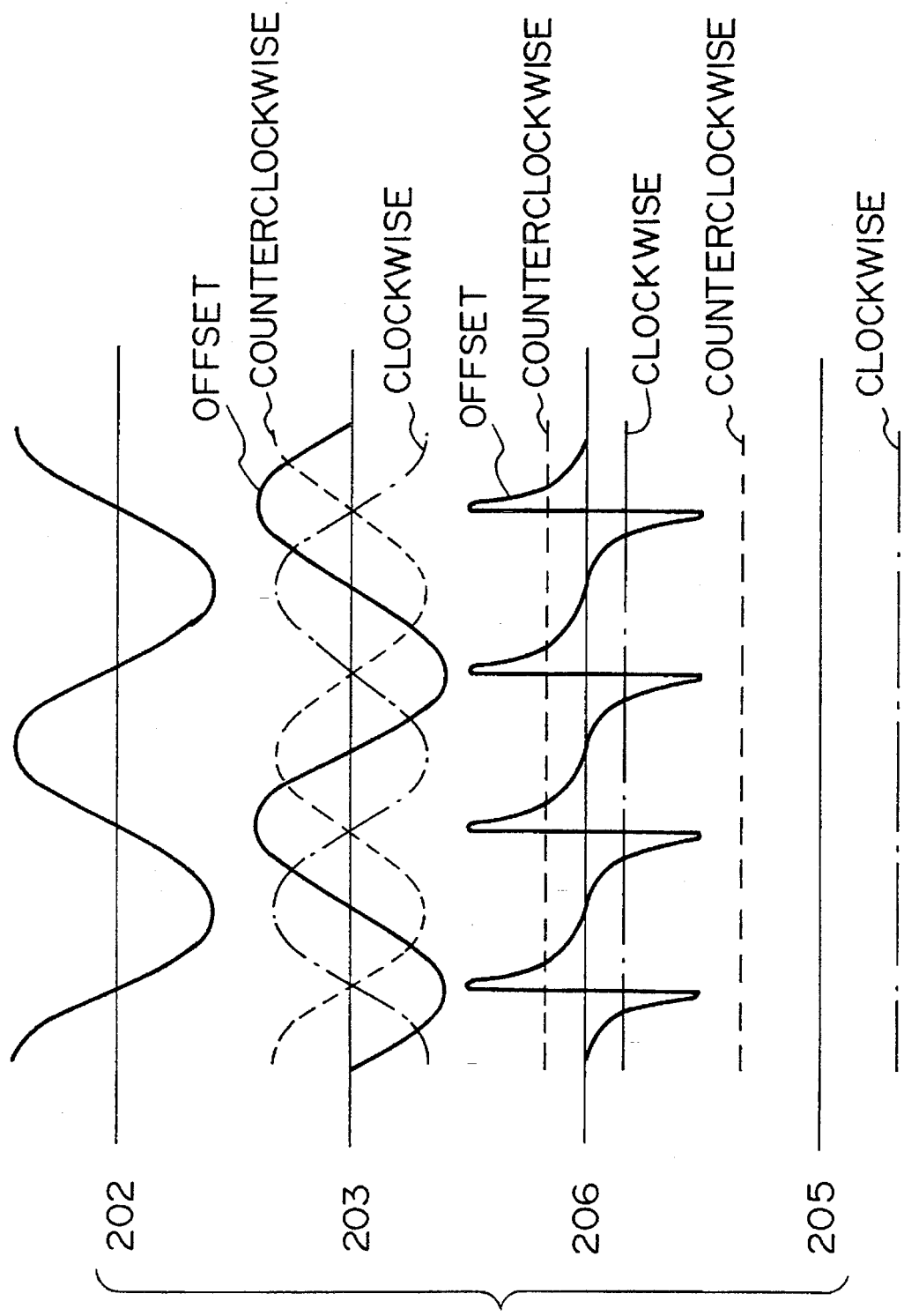
FIG. 17 is a diagram of waveforms of the circuit for explaining the seventh embodiment.

FIG. 17 shows waveforms at portions 202 to 205 in the embodiment of FIG. 15.

(Eight embodiment)

Figure 18:
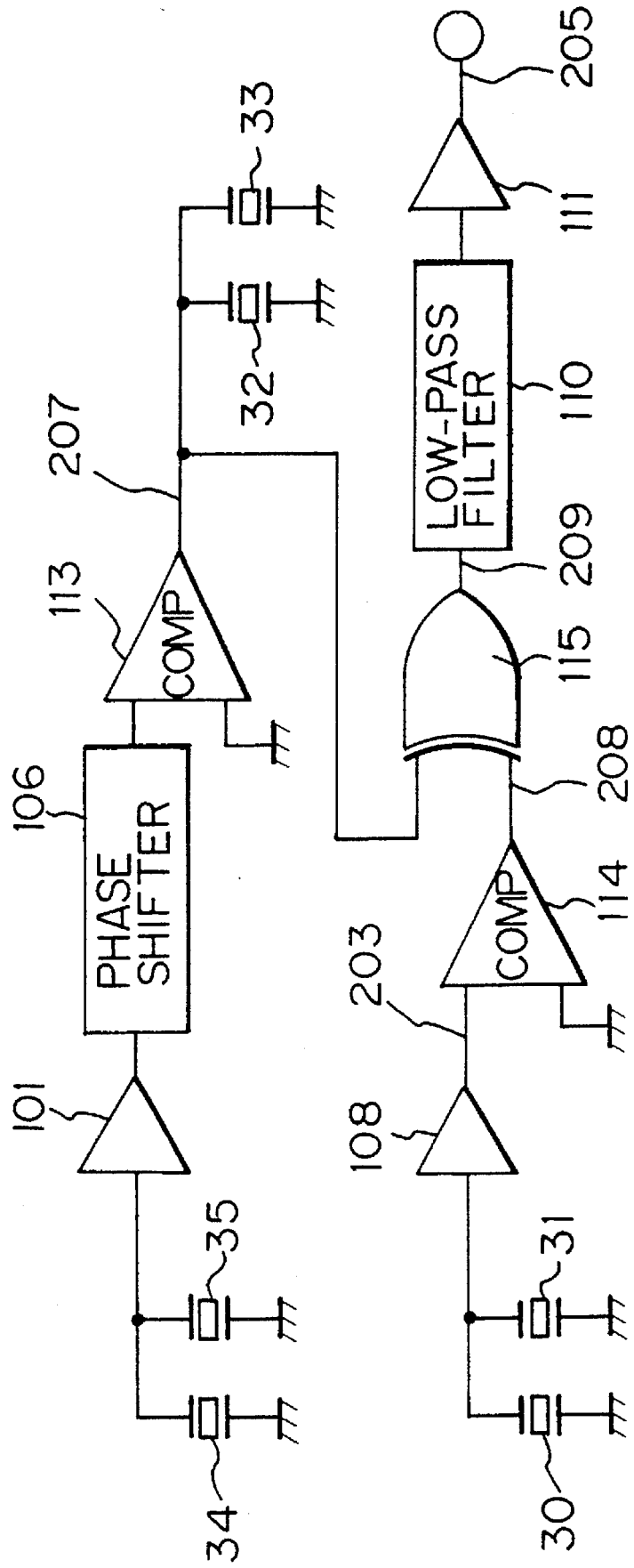
FIG. 18 is a circuit diagram for explaining an eighth embodiment.

FIG. 18 illustrates a processing circuit that does not require amplitude control. This is accomplished by trimming the detector piezo-electric elements with a laser to obtain a suitable offset voltage.

If now, $$V_{OF}=V_{OF} \cdot \cos wt$$
$$Vw=Vw \cdot \sin wt,$$

then the output Vs of the detector piezo-electric element 2 is given as, $$Vs=V_{of}+Vw=V_{OF} \cdot \cos wt + Vs \cdot \sin wt$$

Here, if $V_{OF} \gg Vw$, then, $$Vs \approx V_{OF} \cos(wt+\Delta\phi)$$

The, $\Delta\phi$ that is detected corresponds to the input angular velocity.

In FIG. 18, outputs of the feedback piezo-electric elements 34 and 35 are amplified through the amplifier 101. The phases are then shifted by 90 degrees through the phase-shifting circuit 106, and the signals are converted into digital signals through a comparator 113.

On the other hand, the outputs of the detector piezo-electric elements 30 and 31 are amplified through the amplifier 108 and are converted into digital signals through a comparator 114.

An EX-OR 115 of these signals is obtained and is passed through the low-pass filter 110 and the amplifier 111 to obtain an angular velocity output.

Figure 19A:
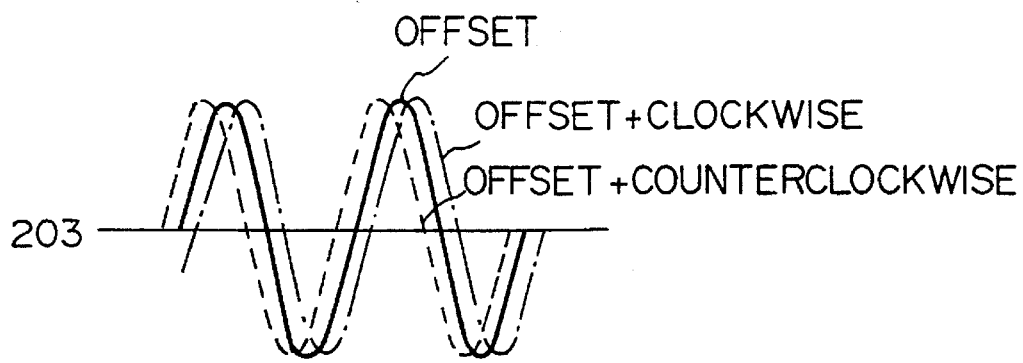
FIGS. 19(A) and 19(B) are diagrams of waveforms of the circuit for explaining the eighth embodiment.
Figure 19B:
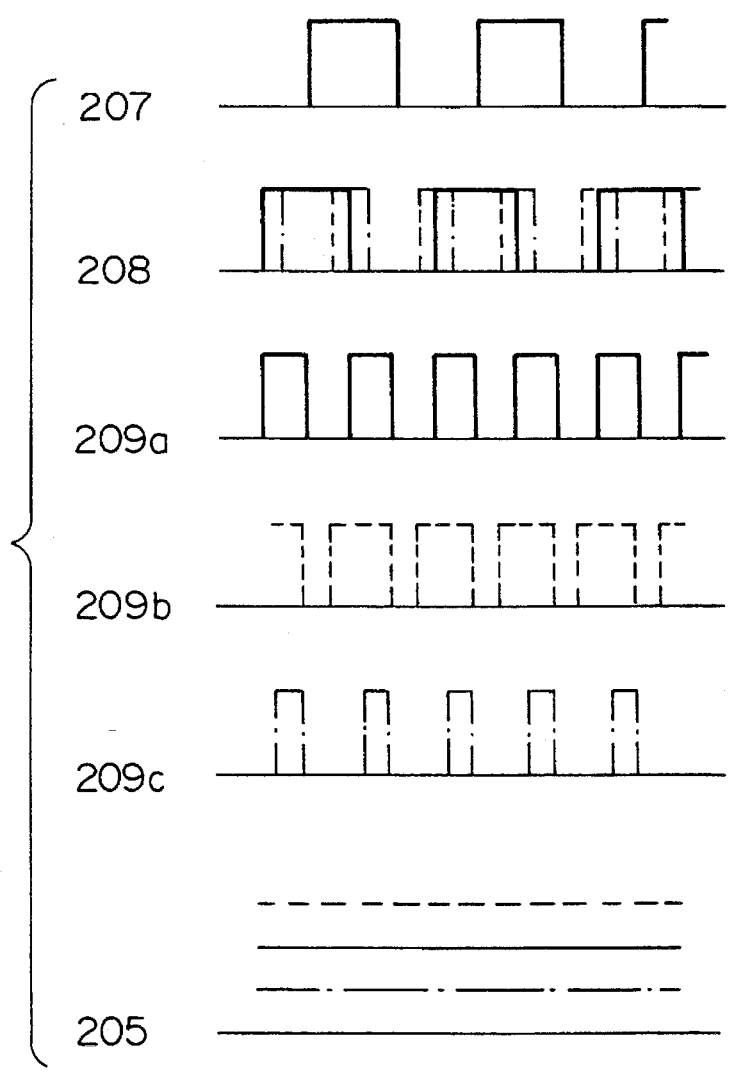
Figure 20:
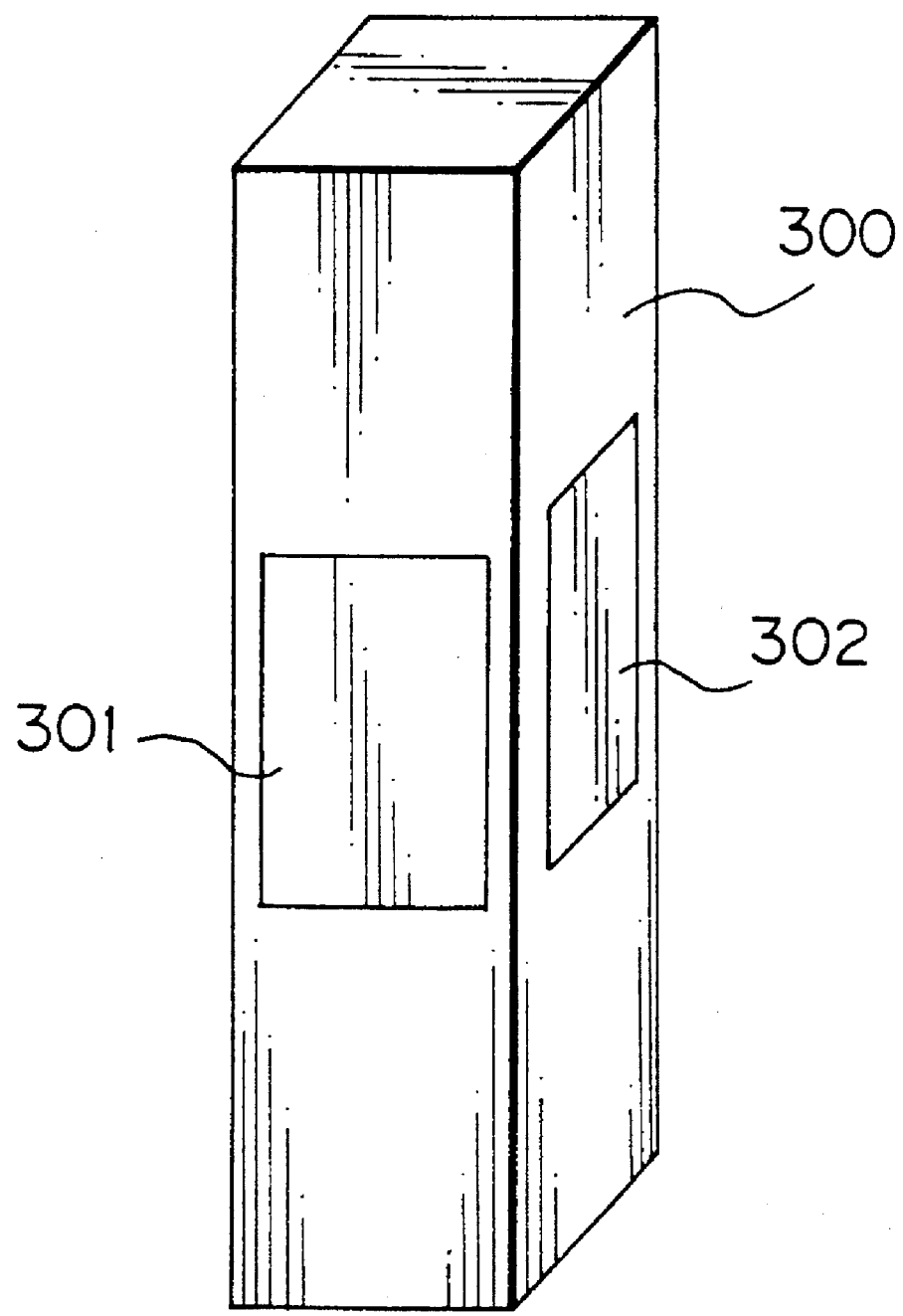
FIG. 20 is a perspective view of a conventional angular velocity sensor.
Figure 21:
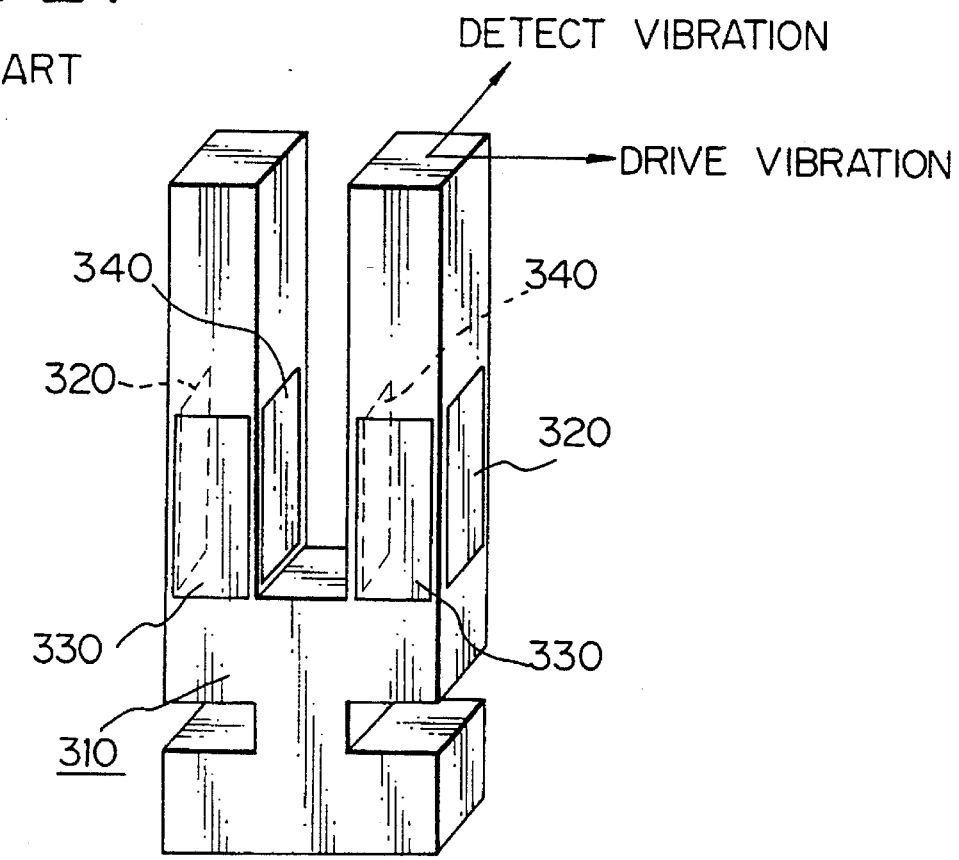
FIG. 21 is a perspective view of a conventional angular velocity sensor.
Figure 22:
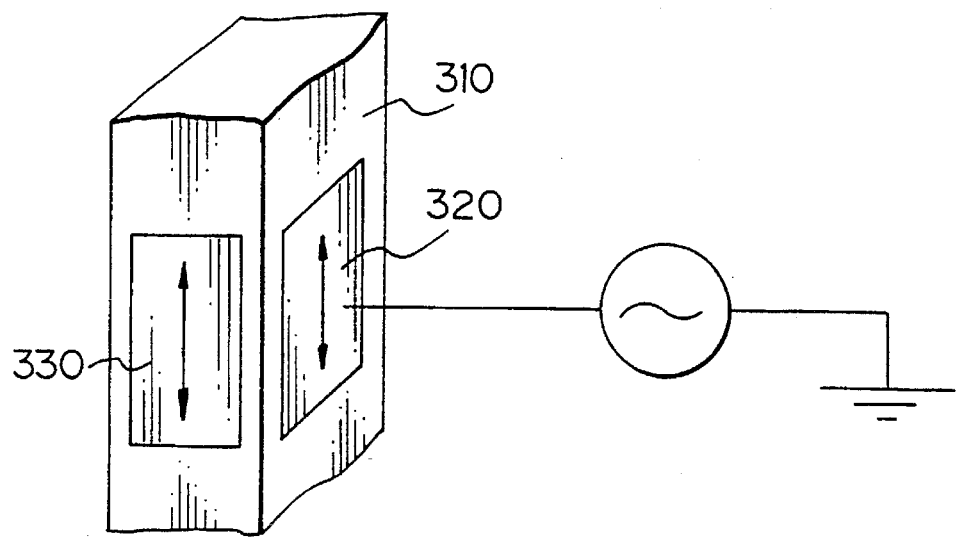
FIG. 22 is a model diagram for explaining the action by the conventional arrangement of piezo-electric elements.

FIGS. 19(A) and 19(B) illustrate waveforms at portions 203, 205, 207, 208 and 209 of the embodiment of FIG. 18.

For the offset, the digital signals 207 and 208 have phases that are deviated by 90 degrees from each other and, hence, a signal 209 becomes a digital signal having a duty cycle of 50%.

When the angular velocity of the left is input, the duty cycle becomes greater than 50% and the clockwise angular velocity makes the duty cycle smaller than 50%. The signal is passed through the low-pass filter 110 and the amplifier 111 to obtain an angular velocity signal.

Figure 23:
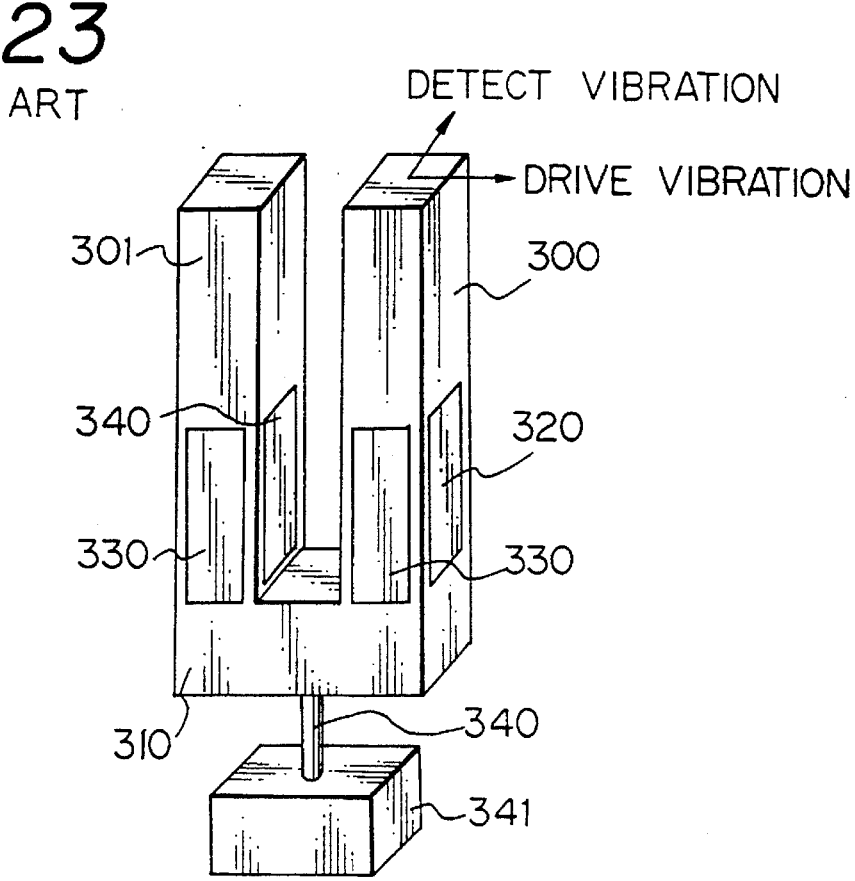
FIG. 23 is a perspective view illustrating a conventional angular velocity sensor.
Figure 24:
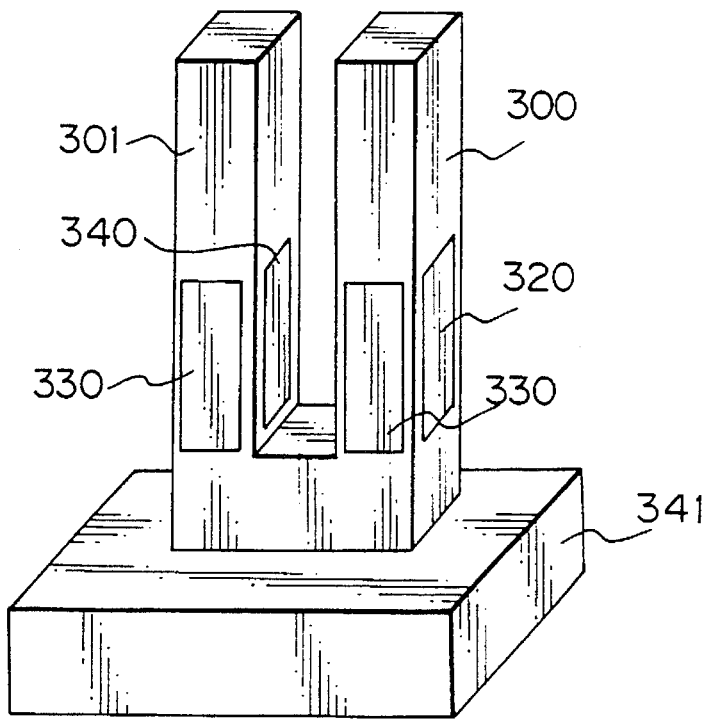
FIG. 24 is a perspective view illustrating a conventional angular velocity sensor.

The present inventors have conducted intensive study in order to solve the problem in that even with the aforementioned angular velocity sensor of the present invention, undesired vibration is generated in a support portion 340 when the sensor unit is supported by using a thin member such as a pin 340 having a circular shape in cross section as mentioned above and, particularly, as shown in FIG. 23 in a case where the vibrator is out of balance due to dispersion brought about during the step of production. That is, the vibrator is not firmly supported, vibration leaks so greatly that the vibrator is not efficiently vibrated, leakage of vibration adversely affects the offset signal output from the sensor and further undergoes a change depending upon the temperature causing a temperature drift offset to take place. The inventors have solved the above problem by employing a technical constitution that is described below.

That is, a first aspect is concerned with an angular velocity sensor employing a piezo-electric vibration gyro of the square pole tuning fork type in which two square poles are supported by a base portion via a support portion in the form of a square pole, and driver piezo-electric elements and detector piezo-electric elements are adhered to the surfaces of the square poles meeting at right angles, wherein vibration in the base portion is less than 1.5% of vibration in the square poles produced by the driver piezo-electric elements adhered thereto.

A second aspect is concerned with an angular velocity sensor employing a piezo-electric vibration gyro of the square pole tuning fork type in which two square poles are supported by a base portion via a support portion of the form of a square pole, and driver piezo-electric elements and detector piezo-electric elements are adhered to the surfaces of the square poles meeting at right angles, wherein the support portion has a width which is smaller than 5 millimeters.

A third aspect is concerned with an angular velocity sensor wherein the thickness of the support portion is nearly the same as the thickness of the square poles.

A fourth aspect is concerned with an angular velocity sensor wherein the width of the support portion lies within a range of smaller than 5 millimeters but larger than 0.5 millimeters.

A fifth aspect is concerned with an angular velocity sensor employing a piezo-electric vibration gyro of the square pole tuning fork type in which two square poles are supported by a base portion via a support portion in the form of a square pole, and driver piezo-electric elements and detector piezo-electric elements are adhered to the surfaces of the square poles meeting at right angles, wherein when the width of the support portion is A millimeters, the width of the square poles is B millimeters and the length of the support portion is C millimeters, a relationship, $$A \leq 0.4 \times C + B \tag{1}$$

is satisfied.

A sixth aspect is concerned with an angular velocity sensor employing a piezo-electric vibration gyro of the square pole tuning fork type in which two square poles are supported by a base portion via a support portion of the form of a square pole, and driver piezo-electric elements and detector piezo-electric elements are adhered to the surfaces of the square poles meeting at right angles, wherein when the width of the support portion is A millimeters, the width of the square poles is B millimeters and the length of the support portion is C millimeters, a relationship, $$0.4 \times C + B - 1 \leq A \leq 0.4 \times C + B + 1 \qquad (2)$$

is satisfied.

That is, employment of the above-mentioned technical construction makes it possible to reliably support the vibrator even when it is out of balance and to realize an angular velocity sensor which efficiently produces vibration while permitting vibration to leak only slightly.

Concretely speaking, the vibrator can be stably supported by setting the width of the support member to be smaller than 5 millimeters or by employing dimensions that satisfy the above-mentioned relation (1) or (2).

That is, the vibration energy can be efficiently confined within the tuning fork even when the vibrator has different sizes on the right and left sides due to machining errors in dimension during the steps of producing the gyro.

Accordingly, undesired leakage of vibration decreases and generation of noise is suppressed.

A decrease in the undesired leakage of vibration helps establish a vibration condition which is stable against changes in temperature and makes it possible to obtain good temperature characteristics.

Embodiments of the above-mentioned aspects will now be described with reference to the drawings.

(Ninth embodiment)

Figure 25:
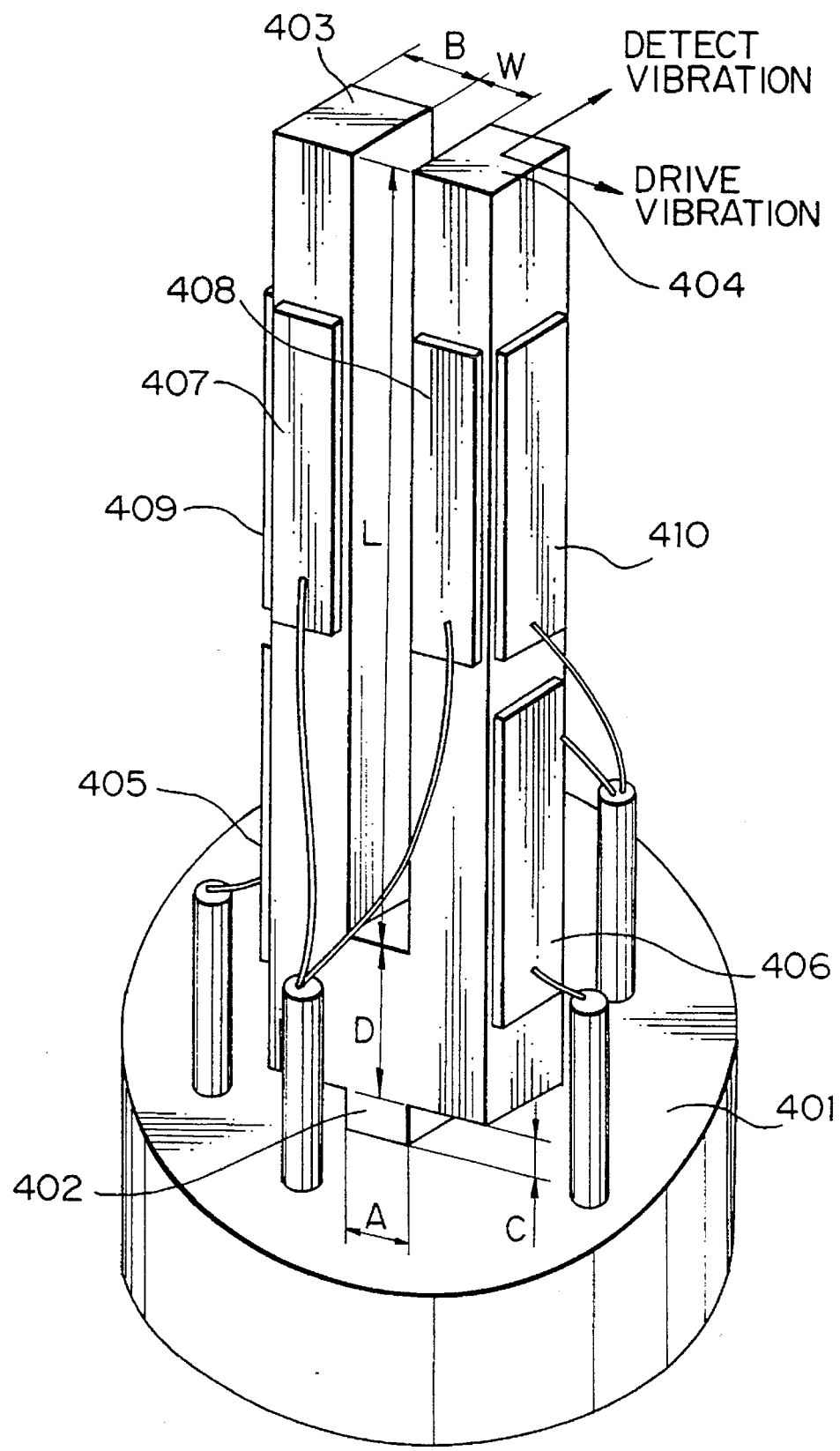
FIG. 25 is a perspective view illustrating an angular velocity sensor according to a ninth embodiment of the present invention.

FIG. 25 illustrates an angular velocity sensor employing a piezo-electric vibration gyro of the square pole tuning fork type of this embodiment. Two square poles 403 and 404 are supported by a base portion 401 via a support portion 402 in the form of a square pole.

The angular velocity sensor comprises the base portion 401, support portion 402, and square poles 403 and 404. The square poles 403 and 404 have a square shape in cross section and nearly the same thickness.

A driver piezo-electric element 405 is adhered to a lower portion on the left-side surface of the square pole 403, and a driver piezo-electric element 406 is adhered to a lower portion of the right-side surface of the square pole 404. When an AC voltage is applied to the driver piezo-electric elements 406 and 406, the square poles 403 and 404 vibrate in the right-and-left directions in FIG. 25.

A detector piezo-electric element 407 is adhered to an upper portion on the front surface of the square pole 403, and a detector piezo-electric element 408 is adhered to an upper portion on the front surface of the square pole 404. When a rotational angular velocity is exerted on the center axis of square poles 403 and 404 (vibrator), the detector piezo-electric elements 407 and 408 detect, as a voltage, the Coriolis force that acts in the back-and-forth direction in FIG. 25 accompanying the vibration of the square poles 403 and 404 that is produced upon applying an AC voltage to the driver piezo-electric elements 405 and 406.

Feedback piezo-electric elements 409 and 410 are adhered at positions over the driver piezo-electric elements 405 and 406, and are used to monitor the vibration condition and to effect self-excitation.

The driver piezo-electric elements 405 and 406 undergo expansion and contraction when an AC voltage is applied thereto, and the square poles 403 and 404 vibrate in the direction of drive vibration. When a rotation angular velocity is exerted on the center axis of the square poles 403 and 404 (vibrator) under this condition, detect vibration generated due to the Coriolis force, and signals due to the bending vibration generated in the detector piezo-electric elements 407 and 408. Then, the angular velocity is detected based on the signals of the detector piezo-electric elements 407 and 408. Here, the support portion 402 has a width A of 3 millimeters.

Described below are the results of various experiments.

The angular velocity sensor shown in FIG. 25 is not capable of sufficiently maintaining stable vibration when errors exist in the shape and size between the two square poles 403 and 404 or when errors exist in the mass between the piezo-electric elements (driver piezo-electric elements 405, 406, detector piezo-electric elements 407, 408) of the two square poles. Any error appears as vibration in the base portion 401.

Figure 26:
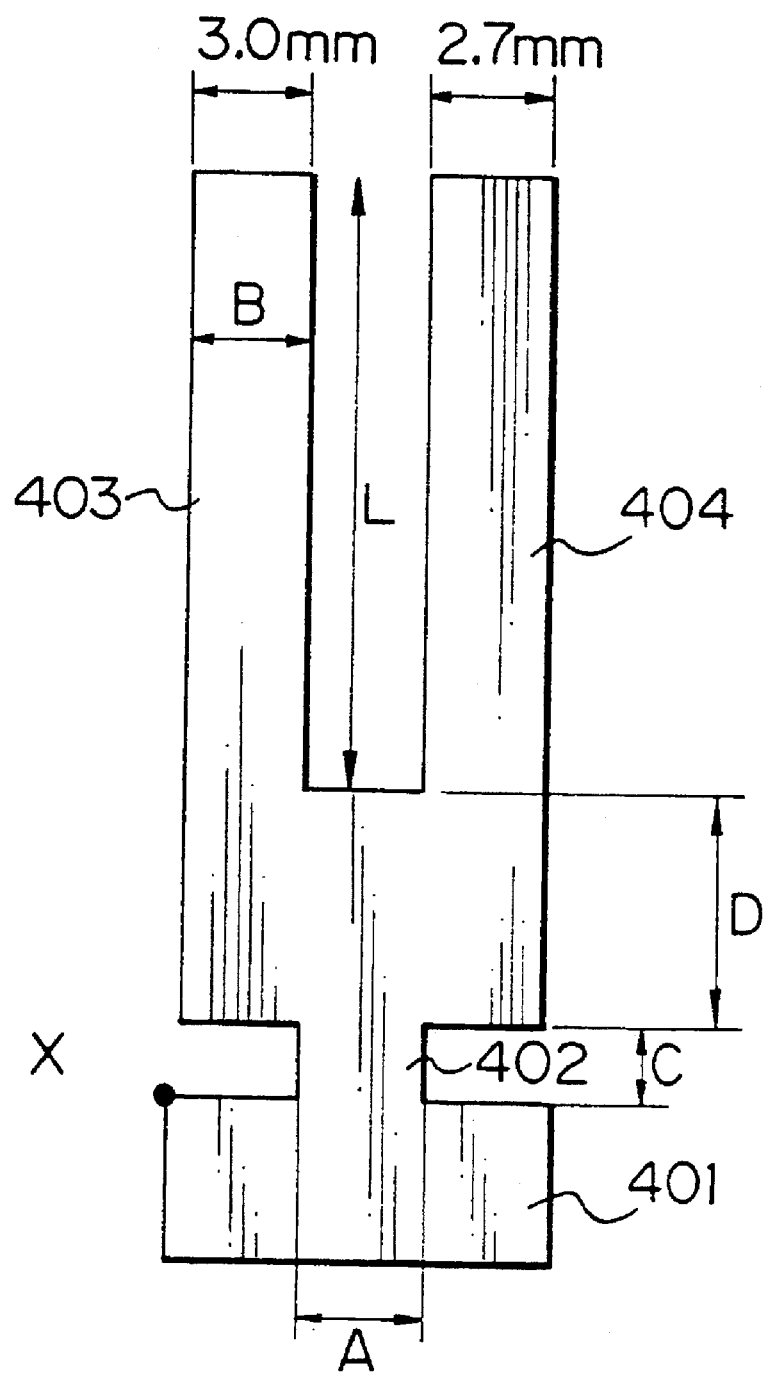
FIG. 26 is a front view of the angular velocity sensor of FIG. 25.

In this embodiment as shown in FIG. 26, the width of the square pole 403 of the left side is selected to be 3.0 mm and the width of the square pole 404 of the right side is selected to be 2.7 mm. That is, the width is changed by 10% toward the minus side in contrast with the normal width 3.0 mm of the square pole to presume the case where the square pole 404 of the right side has the width of 2.7 mm. Then, a variety of experiments are carried out with a predetermined position of the base portion 401 determined as a point X.

FIGS. 27 to 31 illustrate interrelationships between the amplitude of the base portion 401 and the width of the support portion A when the size of the piezo-electric vibration gyro of the type of square pole tuning fork is changed.

Here, as shown in FIG. 25, the distance by which the square poles (vibrators) 403 and 404 are separated is denoted by W, the width of the square poles 403 and 404 is denoted by B, the length thereof is denoted by L, the length of the support portion is denoted by C, and the length of the root portions of the square poles 403 and 404 is denoted by D.

Figure 27:
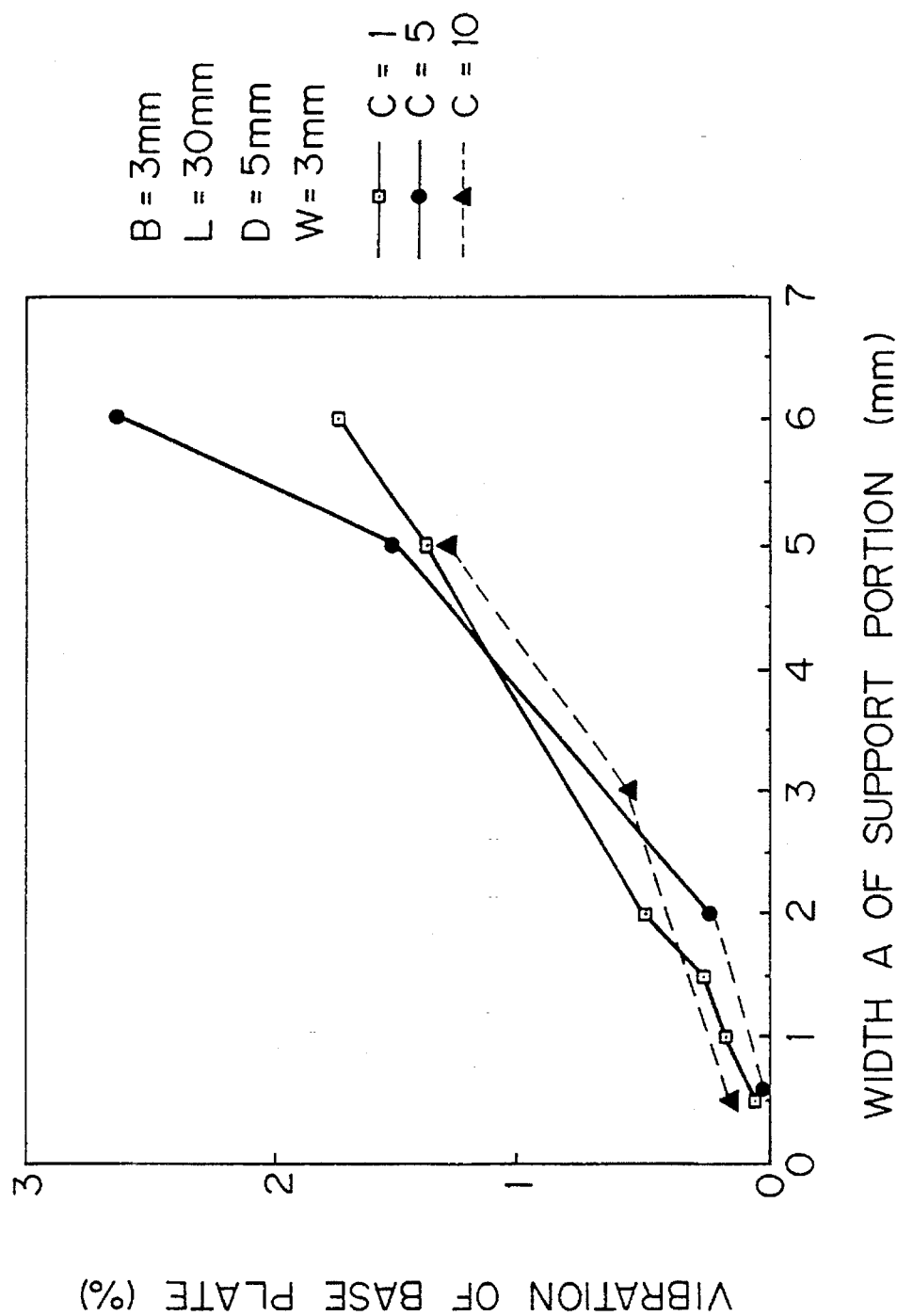
FIG. 27 is a diagram illustrating a relationship between the width of the support portion and the amplitude of the base portion.

FIG. 27 illustrates a relationship between the vibration in the base portion 401 which is the vibration at the point X of the base portion 401 of FIG. 26 and the width of the support portion A when the length C of the support portion is changed.

As will be obvious from FIG. 27, the difference in the amplitude decreases with a decrease in the width A of the support portion. Therefore, vibration is stabilized as the width A of the support portion decreases.

Figure 28:
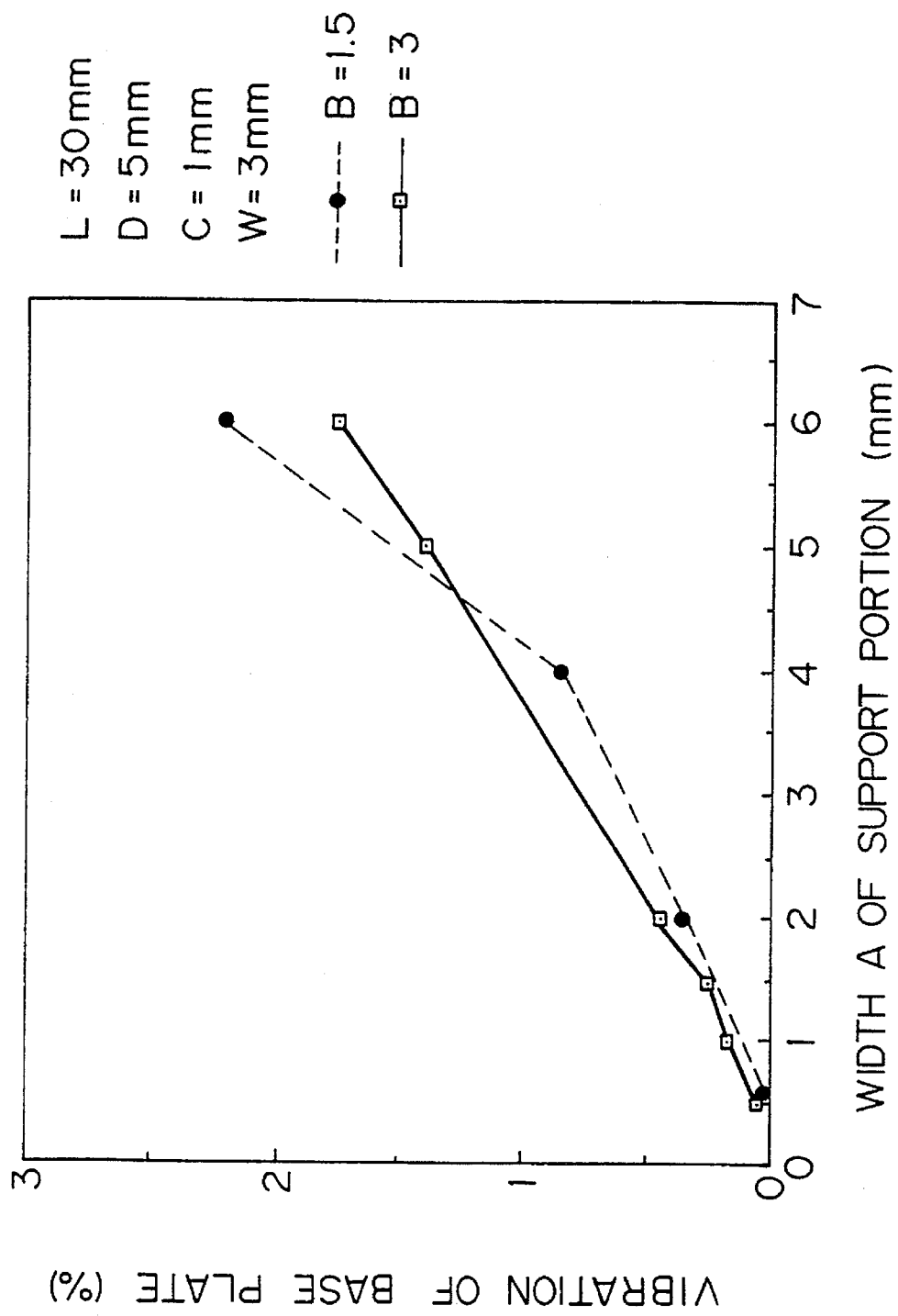
FIG. 28 is a diagram illustrating a relationship between the width of the support portion and the amplitude of the base portion.
Figure 29:
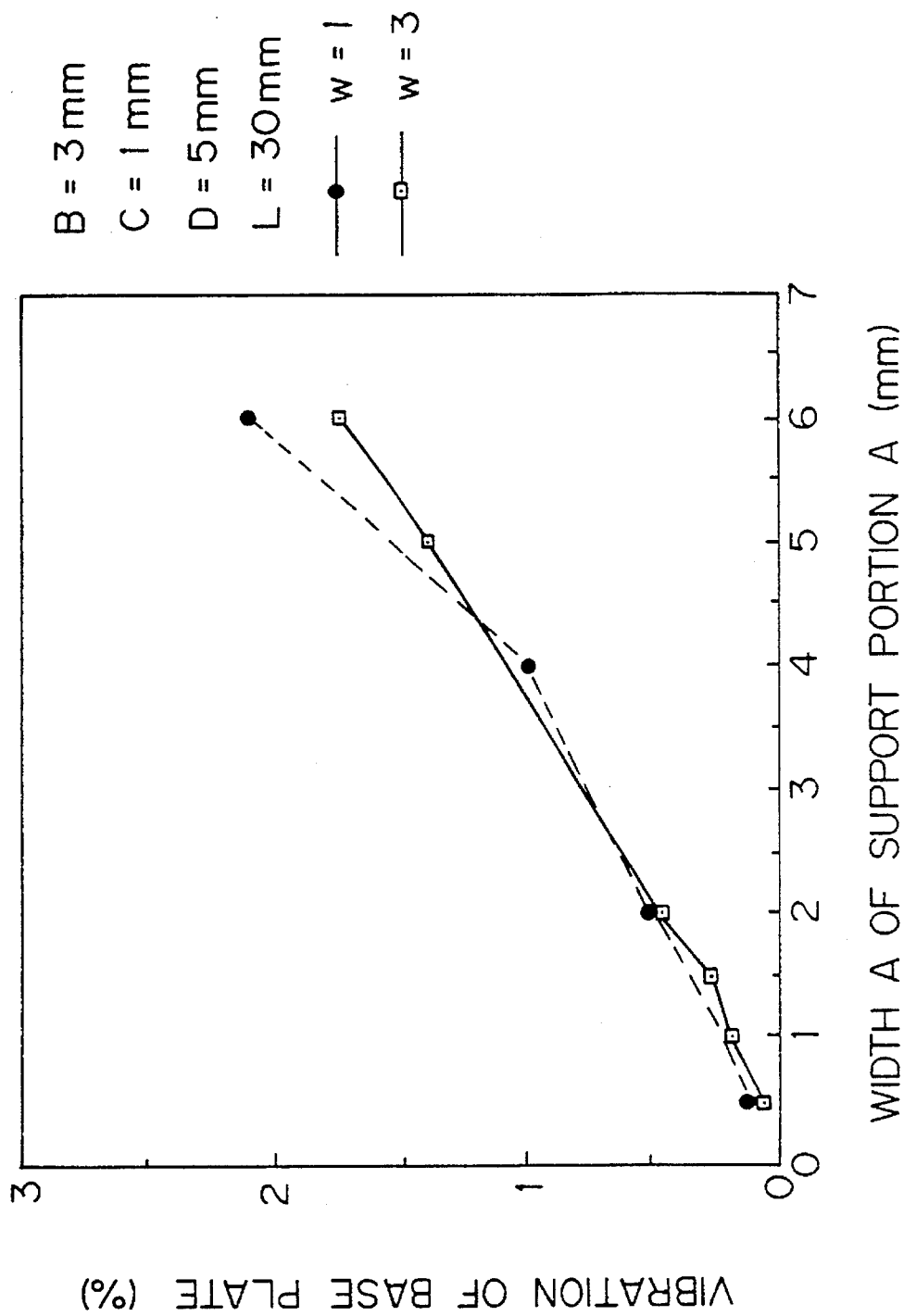
FIG. 29 is a diagram illustrating a relationship between the width of the support portion and the amplitude of the base portion.
Figure 30:
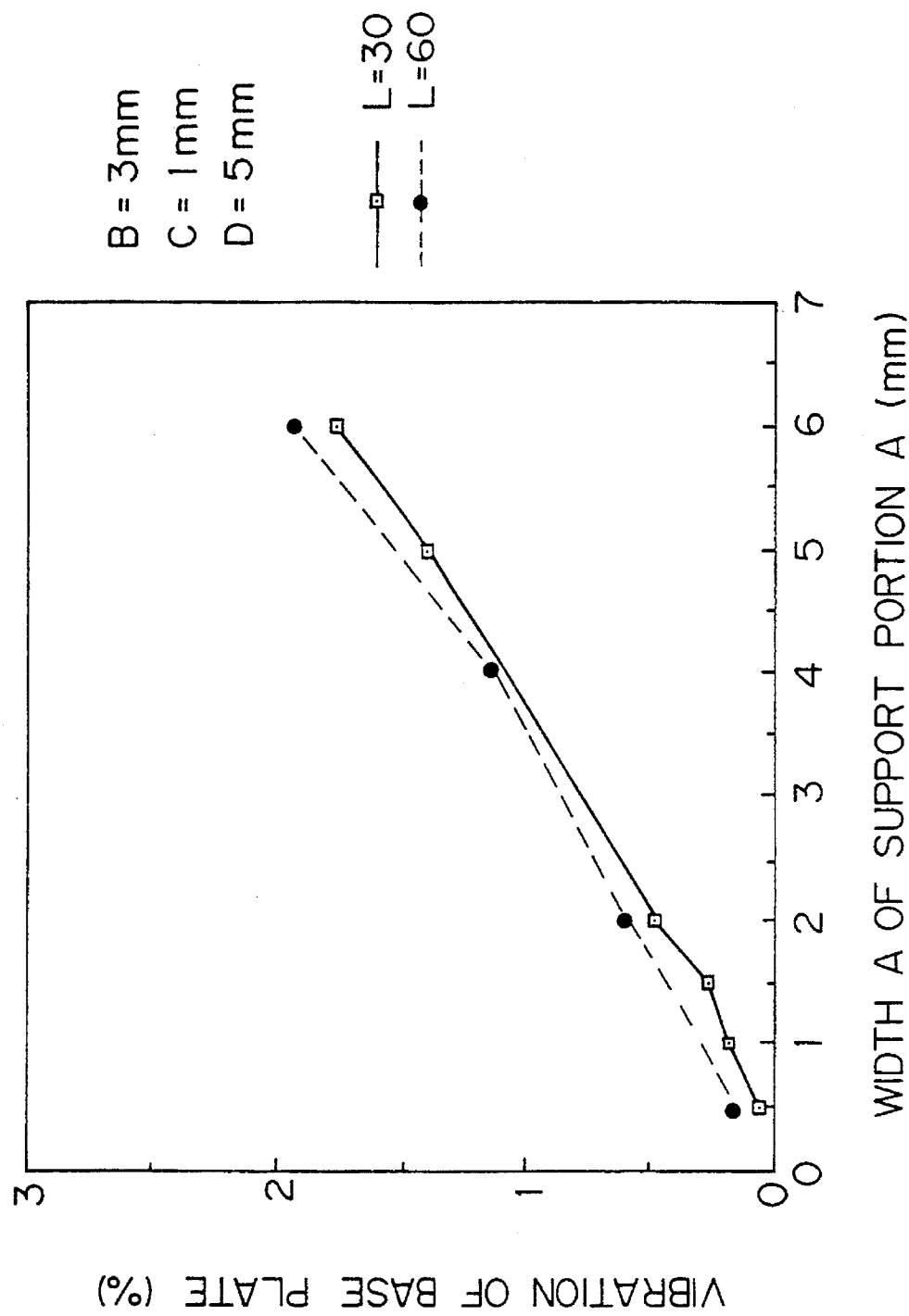
FIG. 30 is a diagram illustrating a relationship between the width of the support portion and the amplitude of the base portion.
Figure 31:
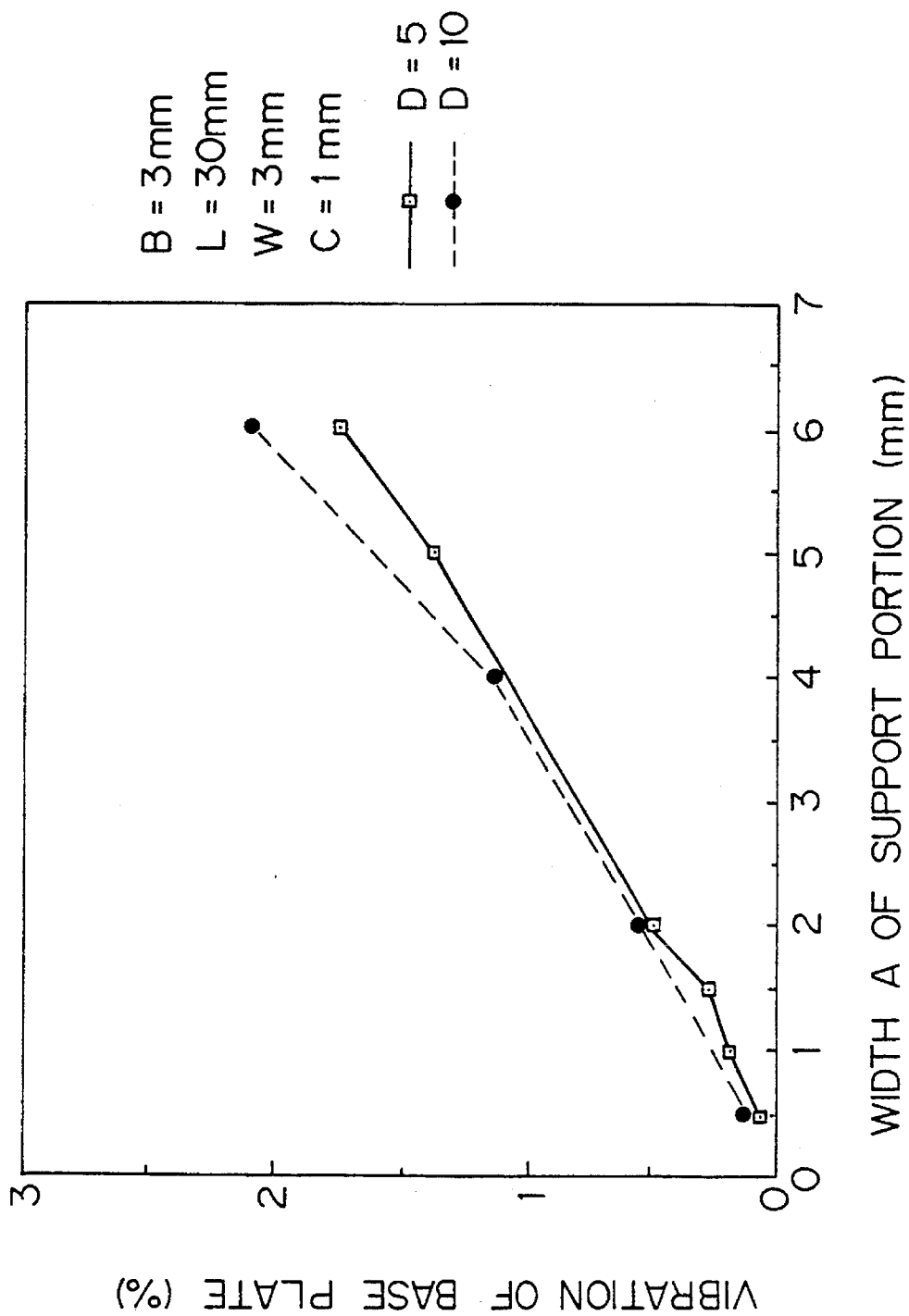
FIG. 31 is a diagram illustrating a relationship between the width of the support portion and the amplitude of the base portion.

FIG. 28 illustrates a relationship between the vibration at the point X of the base portion 401 and the width A of the support portion when the width B of the square poles 403 and 404 in changed. FIG. 29 illustrates a correlation between the amplitude at the point X of the base portion 401 and the width A of the support portion when the distance W is changed by which the square poles 403 and 404 are separated from each other. FIG. 30 shows a relationship between the vibration at the point X of the base portion 401 and the width A of the support portion when the length L of the square poles 403 and 404 is changed. FIG. 31 shows a relationship between the vibration at the point X of the base portion 401 and the width A of the support portion when the length D of root portions of the square poles 403 and 404 is changed.

It will be understood from FIGS. 27 to 31 that the amplitude at the point X of the base portion 401 is not affected by the distance W by which the square poles 403 and 404 are separated, the length L of the square poles 403 and 404, or the length D of the root portions of the square poles 403 and 404, or the width B of the square poles and the length C of the support portion.

As described above, it is found that the amplitude of the base portion 401 decreases with a decrease in the width A of the support portion. That is, the width A of the support portion is a factor which dominates the amplitude of the base portion, and it is found that the amplitude of the base portion decreases with a decrease in the width A of the support portion.

Figure 32:
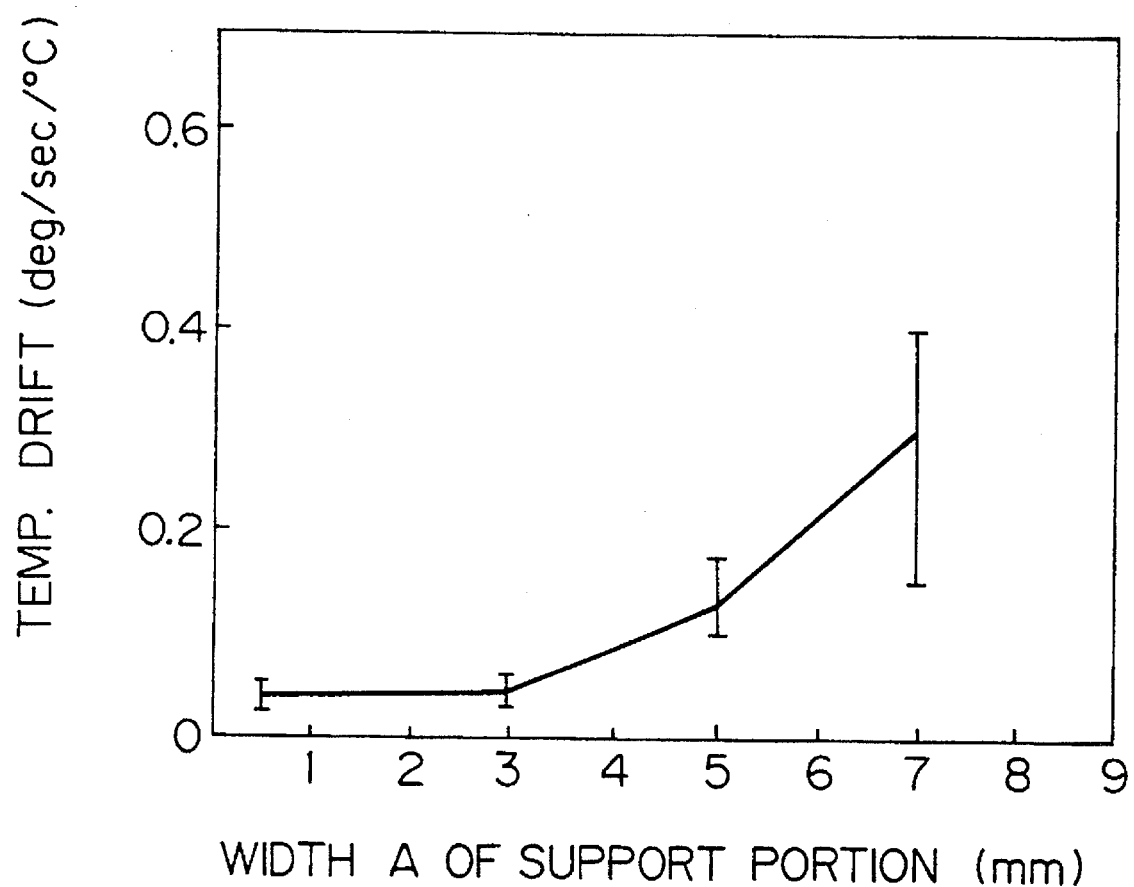
FIG. 32 is a diagram illustrating the width of the support portion and the temperature drift.

FIG. 32 illustrates a relationship between the temperature drift characteristics of a zero point and the width A of the support portion, which is important for the gyro.

As will be obvious from FIG. 32, the temperature drift is small and good characteristics are obtained when the width A of the support portion 402 is small, like the results of vibration in the base portion 401.

It was further learned that sufficient temperature drift characteristics are obtained when the width of the support portion is smaller than 5 mm. If the results are collated with the results of vibration of the base portion 401, the width A of the support portion which is smaller than 5 mm corresponds to that the amplitude of the base portion 401 is smaller than 1.5% of the amplitude of the tip.

It is therefore considered that a sensor having good characteristics can be obtained if the support portion is so designed that the amplitude in the base portion becomes smaller than 1.5%.

It will be easily understood from FIGS. 27 to 31 that decreasing the width A of the support portion is one of the means for obtaining a vibration gyro having good temperature drift characteristics.

In practice, however, a limitation is imposed by the steps for producing the sensor. If the thickness of the support portion 2 cannot be decreased, the shape of the support portion 402 should be so designed that the vibration in the base portion 401 due to leakage of vibration becomes smaller than 1.5%.

As described above, the shape of the support portion 402 of the vibration-type gyro is so designed that the vibration in the base portion 401 becomes smaller than 1.5% or, concretely speaking, that the width of the support portion 402 become smaller than 5 mm in order to obtain a gyro which vibrates very stably.

According to this embodiment as described above, the vibrator is stably supported when the support portion 402 is so designed that the amplitude of the base portion 401 caused by the vibration of square poles 403 and 404 produced by the driver piezo-electric elements 405 and 405 adhered to the square poles 403 and 404 becomes smaller than 1.5% of the amplitude of the square poles 403 and 404 or, concretely speaking, when the width of the support portion 402 is selected to be smaller than 5 millimeters.

That is, the vibration energy can be effectively confined inside the tuning fork even in the case where the two square poles 403 and 404 (vibrators) have different sizes due to dimensional errors introduced during the machining in the steps of producing the gyro. Therefore, undesired leakage of vibration decreases, and generation of noise is suppressed. Moreover, a decreases in the undesired leakage of vibration helps establish a vibration condition which is stable against changes in temperature, making it possible to improve temperature characteristics. As described above, the vibrator can be reliably held even when it is out of balance and can be efficiently vibrated permitting vibration to leak only slightly.

(Tenth embodiment)

The angular velocity sensor used in the tenth embodiment is the same as the one shown in FIG. 26. Described below are the results of a variety of experiments in relation to this embodiment.

Figure 33:
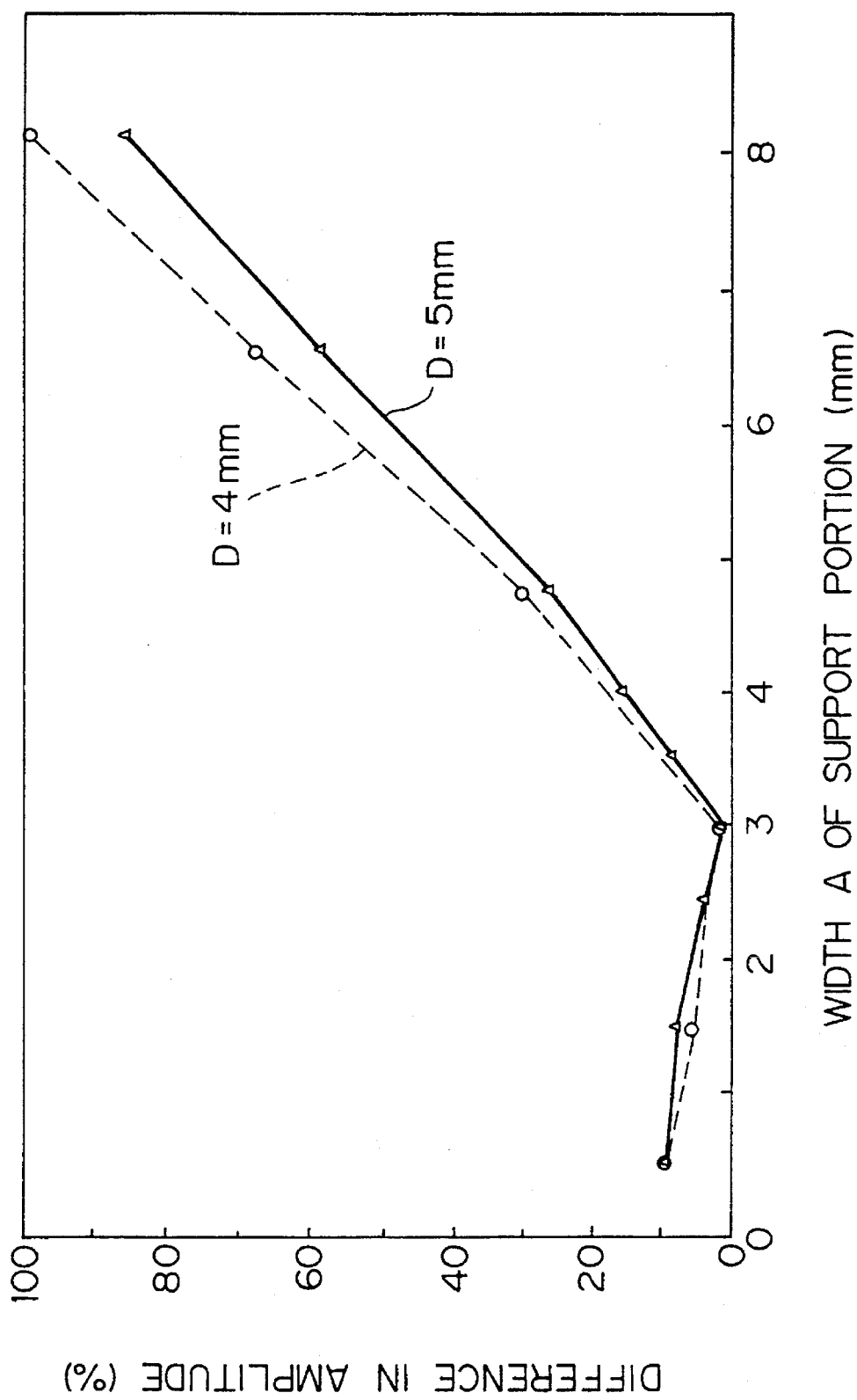
FIG. 33 is a diagram illustrating a relationship between the width of the support portion and the difference in amplitude according to a tenth embodiment of the present invention.

FIG. 33 illustrates a relationship between the width A of the support portion and the difference in the amplitude at the tips of the square poles (vibrators) 403 and 404. The difference in the amplitude becomes the smallest when the width A of the support portion is 3.0 mm. It is therefore learned that the vibration is stabilized when the width A of the support portion is 3.0 mm.

FIGS. 34 to 40 illustrate interrelationships between the width A of the support portion and the difference in the amplitude of the tips of the square poles (vibrators) 403 and 404 when the width B of the square pole (vibrators) 403 and 404 and the length C of the support portion are changed. It was learned that a positional relationship exists that minimizes the difference in the amplitude at the tips of the square poles (vibrators) 403 and 404.

It is now presumed that the sizes W, L and D are those of the portions of the ninth embodiment.

Figure 34:
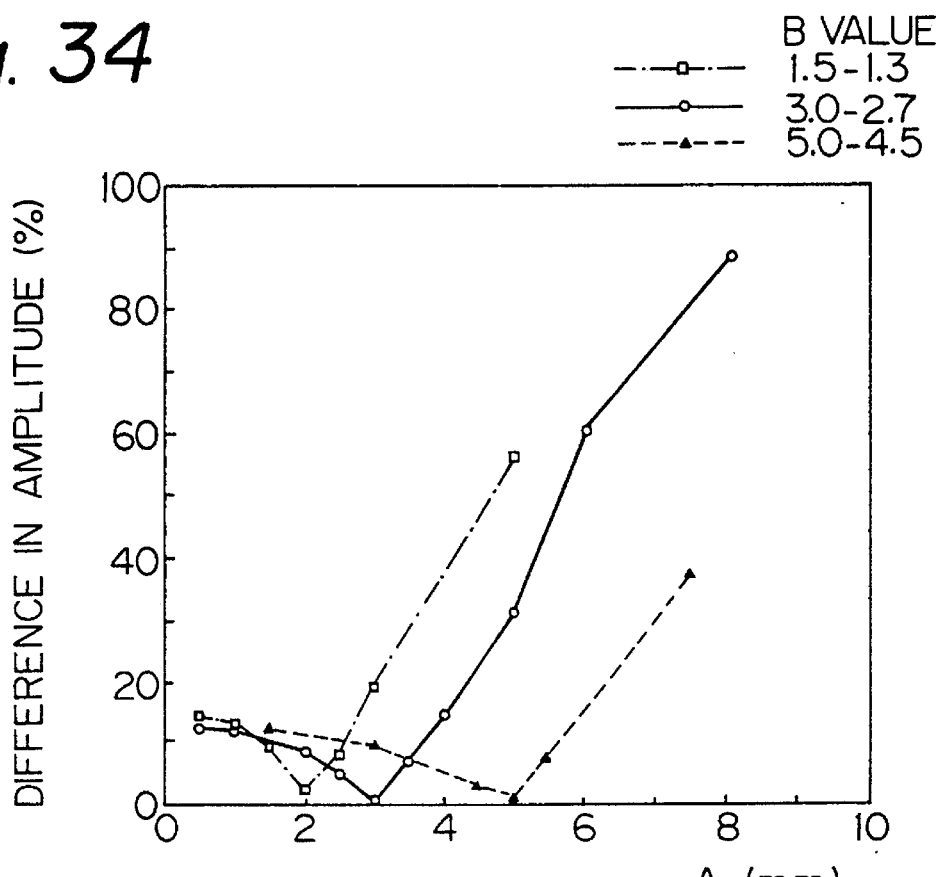
FIG. 34 is a diagram illustrating a relationship between the width of the support portion and the difference in amplitude.
Figure 35:
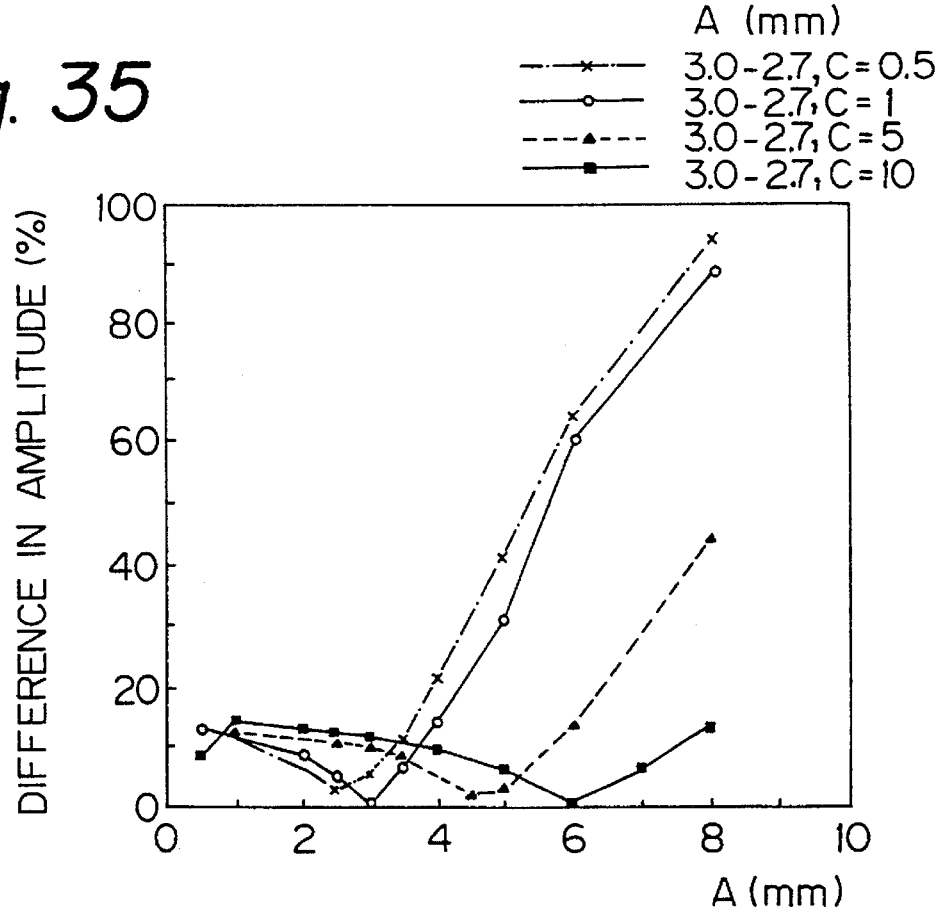
FIG. 35 is a diagram illustrating a relationship between the width of the support portion and the difference in amplitude.
Figure 36:
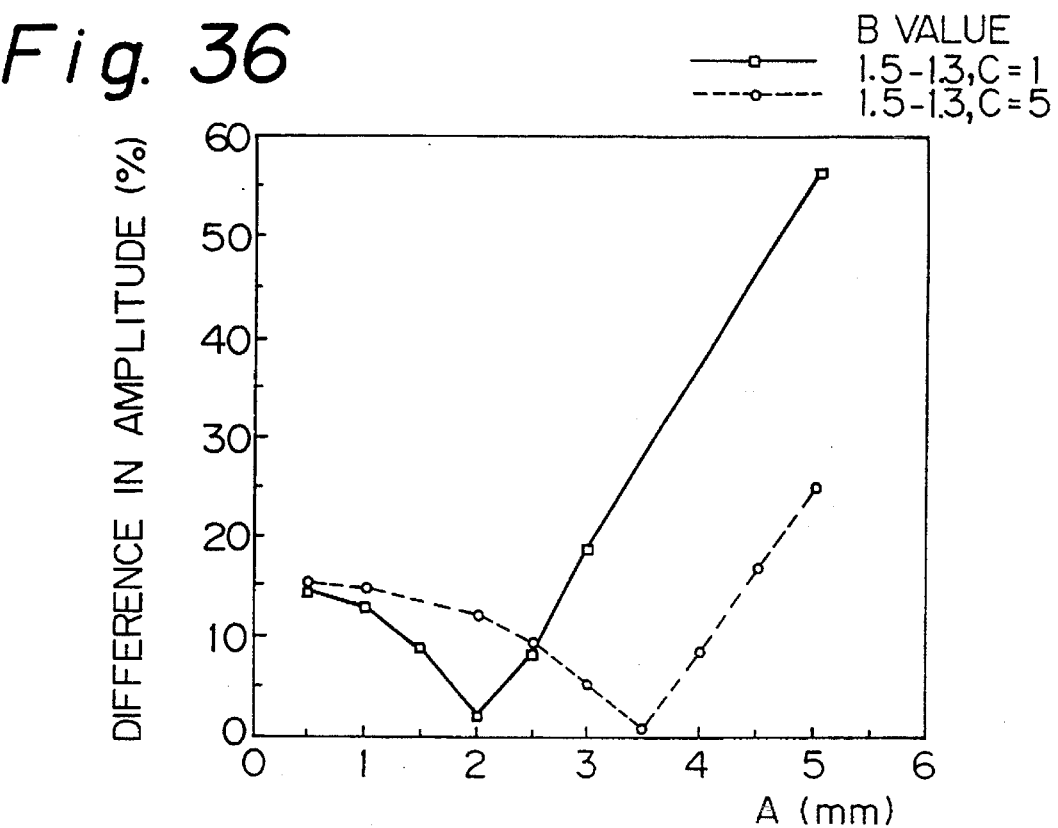
FIG. 36 is a diagram illustrating a relationship between the width of the support portion and the difference in amplitude.
Figure 37:
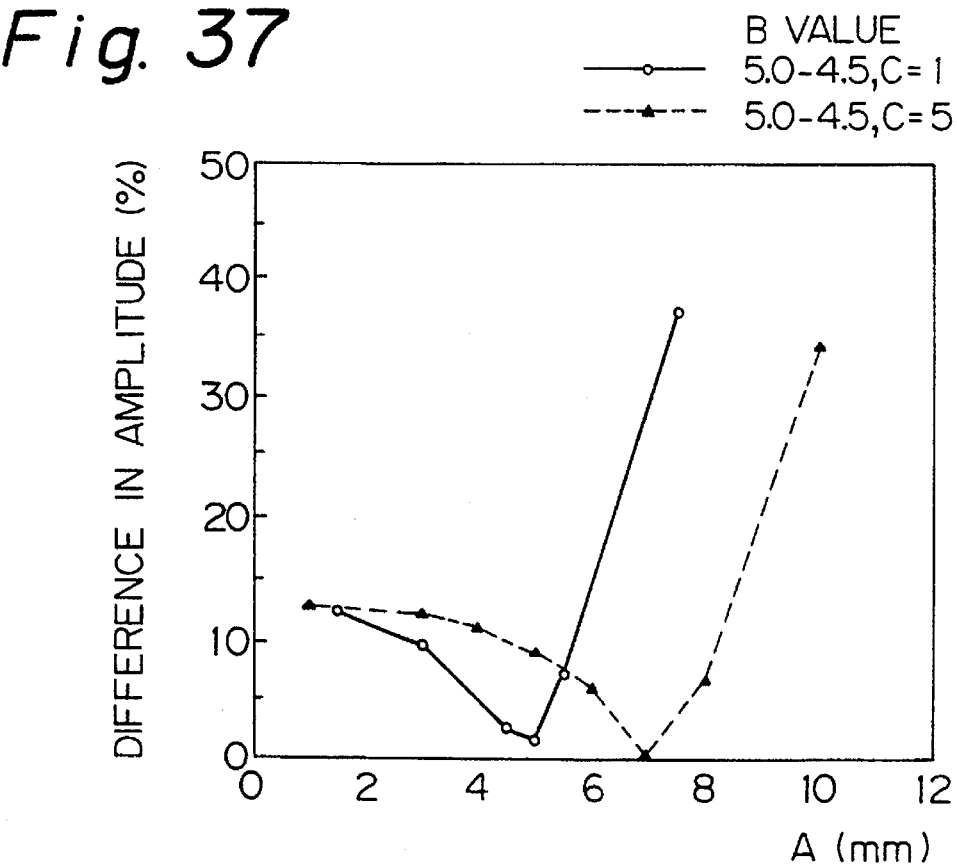
FIG. 37 is a diagram illustrating a relationship between the width of the support portion and the difference in amplitude.

FIG. 34 shows a relationship between the difference in the amplitude and the width A of the support portion when the width B of the square poles 403 and 404 is changed (changed by 10% toward the minus side with respect to the specified values 1.5 mm, 3 mm, 5 mm). FIGS. 35 to 37 show relationships between the difference in the amplitude and the width A of the support portion when the length C of the support portion 402 is changed. Changed sizes are shown in the drawings.

From FIGS. 34 to 37. It is learned that the difference in the amplitude between the right side and the left side is affected by the width A of the support portion, width B of the square poles 403 and 404, and length C of the support portion 402.

Figure 38:
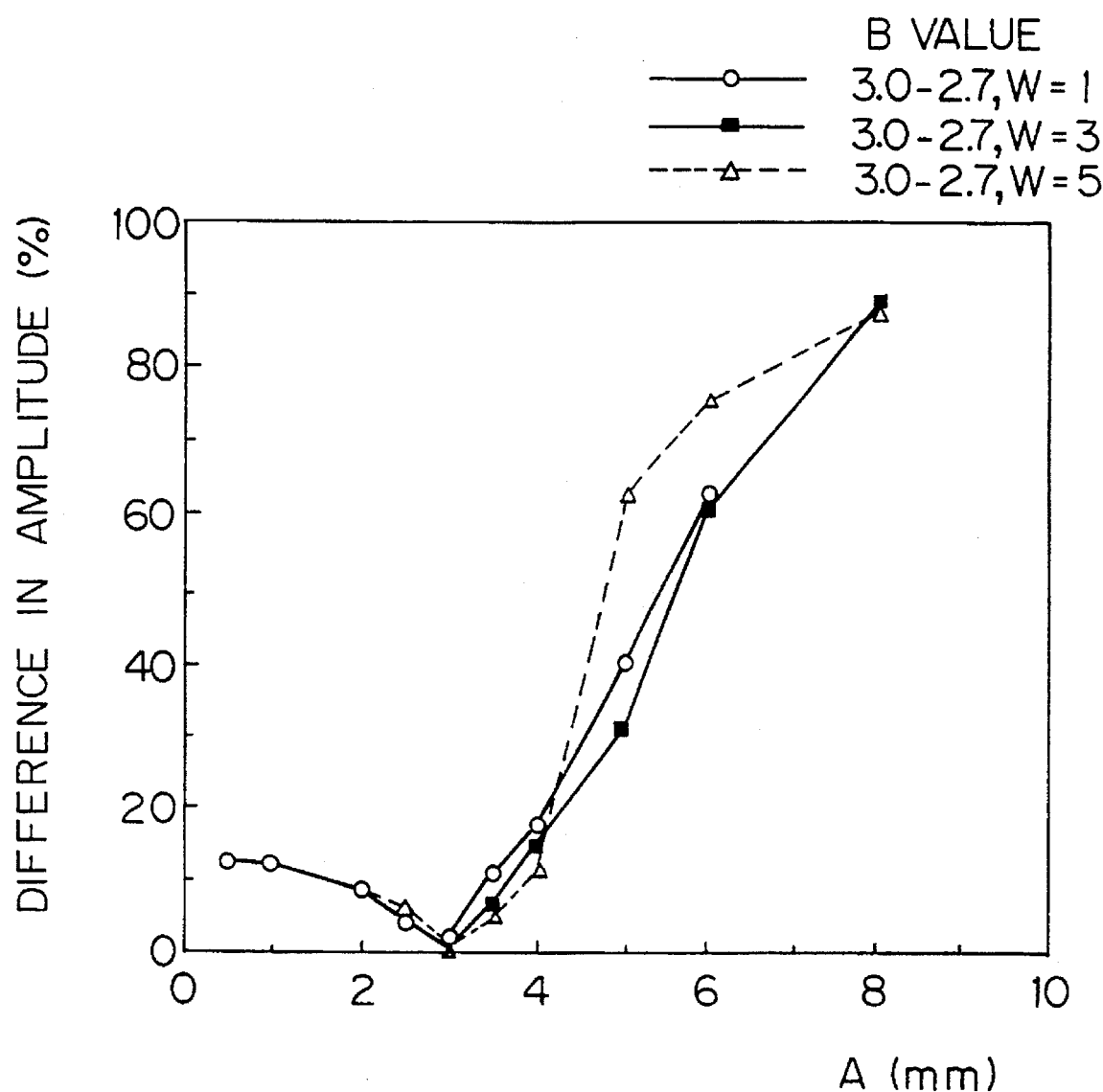
Figure 39:
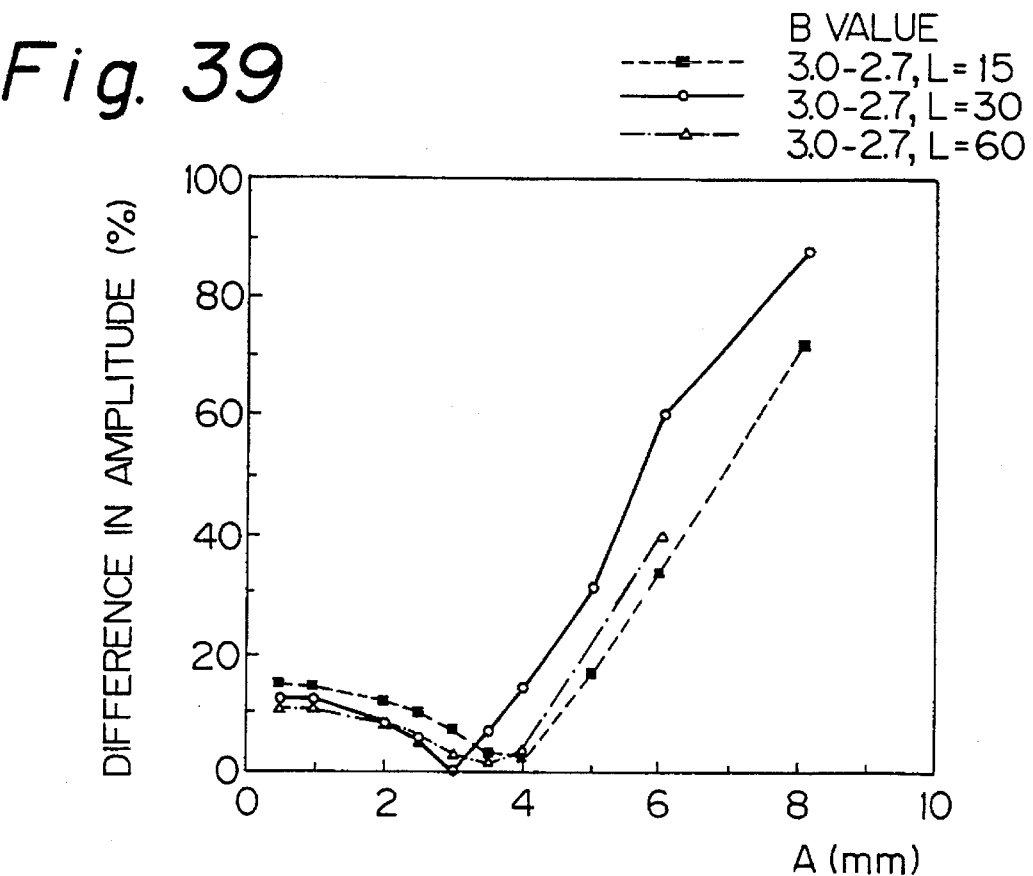
FIG. 39 is a diagram illustrating a relationship between the width of the support portion and the difference in amplitude.
Figure 40:
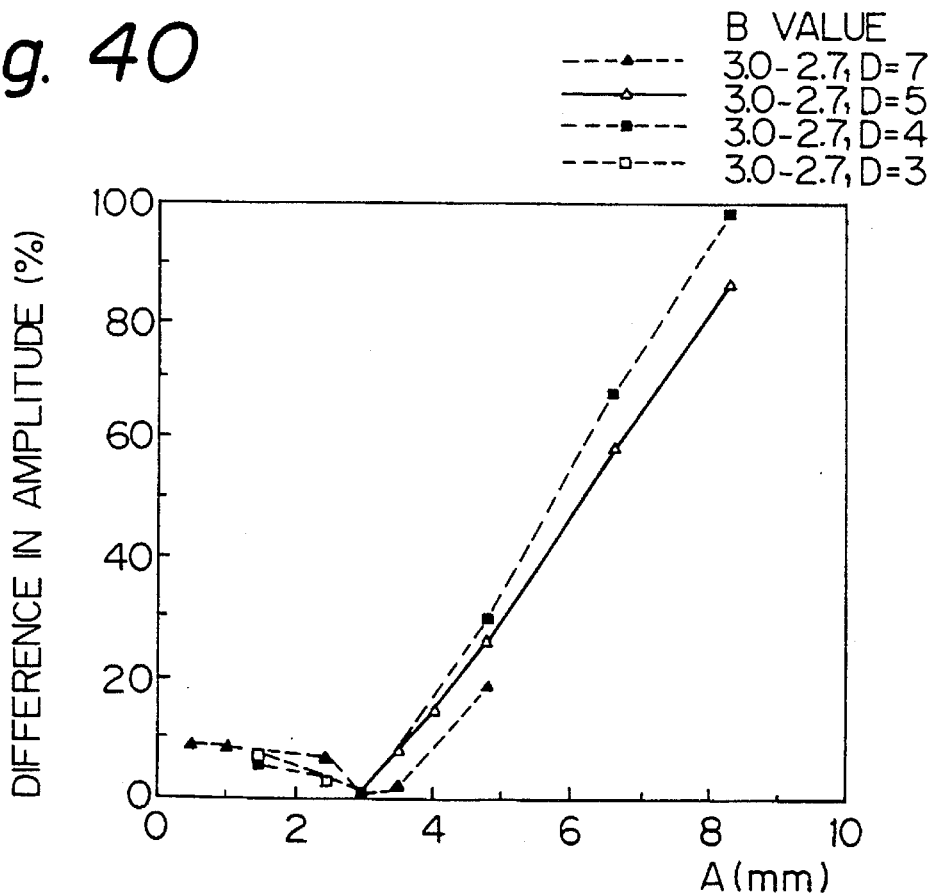
FIG. 40 is a diagram illustrating a relationship between the width of the support portion and the difference in amplitude.

FIG. 38 shows a relationship between the difference in the amplitude and the width A of the support portion when the distance W is changed by which the square poles 403 and 404 are separated. FIG. 39 shows a relationship between the difference in the amplitude and the width A of the support portion when the length L of the square poles 403 and 404 is changed. FIG. 40 shows a relationship between the difference in the amplitude and the width A of the support portion when the length D of the root portions of the square poles 403 and 404 is changed.

From FIGS. 38 and 39, it can be seen that the difference in the amplitude between the right side and the left side is not affected by the distance W by which the square poles 403 and 404 are separated, by the length L of the square poles 403 and 404, or by the length D of the root portions of the square poles 403 and 404.

Figure 41:
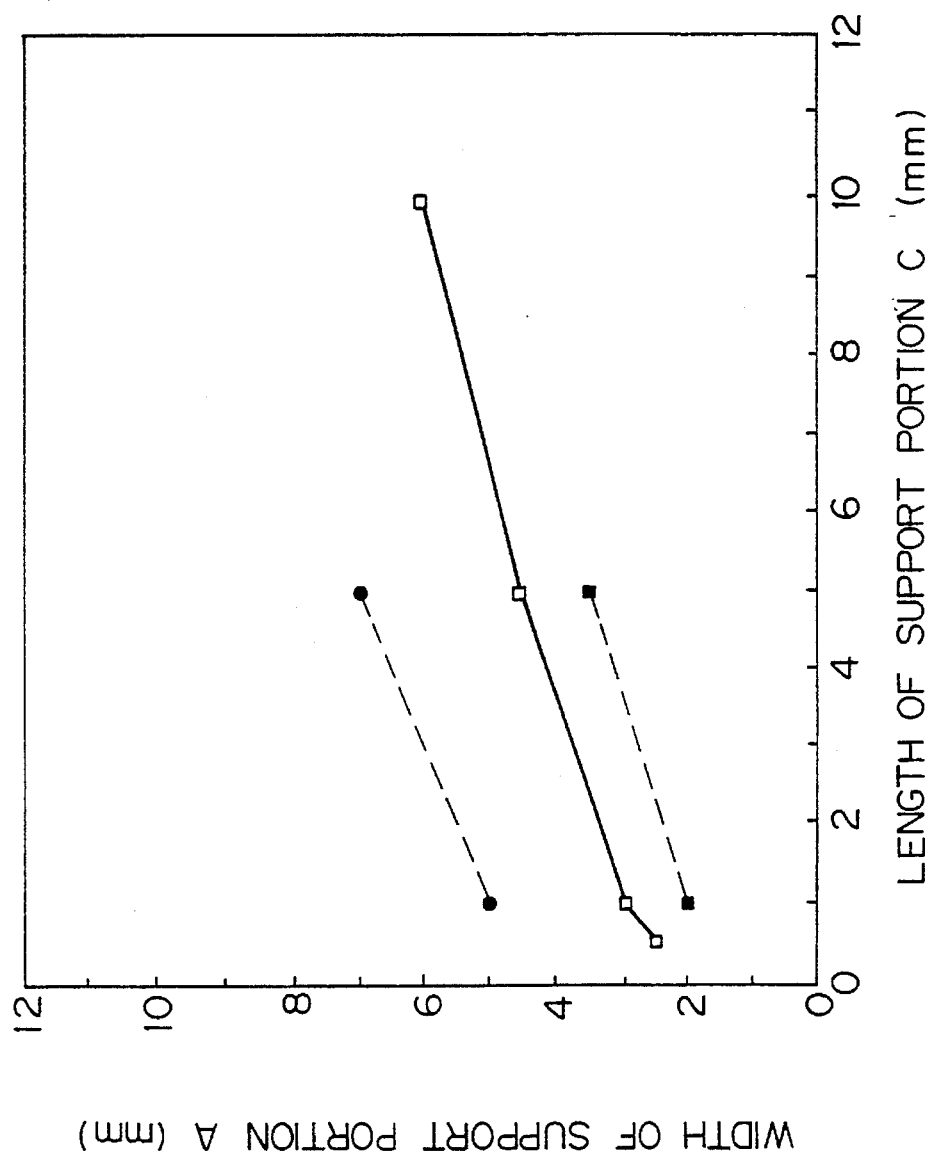
FIG. 41 is a diagram illustrating a relationship between the length of the support portion and the width of the support portion.

FIG. 41 shows minimum differences in the amplitude under the above-mentioned conditions. The minimum values are plotted to establish the following relationship.

$$A \leq 0.4 \times C + B$$

where A; width of the support portion 402 (millimeters),
B; width of the square poles 403, 404 (millimeters),
C; length of the support portion 402 (millimeters).

It is further desired that a relationship, $0.4 \times C + B - 1 \leq A \leq 0.4 \times C + B + 1$, is satisfied.

In the above relation, the width of 1 mm is given for ($0.4 \times C + B$), so that the difference in the amplitude becomes smaller than 10% at the tip of the square poles (vibrators) 403 and 404.

With the support portion of the vibration-type gyro being designed as described above, it is allowed to obtain a gyro having a high vibration stability.

That is, the vibration energy can be effectively confined within the tuning fork even when the square poles 403 and 404 (vibrators) have different sizes due to dimensional errors introduced during the machining in the steps of producing a the gyro. Therefore, undesired leakage of vibration decreases, and generation of noise is suppressed. Moreover, a decrease in the undesired leakage of vibration helps establish a vibration condition which is stable against changes in temperature, making it possible to improve temperature characteristics. As described above, the vibrator can be reliably held even when it is out of balance and can be efficiently vibrated permitting vibration to leak only slightly.

Next, described below is the relationship between the sensitivity and a difference Δf in the resonance frequency between the drive vibration and the detect vibration.

Figure 42:
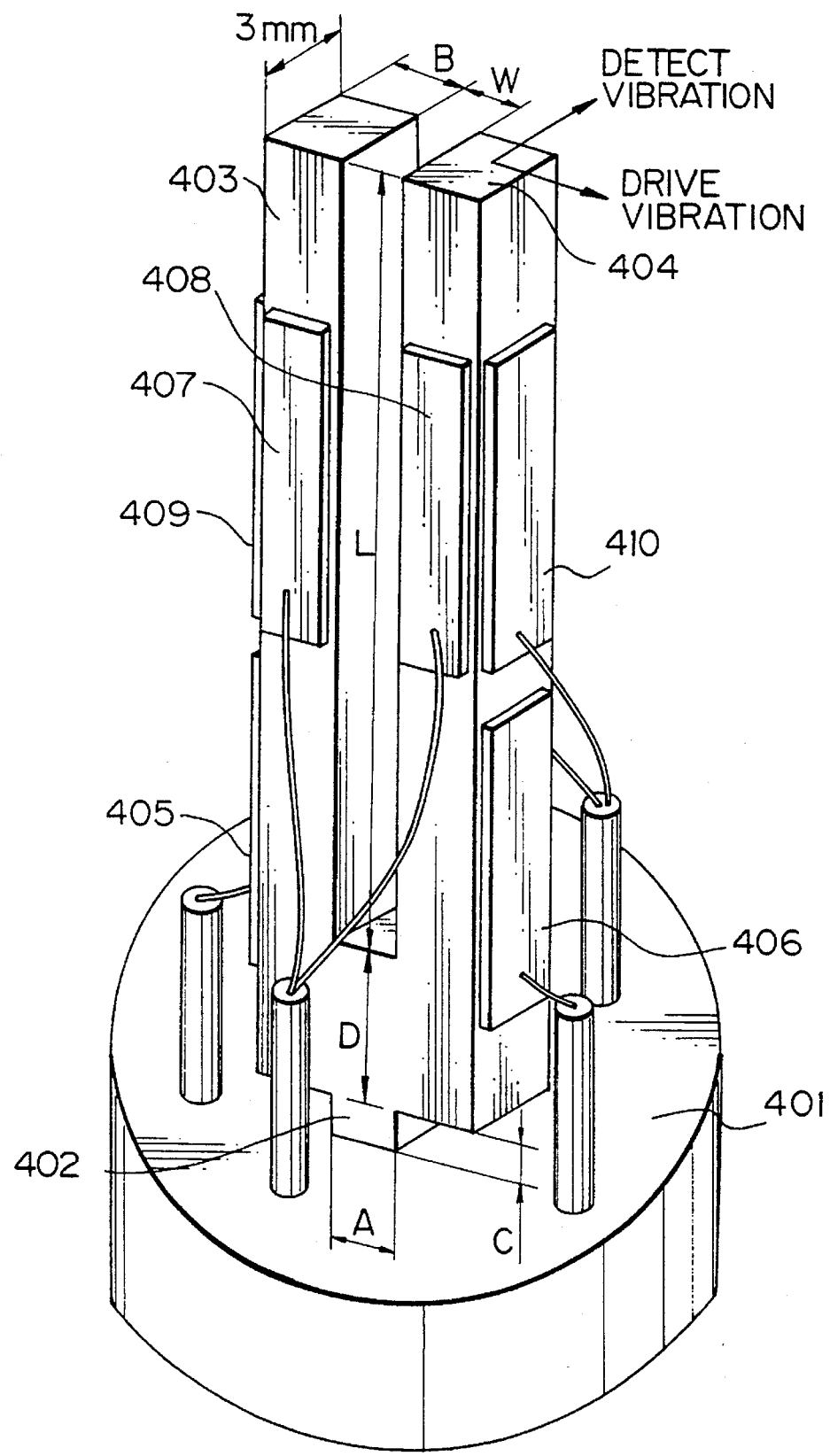
FIG. 42 is a perspective view illustrating the angular velocity sensor.
Figure 43:
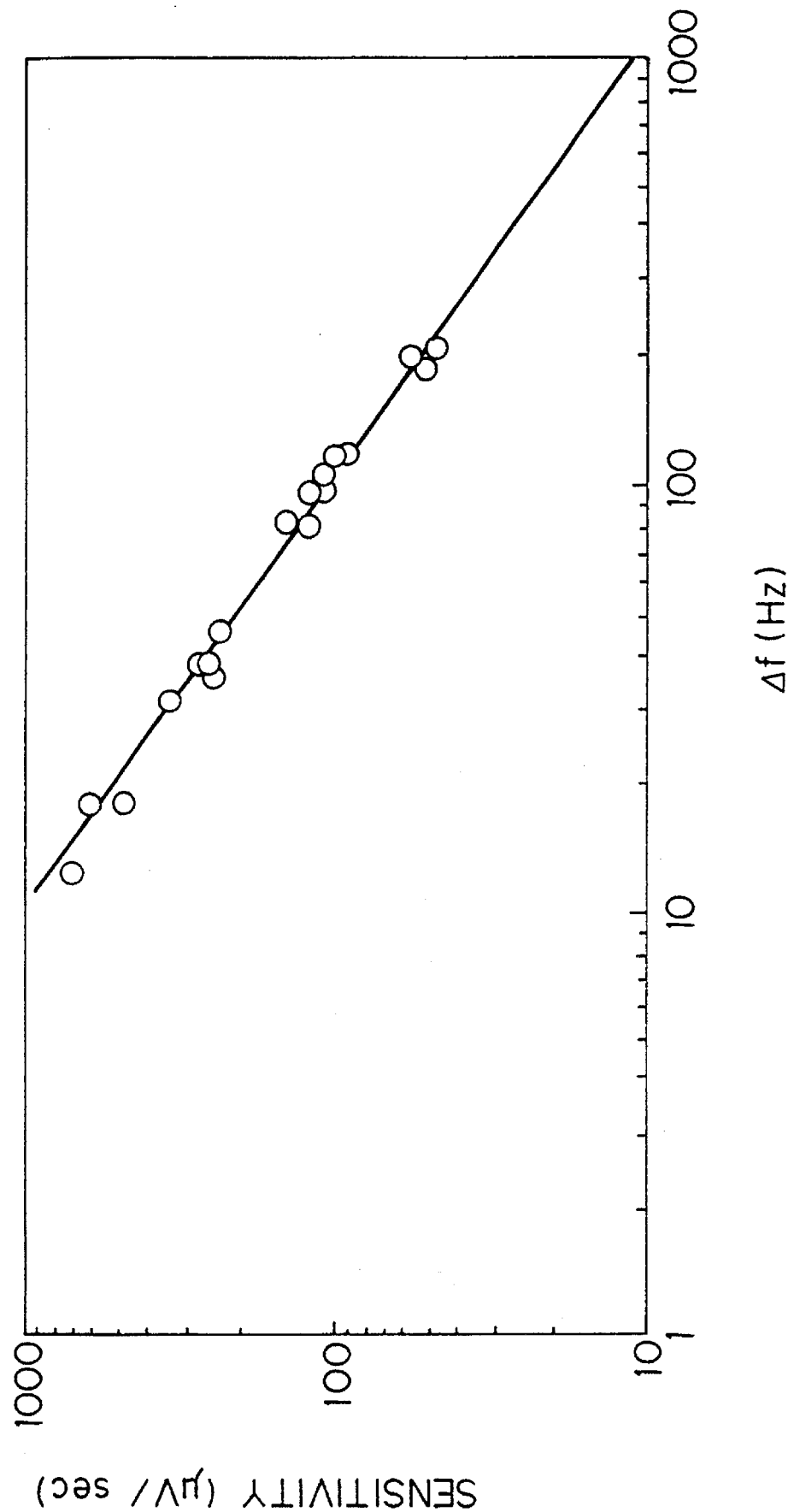
FIG. 43 is a diagram illustrating a relationship between a difference Δf in the frequency of the sensitivity.
Figure 44:
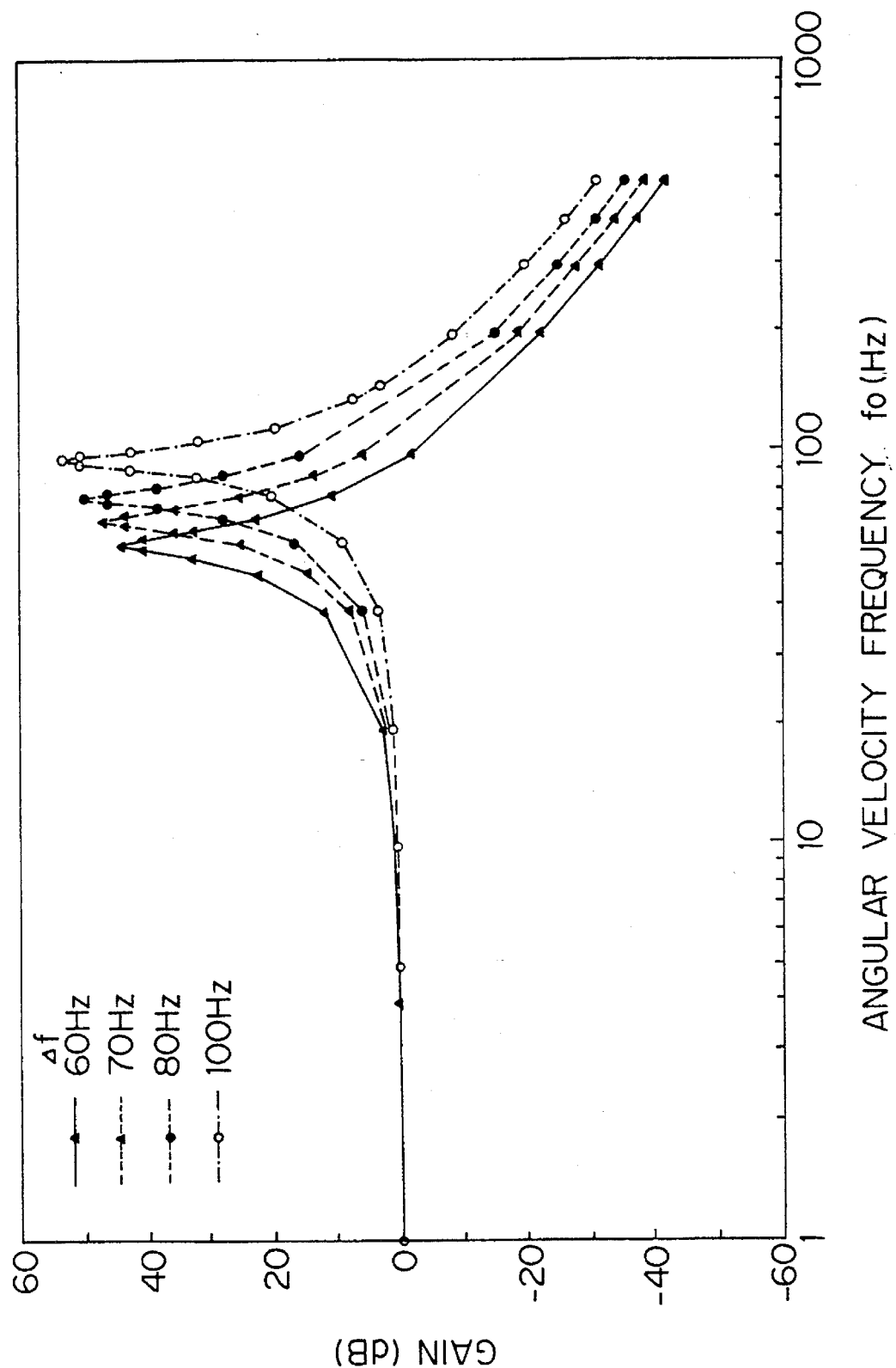
FIG. 44 is a diagram illustrating a relationship between the angular velocity frequency and the gain.

The sensitivity increases with a decrease in Δf. FIG. 43 shows a relationship between the Δf and the sensitivity when the square poles have a thickness of 3 mm and a length L of 35 mm in the angular velocity sensor of FIG. 42.

That is, the sensitivity can be increased with a decrease in the Δf.

However, a decrease in Δf results in the following problems.

(1) The sensitivity is high when the difference Δf in the resonance frequency is small. However, the sensitivity changes or the offset easily changes depending upon a change in the resonance frequency caused by a change in the temperature, and the temperature characteristics are deteriorated.

(2) When the angular velocity is periodically exerted, or when it is attempted to use the angular velocity sensor for controlling the attitude of a vehicle, a response of from 0 to about 40 Hz is required from the practical point of view. The response characteristics exhibit a peak at a point where the angular velocity frequency fo and the frequency difference Δf become equal to each other.

Figure 45:
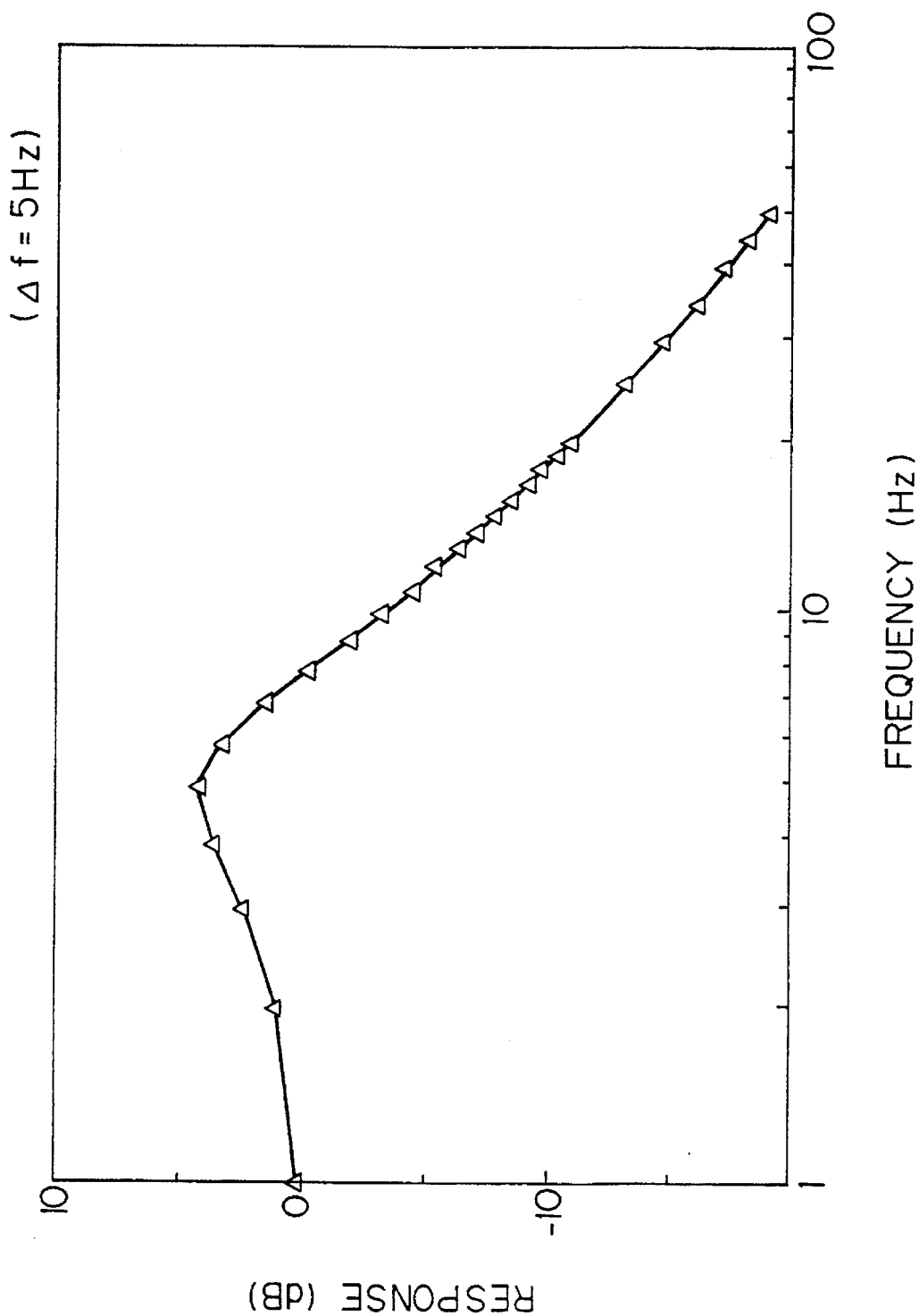
FIG. 45 is a diagram illustrating a relationship between the frequency and the response.
Figure 46:
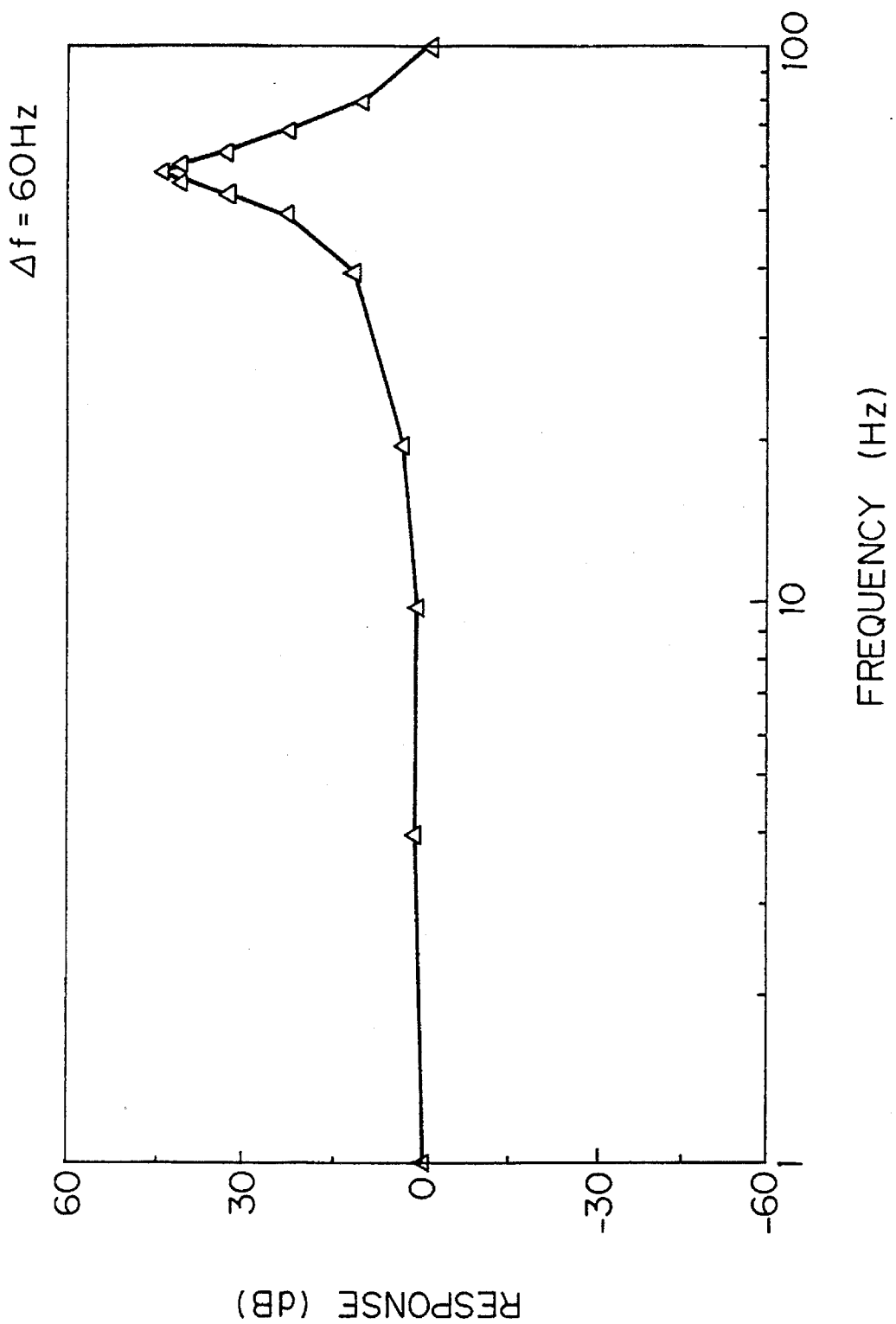
FIG. 46 is a diagram illustrating a relationship between the frequency and the response.

As shown in FIG. 45, the gyro which has attained a resonance frequency does not have flat response characteristics. As shown in FIG. 45, Δf must be greater than 60 Hz in order for the gyro to exhibit flat response characteristics up to a frequency of 40 Hz.

As described above, the difference Δf in the resonance frequency must be greater than a given value and should concretely be greater than 60 Hz.

When Δf is too great, on the other hand, the sensitivity decreases. Concretely, therefore, Δf should not be greater than 200 Hz.

In order to obtain a gyro of the square pole tuning fork type having good characteristics, therefore, some degree of difference must be maintained in the resonance frequency between the drive vibration and the detect vibration, which may be from about 60 to about 200 Hz, concretely.

As described above, resonance frequencies are not brought into perfect agreement between the drive vibration and the detect vibration, but some difference is maintained between them. Concretely, the difference should be 60 to 200 Hz. Here, the difference of 60 to 200 Hz may have either a positive sign or a negative sign. As a result, a high degree of sensitivity is maintained since the resonance frequencies are close to each other between the drive vibration and the detect vibration. Moreover, no fine adjustment is required for attaining resonance frequency, and the cost of production can be decreased. Moreover, since the resonance frequency is not affected by a change in temperature, a gyro having good temperature characteristics is realized.

In the conventional angular velocity sensor having a support plate of the tuning fork type in which two vibration pieces having a square shape in cross section are arranged in parallel, the driver piezo-electric elements for generating bending vibration in the vibration pieces and the detector piezo-electric elements for detecting stress generated in the vibration pieces due to the Coriolis force, are joined to the side surfaces of the vibration pieces at right angles to each other.

In the conventional angular velocity sensor, however, the compressive stress and the tensile stress are simultaneously generated in the detector piezo-electric elements due to bending vibration of the vibration pieces, and the following problem aroises.

That is, when the detector piezo-electric elements are joined to the vibration pieces at symmetrical positions with respect to a neutral axis of bending vibration of the vibration pieces, the offset components caused by the compressive stress and the tensile stress are canceled by each other in the places where the detector piezo-electric elements are joined. In practice, however, offset voltages are generated from the detector piezo-electric elements due to errors in the positions at which the detector piezo-electric elements are joined, unevenness in the junction, deviation in the neutral axis of bending vibration and the like. Therefore, precision for detecting the angular velocity is deteriorated.

In order to solve the above-mentioned problem, the present inventors have completed a method of adjusting the angular velocity sensor which is capable of improving the precision for detecting the angular velocity by decreasing the offset components from the detector piezo-electric elements as much as possible.

That is, in a method of adjusting an angular velocity sensor which utilizes the bending vibration of the vibrator produced by the driver piezo-electric elements attached to the vibrator, the output voltage generated by the detector piezo-electric elements is adjusted by removing part of the electrodes of the detector piezo-electric elements which detect the angular velocity and are attached to the side surfaces of the vibrator.

The above method removes part of the electrodes of the detector piezo-electric elements that are formed on the side surfaces of the vibrator and detect the angular velocity. Therefore, no voltage is generated from the removed portions, and the offset components produced by the compressive stress and the tensile stress are canceled by each other in the places where the detector piezo-electric elements are joined, making it possible to increase the precision for detecting the angular velocity.

The above concrete example will now be described as an eleventh embodiment in conjunction with the drawings.

Figure 47:
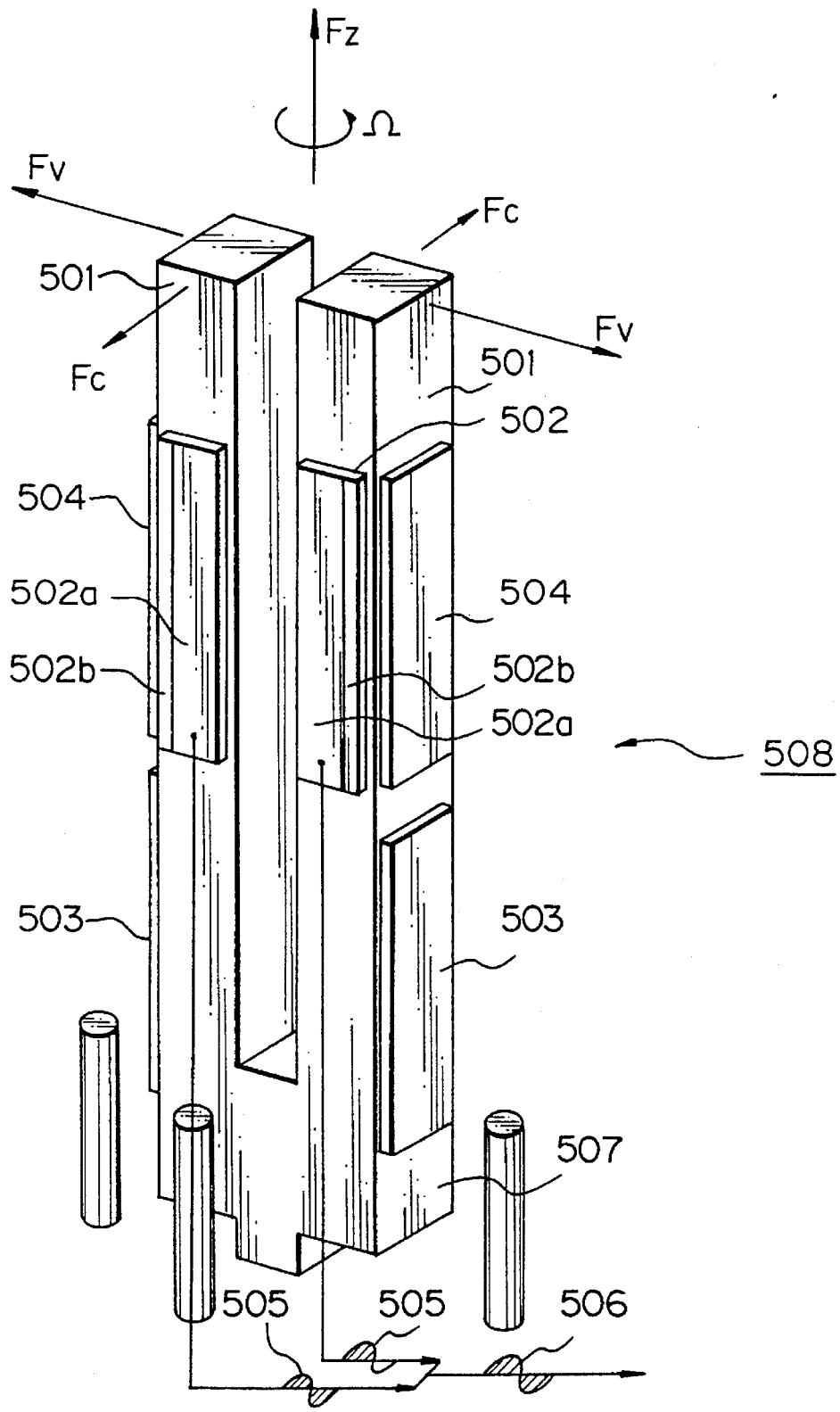
FIG. 47 is a diagram illustrating the entire constitution of elements of an angular velocity sensor to which an eleventh embodiment of the invention is adapted.

FIG. 47 is a diagram illustrating the overall constitution of the angular velocity sensor to which the above-mentioned embodiment is adapted.

In FIG. 47, the angular velocity sensor 508 of this embodiment has a support plate 507 of the tuning fork type in which two square poles 501 having a square shape in cross section are arranged in parallel.

To the square poles 501 are joined detector piezo-electric elements 502, driver piezo-electric elements 503, and feedback piezo-electric elements 504. In the arrangement of these piezo-electric elements (which are made up of piezo-electric elements and electrodes) as shown in FIG. 47, the detector piezo-electric elements 502 are arranged at upper portions on the front surfaces of the square poles 501 and the driver piezo-electric elements 503 are arranged at lower portions on the outside surfaces of the poles 501. The feedback piezo-electric elements 504 are arranged at position over the driver piezo-electric elements 503 so as to neighbor the detector piezo-electric elements 502 at right angles thereto.

Thus, the driver piezo-electric elements 503 are mounted so as to vibrate in the direction of Fv, and the detector piezo-electric elements 502 detect the stress produced by the Coriolis force in the direction of Fc that is generated in the vibration plate 501 accompanying the generation of angular velocity Ω.

Here, as a drive AC voltage is fed to the driver piezo-electric elements 503, the square poles 501 are vibrated in the direction of Fv due to the AC voltage, whereby the detector piezo-electric elements 502 are vibrated in the direction of Fv.

In this case, the feedback piezo-electric elements 504 monitor the condition of vibration in the direction of Fv produced by the driver piezo-electric elements 503, and control the AC voltage and the frequency fed to the driver piezo-electric elements 503 so that the condition of vibration is stabilized.

If the angular velocity Ω is generated under this condition, the Coriolis force is generated in the direction of Fc and the detector piezo-electric elements 502 are bent in the direction of Fc, as well. Accompanying the bending motion, the detector piezo-electric elements 502 joined to the square poles 501 generates small electric signals, and an angular velocity detector signal formed by synthesizing these small electric signals is output to an ECU (electronic control unit) that is not shown.

In this case, the detector piezo-electric elements 502 generate offset components 505 due to errors in the junction position of the detector piezo-electric elements 502, unevenness in the junction and deviation of the neutral axis of bending vibration. Accordingly, offset components are contained even in the angular velocity detect signal 506 that is formed by synthesizing the electric signals, and precision for detecting the angular velocity is deteriorated.

In order to decrease the offset component 505, therefore, this embodiment employs a method of adjusting the angular velocity sensor which is described below.

That is, when the square poles 501 are bent and vibrated by the driver piezo-electric elements 503, stress is generated in the angular velocity sensor 508 as shown in FIG. 48(A).

Here, the stress in the square pole 501 in the direction of Fv is symmetrically distributed with respect to the center line A, and the stress in the direction of Fz is so distributed as to increase toward the root portions of the square poles 501 (toward the support plate 507) as shown in FIG. 48(C).

In the angular velocity sensor 508 having such a stress distribution, if the detector piezo-electric elements 502 are jointed to the square poles 501 at positions symmetrical with respect to the center line A, the stress in the direction of Fv exerted on the detector piezo-electric elements 502 is canceled on the same plane and no offset component is generated by the detector piezo-electric elements 502. When the position is deviated by Δy in the direction of Fv due to errors in the position of adhesion and the like as shown in FIGS. 48(A) to 48(C), however, the stress in the direction of Fv exerted on the detector piezo-electric elements 502 is not canceled on the same plane, and the detector piezo-electric elements 502 generate an offset voltage Vout.

According to this embodiment, therefore, electrodes 502a constituting the detector piezo-electric elements 502 are partly removed by trimming to form electrodeless portions 502b in order to bring the offset component 505 to zero while monitoring the offset voltage Vout output from the detector piezo-electric elements 502 under the condition where the square poles 501 are bent and vibrated by the driver piezo-electric elements 503.

Described below is the relationship between the offset voltage Vout and the trimming of electrodes 502a of the detector piezo-electric elements 502.

Figure 49:
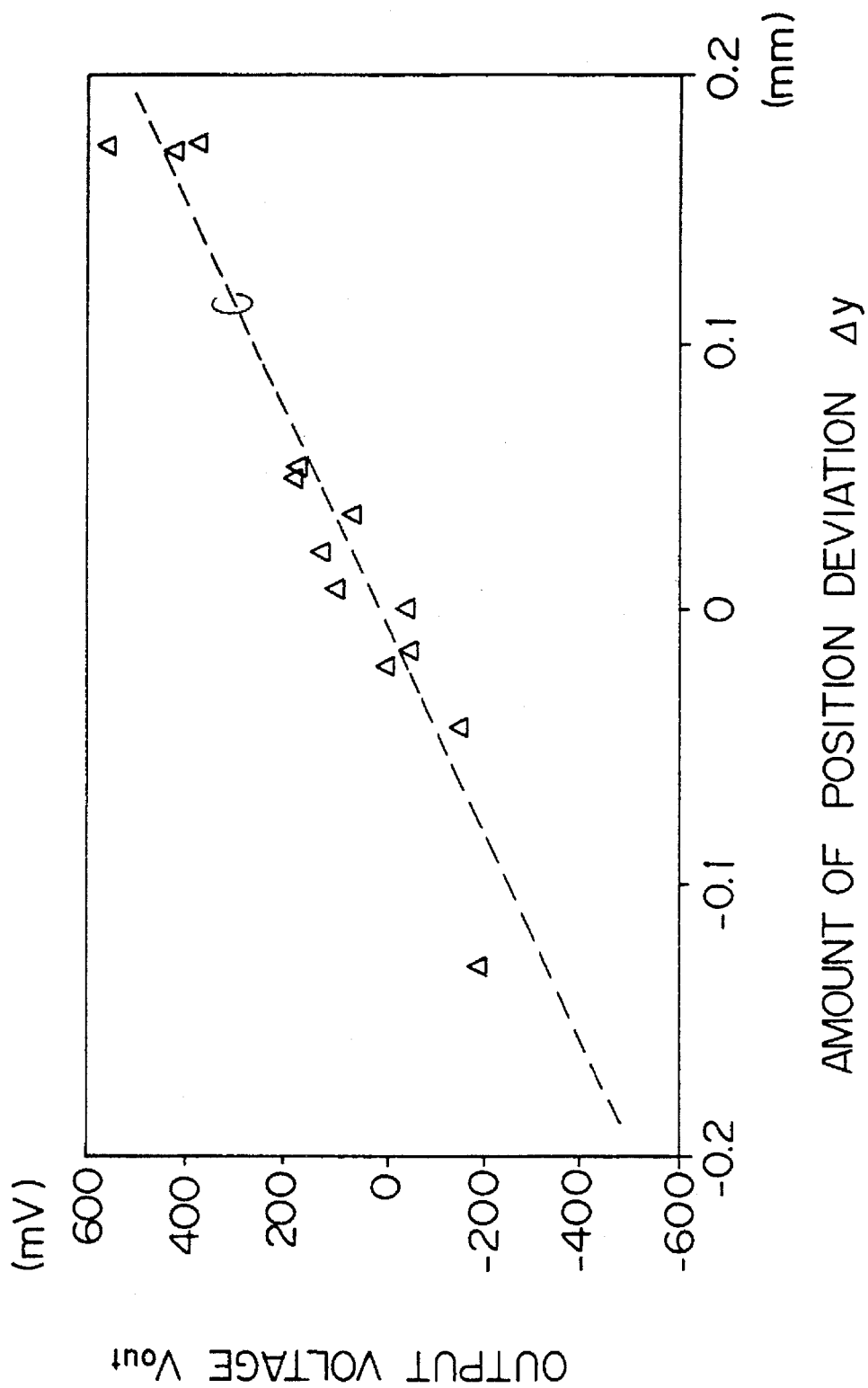
FIG. 49 is a diagram of characteristics showing the experimental results of a relationship between the deviation Δy in position of the detector piezo-electric element and the offset velocity Vout.

FIG. 49 is a diagram of characteristics illustrating experimental results concerning a relationship between the position deviation Δy of the detector piezo-electric elements 502 and the offset voltage Vout. In FIG. 49, a symbol "Δ" represents experimental data, from which it will be understood that the offset voltage Vout is affected not only by the position deviation Δy but also by unevenness in the adhesion between the detector piezo-electric element 2 and the vibration plate 1 and, hence, the offset voltage Vout undergoes variation to some extent. However, the relationship becomes as approximated by a straight line C (a broken line) in FIG. 49.

In order to bring the offset voltage Vout to zero, therefore, the electrodes 502a should be trimmed in amounts twice as great as the position deviation Δy so that the position deviation becomes nearly equal at the origin of position deviation Δy or with the end of the vibration plate 501 of FIG. 47 as a center.

Described below is a method of bringing the offset voltage Vout to zero.

Figure 50A:
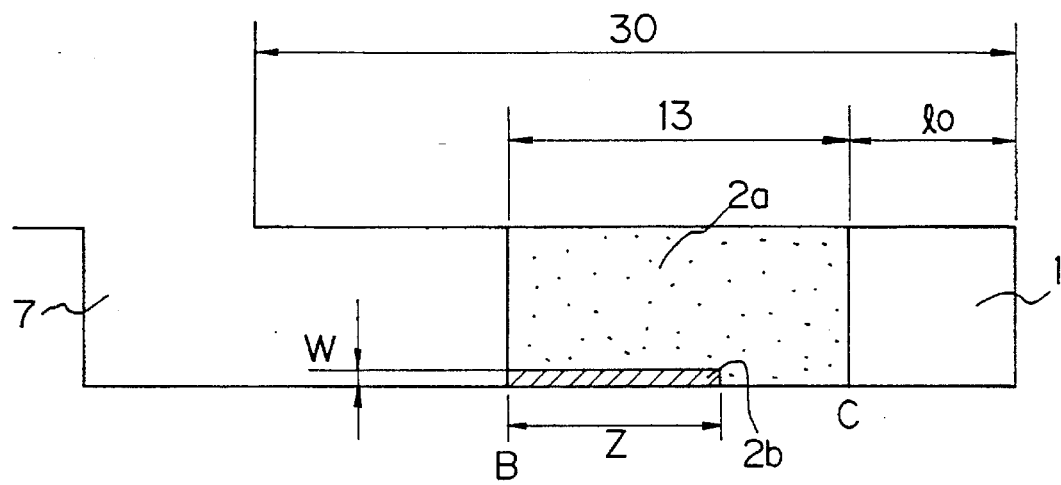
FIGS. 50(A) and 50(B) are diagrams of characteristics showing the experimental results of a relationship between the trimming length z when the trimming is effected with a predetermined groove width W and the offset voltage Vout.
Figure 50B:
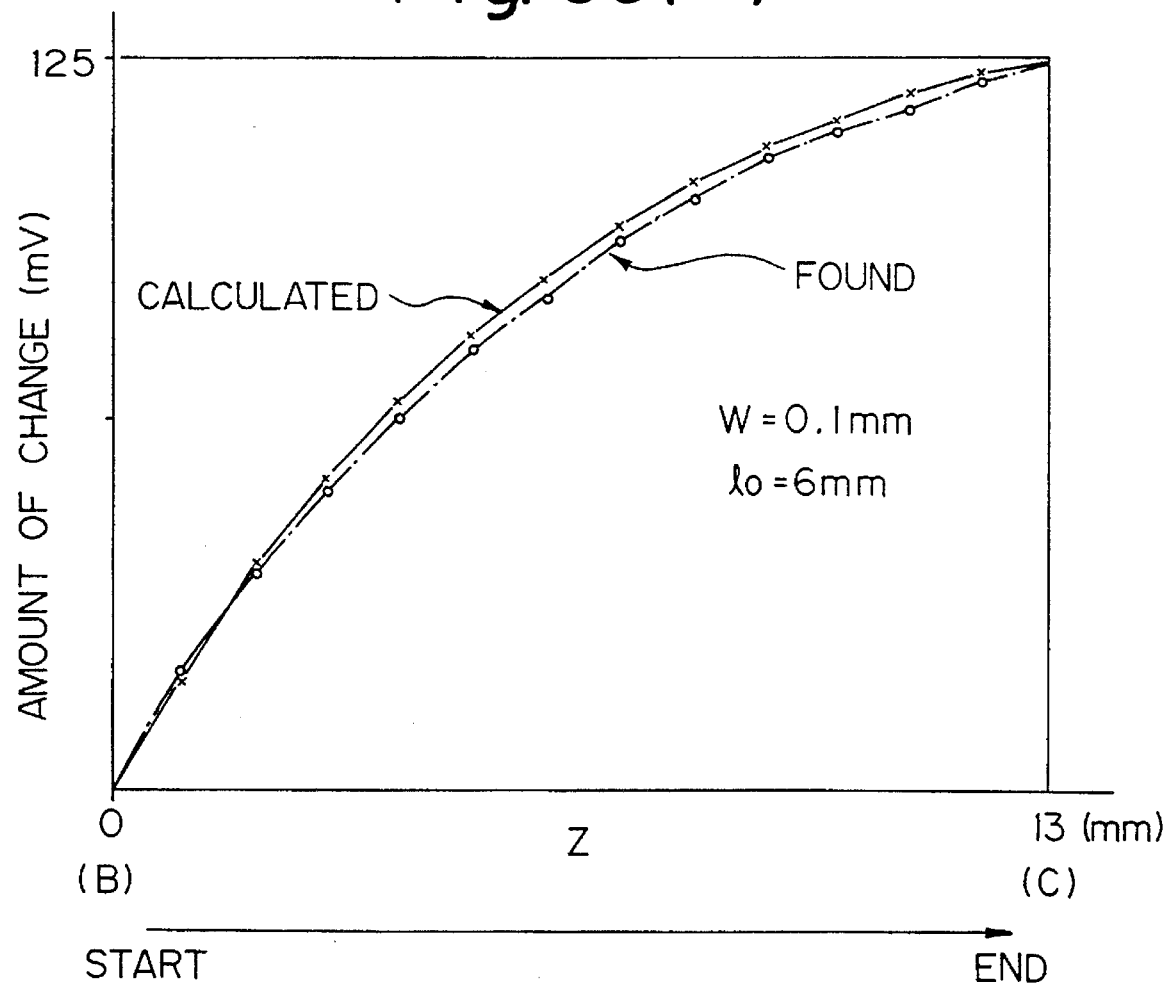
Figure 51:
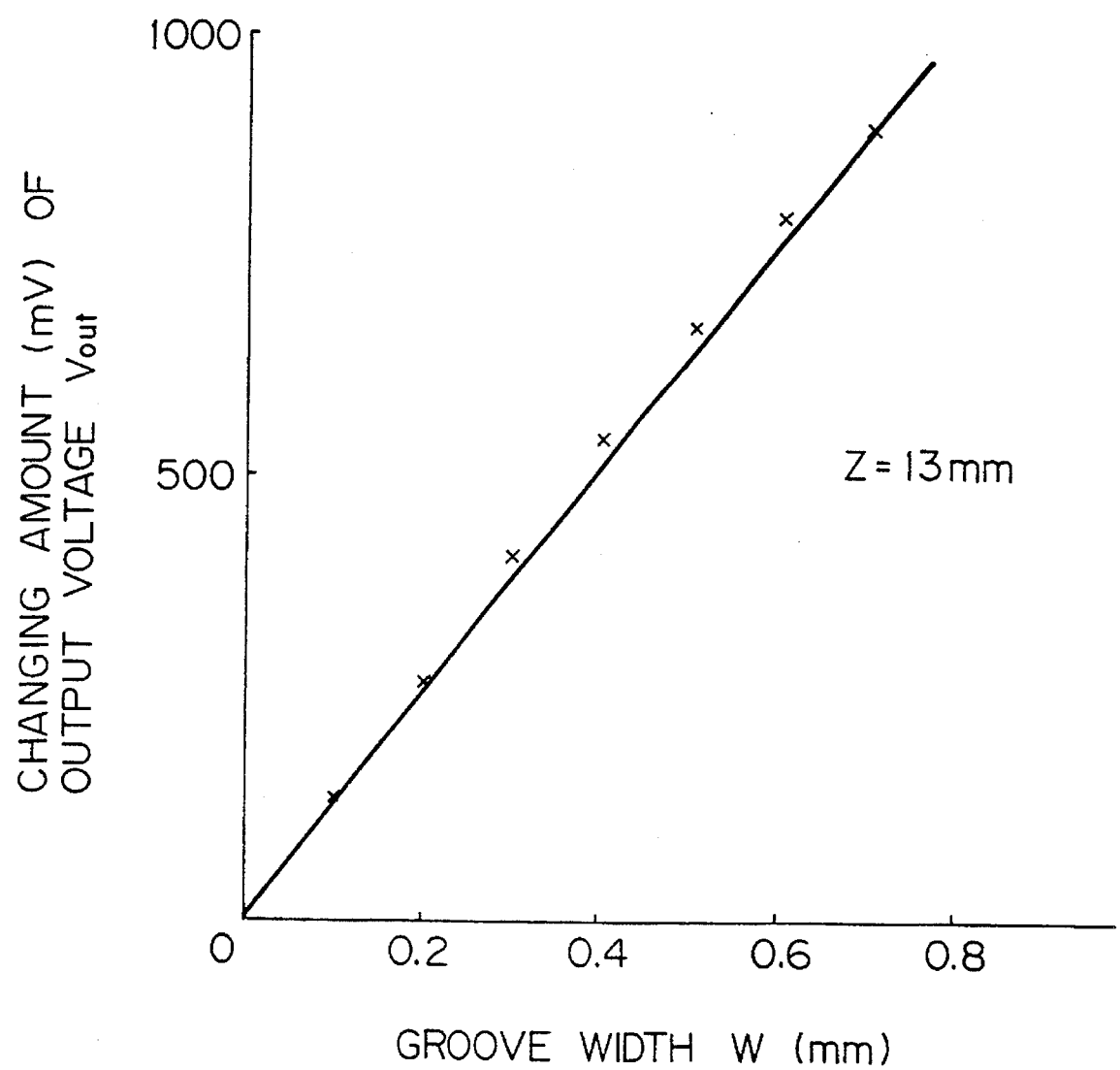
FIG. 51 is a diagram of characteristics showing the experimental results of a relationship between the groove width W of when the trimming is effected with a predetermined trimming length z and the offset voltage Vout.

FIGS. 50(A) and 50(B) are diagrams of characteristics illustrating calculated values and experimental results concerning a relationship between the offset voltage Vout and the trimming length z when the trimming is effected while maintaining a predetermined groove width W (W=0.1 mm), and FIG. 51 is a diagram of characteristics illustrating experimental results concerning a relationship between the offset voltage Vout and the groove width W when the trimming is effected while maintaining a predetermined trimming length z (z=13 mm).

The angular velocity sensor 508 used for obtaining the experimental results of FIGS. 50 and 51 is constituted by the square poles 501 measuring 30 mm in length and 3 mm×3 mm in cross section, and the driver piezo-electric elements 503 and the detector piezo-electric elements 502 measuring 13 mm in length, 3 mm in width and 0.2 mm in thickness. The driver piezo-electric elements 503 have applied thereto an AC voltage of 2V r.m.s. and the trimming is effected by using a YAG laser.

When the electrodes 502a of the detector piezo-electric elements 502 are successively trimmed from the side of the support plate 507 as shown in FIG. 50(A), the stress increases toward the root portions of the square poles 501 as shown in FIG. 48(B) and the rate of change in the offset voltage Vout increases as shown in FIG. 50(B). When the groove width W is successively changed as shown in FIG. 51, furthermore, the offset voltage Vout gradually increases.

Described below is a process for adjusting the angular velocity sensor based upon experimental results.

Figure 52:
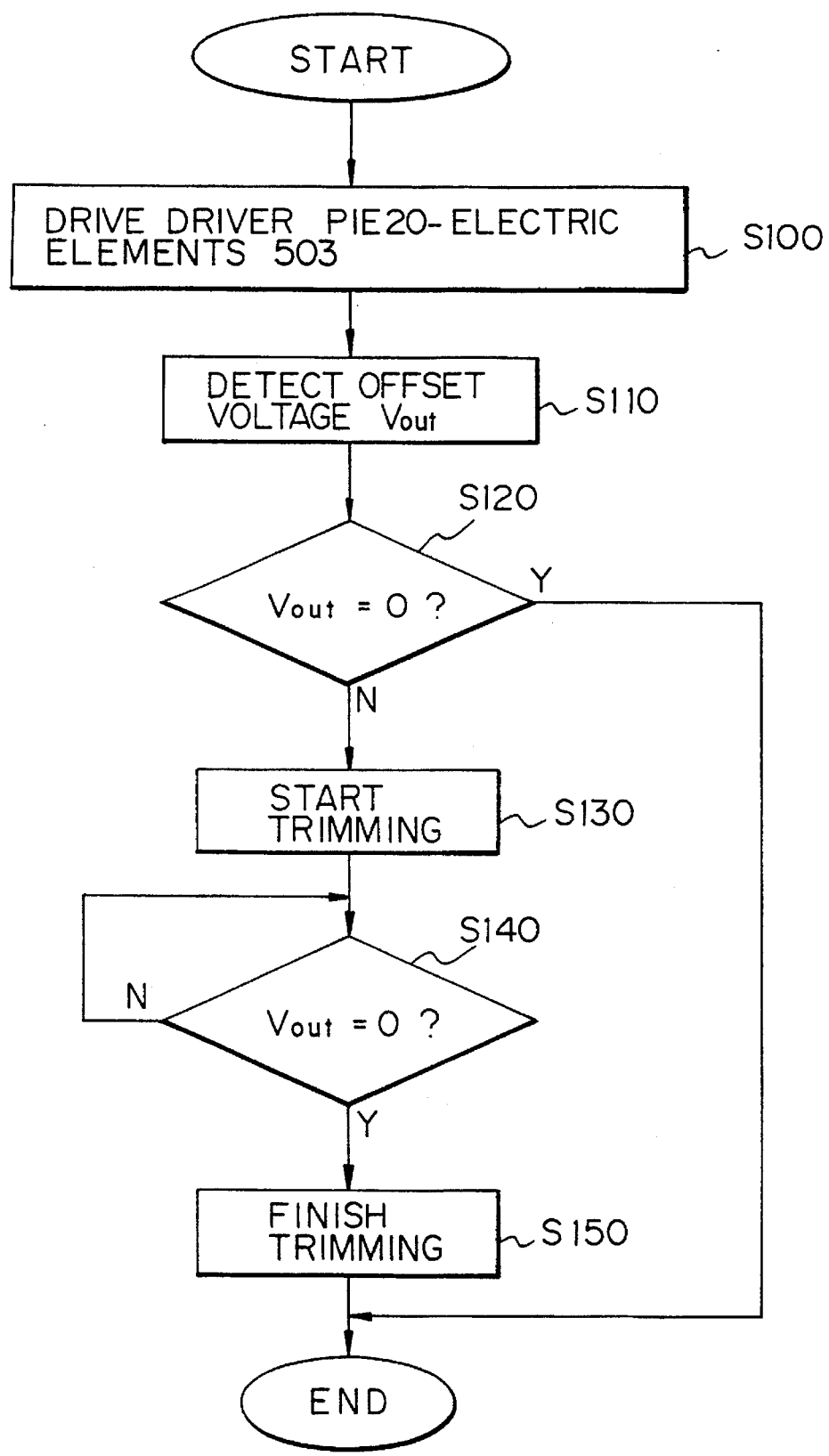
FIG. 52 is a flowchart illustrating the steps for adjusting the angular velocity sensor according to the eleventh embodiment of the present invention.

FIG. 52 is a flowchart illustrating the process for adjusting the angular velocity sensor according to an embodiment of the present invention.

In FIG. 52, a step S100 feeds an AC voltage to the driver piezo-electric elements 503 of the angular velocity sensor 508 to vibrate the square poles 501 in the direction of Fv. A step S110 detects an offset voltage Vout generated by the detector piezo-electric elements 503 joined to the square poles 501, and a step S120 discriminates whether the offset voltage Vout is zero or not. When the offset voltage Vout is already zero at this moment, it means that the detector piezo-electric elements 502 are joined to the square poles 501 at symmetrical positions with respect to the center lines A of the square poles 501 (see FIG. 48(A), and the adjustment is finished.

When it is discriminated at the step S120 that the offset voltage Vout is not zero, however, the program proceeds to a step S130 where the trimming is started for the electrodes 502a.

From the above-mentioned experimental results at this moment, the electrodes 502a should be trimmed from a point B on the side of the support plate 507 toward a point C on the side of the free end of the square poles 501 as shown in FIG. 50(A). Then, the stress decreases toward the free end of the square poles 501 and the amount of change in the offset voltage Vout decreases, making it easy to accomplish fine adjustment at the final step of adjustment.

Almost in synchronism with this trimming, a step S140 discriminates again whether the offset voltage Vout is zero or not. When the offset voltage Vout is not zero as shown in FIG. 52, the discrimination processing of the step S140 is repeated and the trimming is continued. When the offset voltage Vout becomes zero, the program proceeds to a step S150 where the trimming is halted and a series of adjustment processes is finished.

According to the above-mentioned embodiment, the electrodes 502a formed on the detector piezo-electric elements 502 are removed by trimming or a similar method to form electrodeless portions 502b that work to decrease the offset component 505. Thus, the offset component 505 is adjusted without causing changes in other characteristics.

In the above eleventh embodiment, it would be difficult to greatly change the groove width W when the trimming is carried out by using a laser beam. When the trimming from the point B to the point C shown in FIG. 50 is insufficient, therefore, the position may be further deviated to effect the trimming from the point B toward the point C. As for the direction of trimming, the trimming need not be effected through only one line of from the point B to the point C but, instead, the offset voltage Vout can be roughly adjusted by first trimming, for example, the vicinity of the point B and then trimming the vicinity of the point C to accomplish fine adjustment.

The trimming may be effected by using means such as grinding and sand blasting.

Though the above embodiment has dealt with an angular velocity sensor with a turning fork structure, the invention can also be adapted to an angular velocity sensor of the tuning piece type having only one square pole 501.

(Twelve embodiment)

The twelfth embodiment employs an angular velocity sensor which is the same as the one used in the eleventh embodiment, and the only difference residues in the adjustment of trimming.

In the twelfth embodiment, in particular, note is made of the fact that the offset voltage has positive and negative polarities as shown in FIG. 49 and that the offset voltage corresponds to the direction of deviation in the position where the piezo-electric elements are adhered.

In the twelfth embodiment, therefore, it is discriminated at the time of adjusting the offset voltage Vout in which direction the detector piezo-electric elements 502 are deviated, and the electrodes 502a of the detector piezo-electric elements 502 of the deviated side are trimmed by using a laser beam or the like.

Figure 53A:
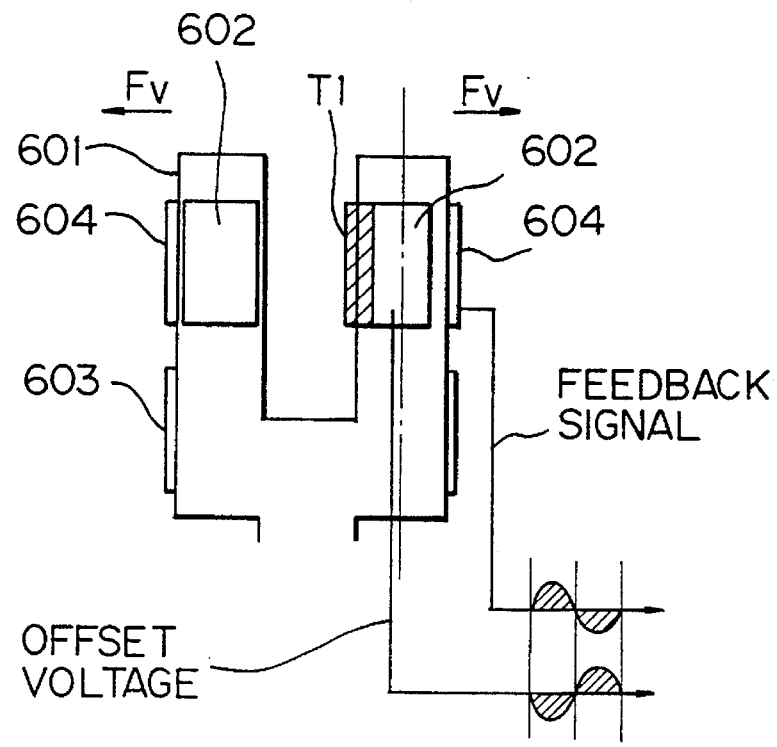
FIGS. 53(A) and 53(B) are diagrams explaining the method of adjustment by trimming according to a twelfth embodiment.
Figure 53B:
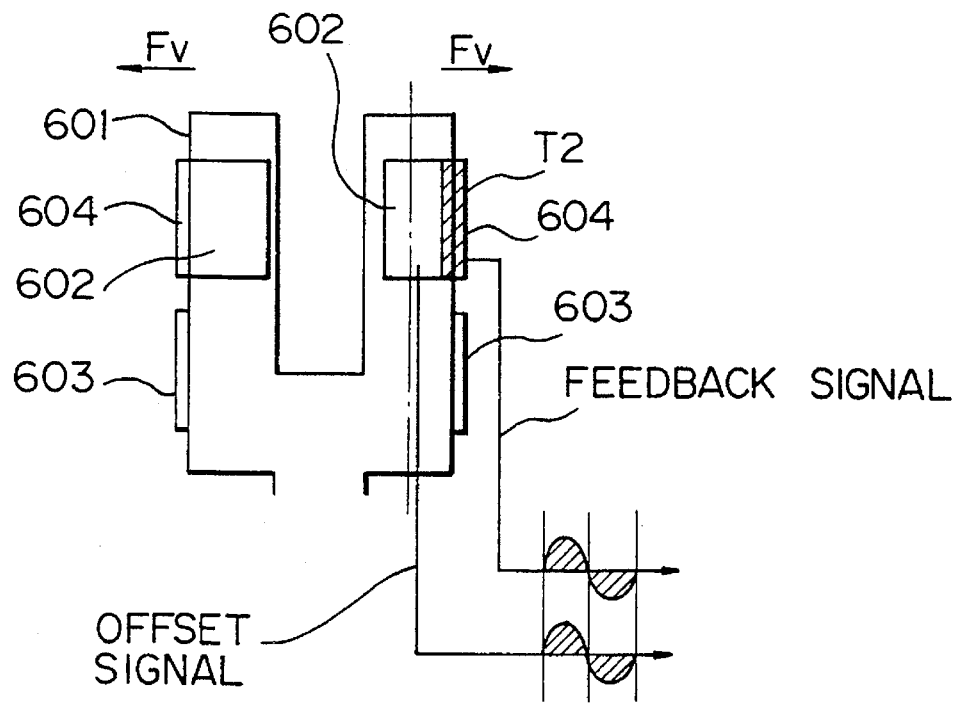

In the twelfth embodiment as shown in FIGS. 53(A) and 53(B), the direction in which the detector piezo-electric elements 602 are deviated is discriminated by monitoring the signals from the feedback piezo-electric elements, i.e., by discriminating the polarity of the offset voltage Vout. That is, when the signal of the offset voltage Vout has a phase different from that of the feedback signal, the left portions T1 of electrodes of the detector piezo-electric elements 602 are trimmed as shown in FIG. 53(A) and when the signal of the offset voltage Vout is in phase with the feedback signal, the right portions T2 of electrodes of the detector piezo-electric elements 602 are trimmed as shown in FIG. 53(B).

Figure 54:
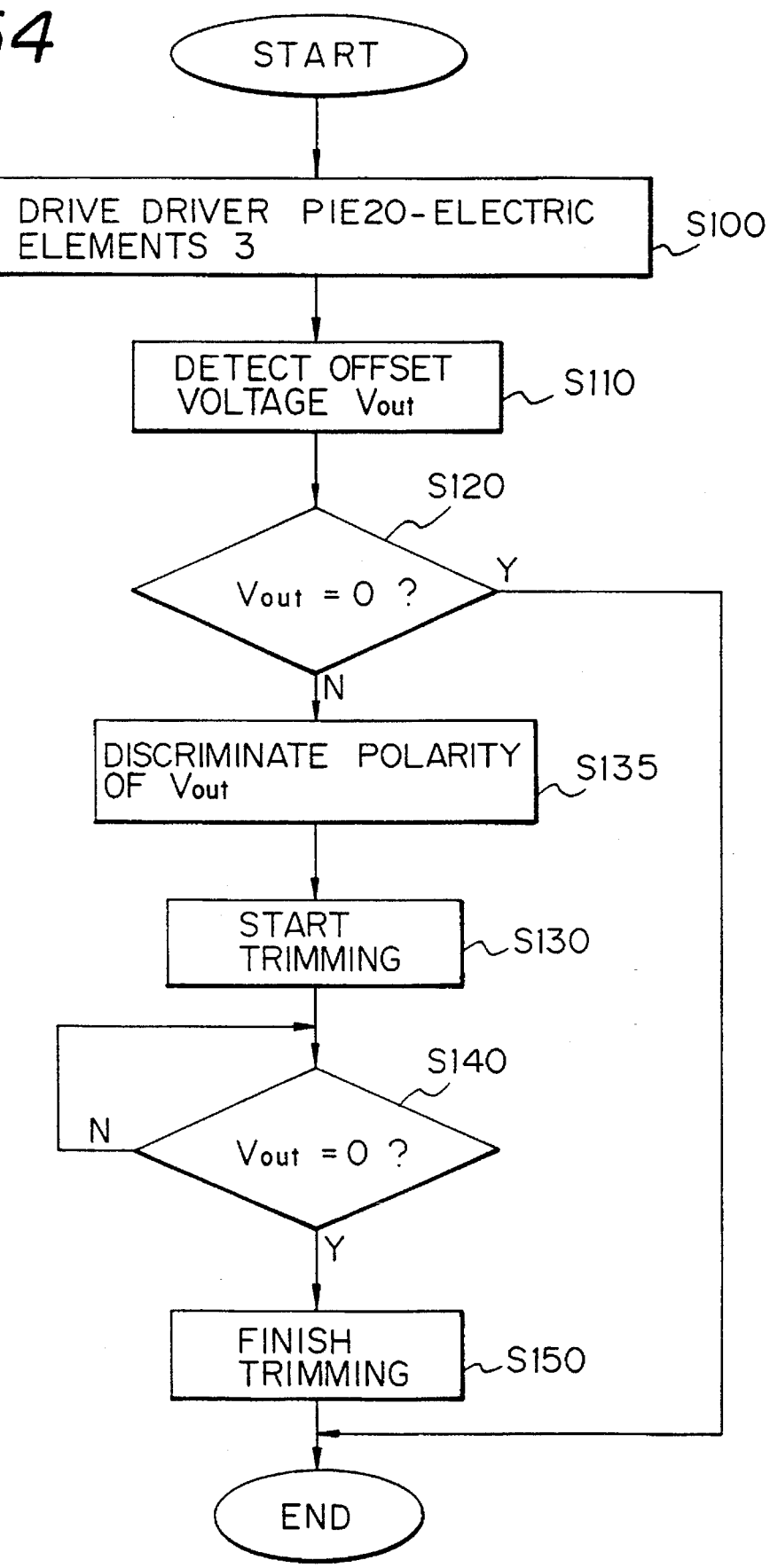
FIG. 54 is a flowchart for explaining the steps of adjustment according to the twelfth embodiment.

FIG. 54 is a flowchart of the twelfth embodiment, in which a step S135 for discriminating the polarity of the offset voltage Vout is added to the flowchart of the eleven embodiment that is shown in FIG. 52. Addition of the step S135 makes it possible to effect more efficient trimming.

(Thirteenth embodiment)

In the twelfth embodiment, the polarity of the detector piezo-electric elements 602 is discriminated by discriminating the phases of the offset voltage and of the feedback voltage. In the thirteenth embodiment as shown in FIGS. 55(A) and 55(B), on the other hand, discrimination of the polarity effected in the twelfth embodiment can be omitted by;

(1) deviating the detector piezo-electric elements 702 in one direction from the centers at all times; and (2) attaching the electrodes to the detector piezo-electric elements 702 at positions were initially deviated.

Figure 55A:
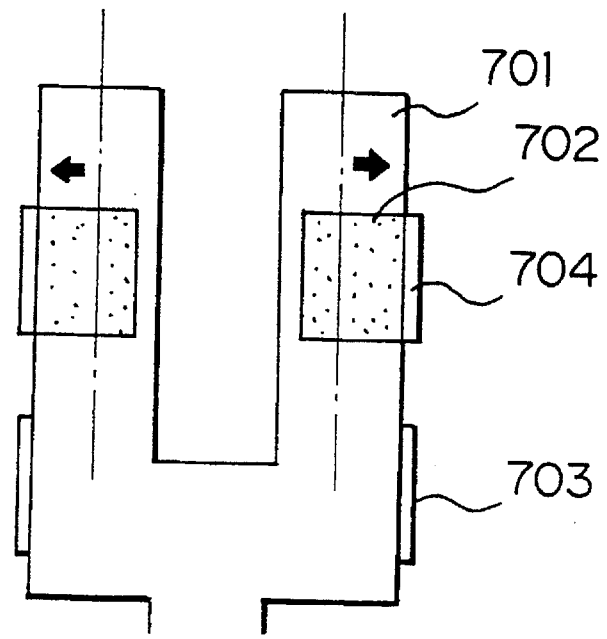
FIGS. 55(A) and 55(B) are diagrams for explaining the method of adjustment by trimming according to a thirteenth embodiment.

That is, in the above case (1) as shown in FIG. 55(A), the detector piezo-electric elements 702 are joined being deviated toward the outside, such that the positions to be trimmed are on the outside at all times.

Figure 55B:
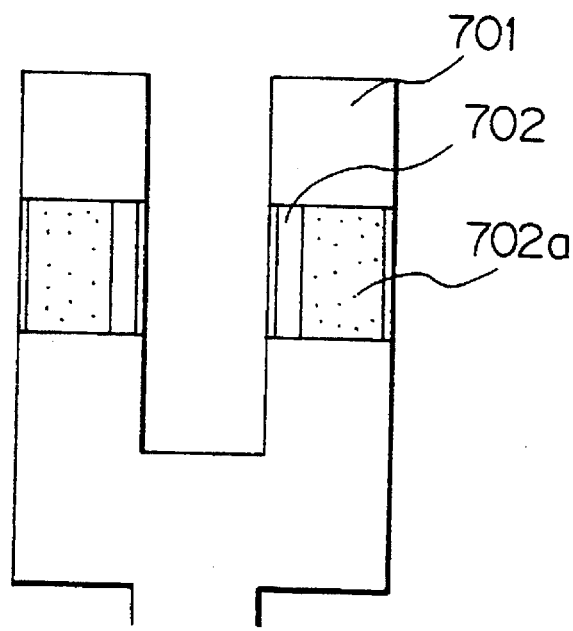

In the above case (2) as shown in FIG. 55(B), the electrodes 702a of the detector piezo-electric elements 702 are outwardly deviated initially, so that the positions of the electrodes 702a to be trimmed are secured at the outside at all times.

(Fourteenth embodiment)

The fourteenth embodiment deals with a trimming pattern in detail.

In order to adjust a large offset voltage Vout by laser trimming, the trimming must be repeated several times from an end E1 to an end E2 of the electrodes 802a of the detector piezo-electric elements.

Figure 56A:
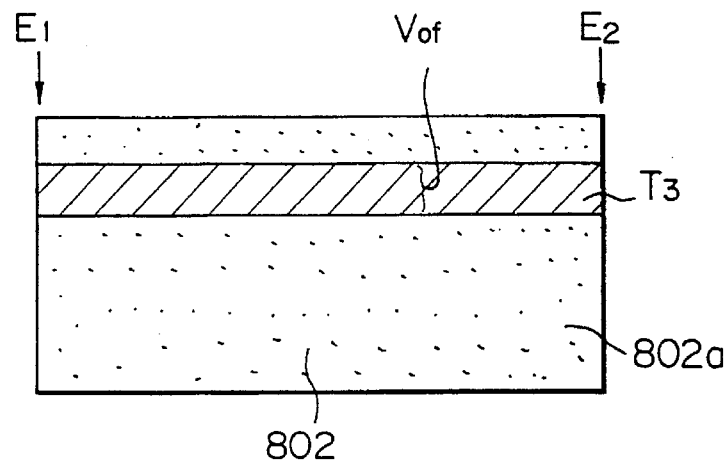
FIG. 56(A) is a diagram explaining inconvenience in the trimming pattern.

In the case of the pattern of trimming T3 of FIG. 56(A), the detect signal may contain an offset voltage Vof that is generated by the remainder of the electrode due to migration or an electrically conducting substance stuck to the trimming portion unless the electrodes 802a are completely removed.

Figure 56B:
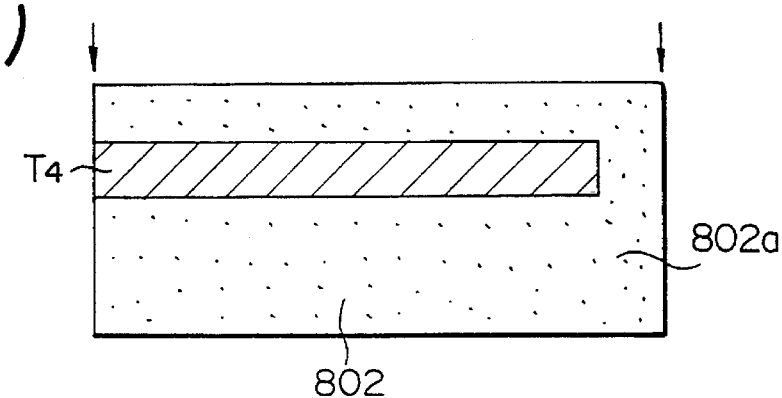
FIG. 56(B) is a diagram explaining a trimming pattern according to a fourteenth embodiment.

In order to prevent the above-mentioned problem, therefore, there can be employed a pattern of trimming T4 as shown in FIG. 56(B) in which the electrode 802a is not out from the end E1 to the end E2 but at least either end E1 or E2 is left.

Figure 56C:
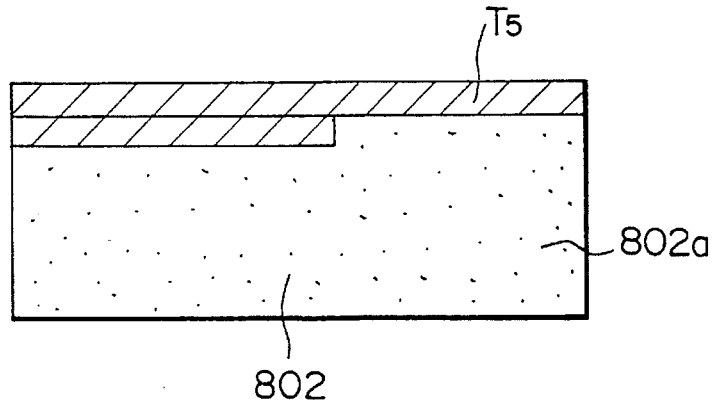
FIG. 56(C) is a diagram explaining a trimming pattern according to the fourteenth embodiment.

As shown in FIG. 56(C), furthermore, a pattern of complete trimming T5 may be employed in which no electrode 802a is left on the side surface.

(Fifteenth embodiment)

The fifteenth embodiment employs a trimming method which takes a change with the passage of time into consideration.

That is, in a method which effects trimming by using a laser beam to apply a high temperature to the electrodes, polarization of the piezo-electric elements is deteriorated due to the heat.

However, the polarization that is deteriorated is restored with the passage of time owing to the restoration effect of polarization that is inherent in ferroelectric materials. Therefore, the offset voltage Vout changes with the passage of time toward the voltage before the trimming.

If the adjustment is needed at a level at which the amount of change with the passage of time could become a problem, the trimming is then effected by taking into consideration the amount of change with the passage of time, in order to provide a sensor that is stabilized.

Figure 57:
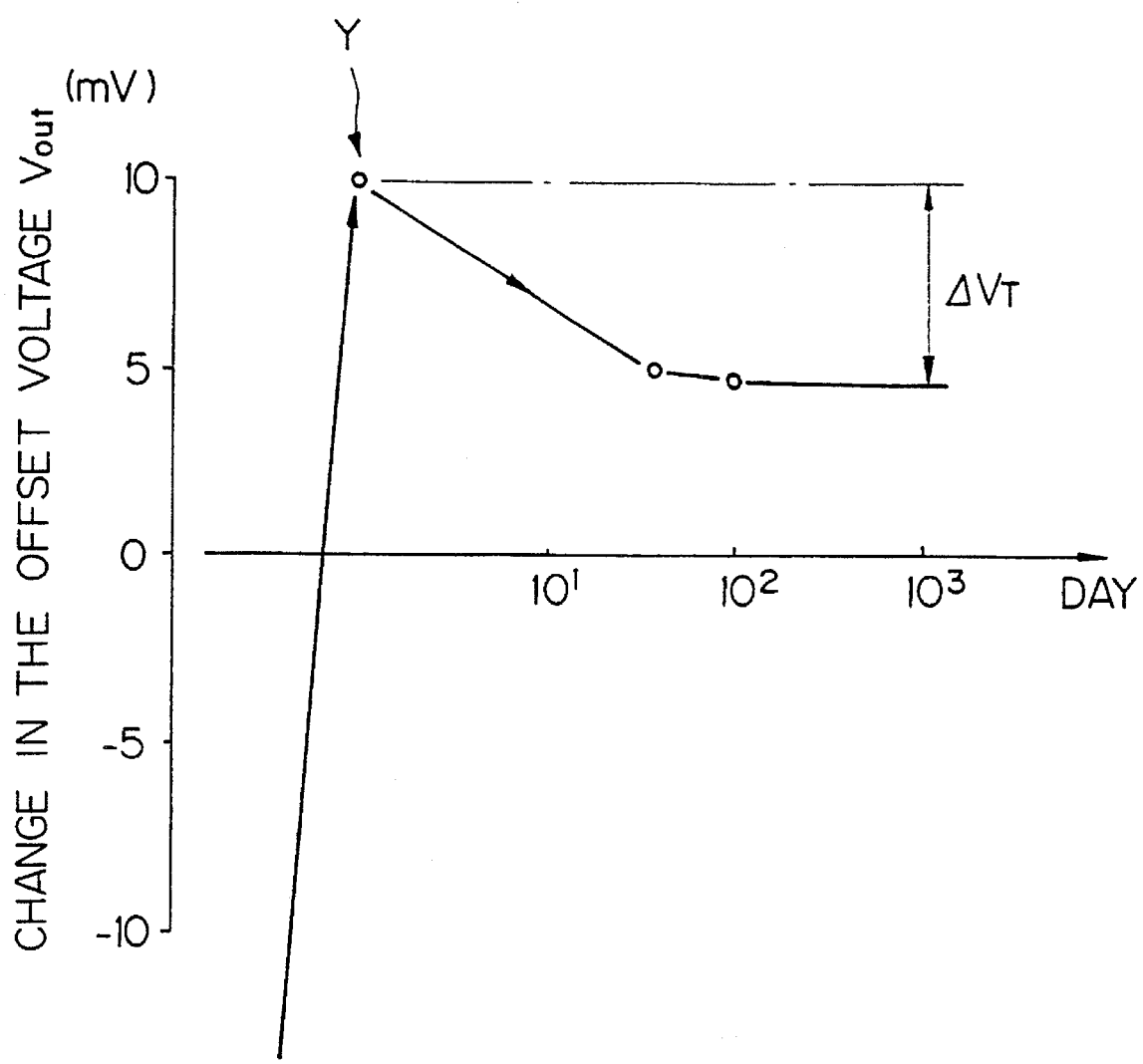
FIG. 57 is a diagram of characteristics showing a change of the piezo-electric element with the passage of time according to a fifteenth embodiment.

FIG. 57 illustrates a change with the passage of time. The piezo-electric elements are the same as the detector piezo-electric elements used in the eleventh embodiment.

As will be obvious from FIG. 57, the piezo-electric element is gradually restored with the passage of time from a point Y of just after the trimming, and the offset voltage approaches 0. The offset voltage is finally restored to $\Delta$Vt.

By effecting the trimming by taking into consideration the change of $\Delta$Vt with the passage of time, the offset voltage can be brought close to 0 with the passage of time.

The above embodiment has utilized the restoration effect of the piezo-electric element in order to decrease the change with the passage of time. It is, however, also allowable to decrease the change of offset voltage Vout with the passage of time by trimming the low-melting point aluminum electrodes, thus suppressing the generation of heat and suppressing the deterioration of polarization.

We claim:

1. An angular velocity sensor comprising:

at least one square pole-like vibrator supported by a base portion via a support portion;

a driver piezo-electric element fastened to a surface of said at least one square pole-like vibrator at a position close to said support portion of said vibrator; and detector piezo-electric element fastened to a surface of said vibrator at right angles with the surface on which said driver piezo-electric element is fastened, said detector piezo-electric element being spaced in an axial direction of said at least one square pole-like vibrator from said driver piezo-electric element toward a side opposite to the base portion of said support portion so as to prevent said detector piezo-electric element from overlapping said driver piezo-electric element, wherein said at least one vibrator consists of a longitudinally elongated member having a predetermined longitudinal length and a rectangular cross-sectional shape, said cross-sectional shape thereof being substantially uniform along a longitudinal axis of said elongated member;

said driver piezo-electric element being fastened to a surface of said at least one vibrator, said at least one vibrator being vibrated when a driving signal is applied to said driver piezo-electric element;

said detector piezo-electric element generating a detection signal in response to a vibration of said at least one vibrator generated at a time when a rotational angular velocity is applied to said at least one vibrator while it is vibrating in a first vibrating direction caused by said driving signal applied to said driver piezo-electric element, and having a second vibrating direction caused by the applied rotational angular velocity, said second vibrating direction being different from said first vibrating direction, said detector piezo-electric element being arranged with said driver piezo-electric element on said at least one square pole-like vibrator in an axially spaced relationship so as not to overlap each other to thereby be substantially unaffected by noise generated at said detector piezo-electric element caused by the vibration of said at least one vibrator due to expansion and contraction of said driver piezo-electric element when driving signals are applied to said driver piezo-electric element, and said detector piezo-electric element is arranged on any portion of said longitudinally elongated member of said at least one square pole-like vibrator.

2. An angular velocity sensor according to claim 1, wherein said at least one vibrator includes two vibrators of the form of said square pole-like vibrator arranged in parallel with each other and are secured to a common support portion.

3. An angular velocity sensor according to claim 1, wherein said detector piezo-electric element is arranged among a plurality of driver piezo-electric elements that are arranged so as to maintain a suitable distance along a lengthwise axial direction of said square pole-like vibrator from said detector piezo-electric element, a surface of said square pole-like vibrator on which said plurality of driver piezo-electric elements are arranged being different from the surface of said square pole-like vibrator on which said detector piezo-electric element is arranged.

4. An angular velocity sensor according to claim 1, wherein said driver piezo-electric element is arranged among a plurality of detector piezo-electric elements that are arranged so as to maintain a suitable distance along a lengthwise axial direction of said square pole-like vibrator from said driver piezo-electric element, the surface of said square pole-like vibrator on which said driver piezo-electric element is arranged being different from a surface of said square pole-like vibrator on which said plurality of detector piezo-electric elements are arranged.

5. An angular velocity sensor according to claim 1, wherein electrodes of at least one of said driver piezo-electric element and said detector piezo electric element arranged on the surface of said square pole-like vibrator is partly cut off.

6. An angular velocity sensor according to claim 1, wherein electrodes of said detector piezo-electric element arranged on the surface of said square pole-like vibrator is partly cut off.

7. An angular velocity sensor comprising:

a tuning fork member, comprising:

a pair of vibrating portions adjacently arranged in parallel relation to one another, each vibrating portion of said pair of vibrating portions having first and second terminal end portions, said first terminal end portions being fixedly coupled to each other, each vibrating portion consisting of a longitudinal elongated member having a predetermined longitudinal length and a rectangular cross-sectional shape, said cross-sectional shape of said longitudinally elongated members being substantially uniform along longitudinal axes of said longitudinal elongated members;

driver piezo-electric elements, one of said driver piezo-electric elements being fastened to a surface of each vibrating portion, respectively, proximate a one of said first and second terminal end portions of each vibrating portion, said driver piezo-electric elements being disposed on non-facing surfaces of said pair of vibrating portions so that said pair of vibrating portions are moveable in a first direction in which said pair of vibrating portions approach and move apart from each other when driving signals are applied to said driver piezo-electric elements; and detector piezo-electric elements, one of said detector piezo-electric elements being fastened to a surface of each vibrating portion oriented at right angles with respect to the surfaces to which said driver piezo-electric elements are fastened, said detector piezo-electric elements being disposed proximate an opposed one of said first and second terminal end portions of each vibrating portion from said one of said first and second terminal end portions proximate with said driver piezo-electric elements are disposed, wherein said detector piezo-electric elements detect a vibration of each vibrating portion generated in response to a rotational angular velocity applied to said tuning fork member while said pair of vibrating portions are vibrating in said first direction, said rotational angular velocity generated vibration of each vibrating portion being in second directions opposite to one another and at right angles to the first direction, said detector piezo-electric element generating a detection signal in response to said vibration of said pair of vibrating portions generated at a time when the rotational angular velocity is applied to said tuning fork member while said pair of vibrating portions are vibrating in the first direction, said detector piezo-electric element and said driver piezo-electric element being arranged in an axially spaced relation with respect to each other on along said longitudinally elongated member of each vibrating portion so as not to overlap each other to thereby be substantially unaffected by noise generated at said detector piezo-electric element caused by a vibration of said tuning fork member due to expansion and contraction of said driver piezo-electric elements when driving signals are applied to said driver piezo-electric elements.

8. An angular velocity sensor according to claim 7, further comprising feedback piezo-electric elements for detecting the vibration of said vibrating portions and being solidly fastened on surfaces of each said vibrating portions, said surfaces of which are identical to surfaces on each of which said driver piezo-electric elements are fastened, respectively.

9. An angular velocity sensor according to claim 7 wherein said tuning fork member includes a base portion supporting said pair of vibrating portions, a vibration in said base portion being less than 1.5% of said vibration in said pair of vibrating portions produced by said driver piezo-electric elements adhered thereto.

10. An angular velocity sensor according to claim 9, wherein said tuning fork member includes a support portion to which said first terminal end portions of each of said pair of vibrating portions are fixedly attached, the thickness of said support portion being substantially equal to the thickness of said square pole.

11. An angular velocity sensor according to claim 9, wherein said tuning fork member includes a support portion to which said first terminal end portions of each of said pair of vibrating portions are fixedly attached, the width of said support portion lying within a range of smaller than 5 millimeters but larger than 0.5 millimeters.

12. An angular velocity sensor according to claim 7, wherein said tuning fork member includes a support portion to which said first terminal end portions of each of said pair of vibrating portions are fixedly attached, said support portion having a width of less than 5 millimeters.

13. An angular velocity sensor according to claim 7, wherein said tuning fork member includes a support portion to which said first terminal end portions of each of said pair of vibrating portions are fixedly attached, and when the width of the support portion is A millimeters, the width of the longitudinally elongated members is B millimeters, and the length of the support portion is C millimeters, a relationship, $$A \leq 0.4 \times C + B$$

is satisfied.

14. A method of adjusting an angular velocity sensor, said angular velocity sensor comprising:

at least one square pole-like vibrator;

a driver piezo-electric element fastened to one surface of said at least one vibrator; and a detector piezo-electric element fastened to a surface of said at least one vibrator at right angles with the surface to which said driver piezo-electric element is fastened, said detector piezo-electric element being spaced in an axial direction of said at least one square pole-like vibrator from said driver piezo-electric element so as to prevent said detector piezo-electric element from overlapping said driver piezo-electric element, said method comprising the step of:

utilizing bending vibration of piezo-electric elements provided on said at least one vibrator, wherein electrodes of said piezo-electric elements formed on said at least one vibrator are partly removed in order to adjust output voltage generated by said piezo-electric elements.

15. A method of adjusting an angular velocity sensor, said angular velocity sensor comprising:

at least one square pole-like vibrator;

a driver piezo-electric element fastened to one surface of said at least one vibrator; and a detector piezo-electric element fastened to a surface of said at least one vibrator at right angles with the surface to which said driver piezo-electric element is fastened, said detector piezo-electric element being spaced in an axial direction of said at least one square pole-like vibrator from said driver piezo-electric element so as to prevent said detector piezo-electric element from overlapping said driver piezo-electric element, said method comprising the step of:

utilizing bending vibration of said at least one vibrator produced by said driver piezo-electric elements provided for said at least one vibrator, wherein electrodes of said detector piezo-electric elements that are formed on side surfaces of said at least one vibrator to detect angular velocity, are partly removed in order to adjust output voltages generated by said detector piezo-electric elements.

16. A method of adjusting an angular velocity sensor according to claim 15, wherein portions for removing the electrodes of said detector piezo-electric elements are specified by discriminating the polarities of said piezo-electric elements.

17. An angular velocity sensor according to claim 7, wherein said tuning fork member includes a support portion to which said first terminal end portions of each of said pair of vibrating portions are fixedly attached, and when the width of the support portion is A millimeters, the width of the longitudinally elongated members is B millimeters, and the length of the support portion is C millimeters, a relationship, $$0.4 \times C + B - 1 \leq A \leq 0.4 \times C + B + 1$$

is satisfied.

* * * * *